United States Patent
Sheng

(10) Patent No.: US 10,383,035 B2
(45) Date of Patent: Aug. 13, 2019

(54) PROVIDING AND OBTAINING SYSTEM INFORMATION FOR REMOTE WIRELESS TERMINAL

(71) Applicant: SHARP Laboratories of America, Inc., Camas, WA (US)

(72) Inventor: Jia Sheng, Vancouver, WA (US)

(73) Assignee: Sharp Laboratories of America, Inc., Vancouver, WA (US)

( * ) Notice: Subject to any disclaimer, the term of this patent is extended or adjusted under 35 U.S.C. 154(b) by 0 days.

(21) Appl. No.: 15/719,733

(22) Filed: Sep. 29, 2017

(65) Prior Publication Data

US 2018/0092027 A1 Mar. 29, 2018

Related U.S. Application Data

(60) Provisional application No. 62/401,803, filed on Sep. 29, 2016.

(51) Int. Cl.
| | | |
|---|---|---|
| *H04W 4/00* | (2018.01) |
| *H04W 48/08* | (2009.01) |
| *H04W 40/22* | (2009.01) |
| *H04W 48/12* | (2009.01) |

(52) U.S. Cl.
CPC .......... *H04W 48/08* (2013.01); *H04W 40/22* (2013.01); *H04W 48/12* (2013.01); *Y02D 70/00* (2018.01); *Y02D 70/10* (2018.01); *Y02D 70/12* (2018.01); *Y02D 70/1226* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/164* (2018.01); *Y02D 70/21* (2018.01); *Y02D 70/26* (2018.01); *Y02D 70/39* (2018.01)

(58) Field of Classification Search
CPC ...... H04W 40/22; H04W 48/08; Y02D 70/12; Y02D 70/1262; Y02D 70/164; Y02D 70/1242; Y02D 70/142; Y02D 70/144; Y02D 70/1264; Y02D 70/1226; Y02D 70/21; Y02D 70/26; Y02D 70/39; Y02D 70/00; Y02D 70/10
USPC ....................................................... 455/13.1
See application file for complete search history.

(56) References Cited

U.S. PATENT DOCUMENTS

| | | |
|---|---|---|
| 2008/0220790 A1 | 9/2008 | Cai et al. |
| 2011/0105135 A1 | 5/2011 | Krishnamurthy et al. |
| 2012/0184266 A1 | 7/2012 | Faccin et al. |
| 2013/0078908 A1 | 3/2013 | Smith |
| 2014/0187283 A1 | 7/2014 | Nimbalker |

(Continued)

FOREIGN PATENT DOCUMENTS

| | | |
|---|---|---|
| WO | WO 2014/182342 A1 | 11/2014 |
| WO | WO 2015/119428 A1 | 8/2015 |
| WO | 2015/143170 A1 | 9/2015 |

OTHER PUBLICATIONS

International Search Report and Written Opinion dated Feb. 26, 2018 in PCT application PCT/US2017/54322.

(Continued)

*Primary Examiner* — Huy C Ho
(74) *Attorney, Agent, or Firm* — Nixon & Vanderhye P.C.

(57) ABSTRACT

Methods and apparatus are provided for providing system information to a remote/evolved remote UE (26) as well as methods and apparatus for a remote/evolved remote UE (26) to receive system information.

13 Claims, 24 Drawing Sheets

(56) References Cited

U.S. PATENT DOCUMENTS

| | | |
|---|---|---|
| 2014/0321416 A1 | 10/2014 | Pragada et al. |
| 2014/0335853 A1 | 11/2014 | Sartori |
| 2015/0016355 A1 | 1/2015 | Yie |
| 2015/0271720 A1 | 9/2015 | Yamada et al. |
| 2015/0271841 A1 | 9/2015 | Yamada et al. |
| 2015/0271846 A1 | 9/2015 | Kowalski et al. |
| 2015/0319797 A1 | 11/2015 | Yamada et al. |
| 2015/0327240 A1 | 11/2015 | Yamada et al. |
| 2015/0382324 A1 | 12/2015 | Sheng et al. |
| 2016/0212721 A1 | 7/2016 | Sheng et al. |
| 2018/0035354 A1* | 2/2018 | Martin .................. H04W 40/22 |

OTHER PUBLICATIONS

International Preliminary Report on Patentability dated Jul. 18, 2017 in PCT Application PCT/US2016/013383.
RP-142229 3GPP TSG RAN Meeting #66, Qualcomm Incorporated, "Work Item Proposal for Enhanced LTE Device to Device Proximity Services", Maui, USA, Dec. 8-11, 2014.
3GPP TSG RAN WG1 Meeting #79, "RAN1 Chairman's Notes", San Francisco, USA, Nov. 17-21, 2014.
3GPP TSG RAN WG1 Meeting #78bis, "RAN1 Chairman's Notes", Ljubljana, Slovenia, Oct. 6-10, 2014.
3GPP TSG RAN WG1 Meeting #78, "RAN1 Chairman's Notes", Dresden, Germany, Aug. 18-24, 2014.
International Search Report and Written Opinion dated May 27, 2016 in PCT Application No. PCT/US2016/013383.
U.S. Appl. No. 14/818,855, filed Aug. 5, 2015, entitled "Synchronization Signals for Device-to-Device Communcations".
U.S. Appl. No. 14/859,648, filed Sep. 21, 2015, entitled "Latency Reduction for Mode Switching in Sidelink Communications".
U.S. Appl. No. 14/862,291, filed Sep. 23, 2015, entitled "Method and Apparatus for Unlicensed Communications Band Access".
U.S. Appl. No. 62/145,492, filed Apr. 9, 2015, entitled "Method and Apparatus for Sidelink Direct Discovery Resource Pool Allocation for Out-of-Coverage Wireless Terminal".
U.S. Appl. No. 62/145,597, filed Apr. 9, 2015, entitled "Method and Apparatus for Implementing Partial Coverage and Out-of-Coverage Sidelink Discovery Resource Pools for Wireless Communications".
U.S. Appl. No. 62/202,642, filed Aug. 7, 2015, entitled "Allocating Resources for Wireless Sidelink Direct Communications".
3GPP TS 36.211 V12.4.0, Technical Specification; $3^{rd}$ Generation Partnership Project; Technical Specification Group Radio Access Network; Evolved Universal Terrestrial Radio Access (E-UTRA); Physical Channels and Modulation (Release 12) (Dec. 2014).
3GPP TR 36.806 V9.0.0, Technical Report, $3^{rd}$ Generation Partnership Project; Technical Specification Group Radio Access Network; Evolved Universal Terrestrial Radio Access (E-UTRA); Relay Architectures for E-UTRA (LTE-Advanced) (Release 9) (Mar. 2010).
3GPP TS 36.116 V11.0.0, Technical Specification; $3^{rd}$ Generation Partnership Project; Technical Specification Group Radio Access Network; Evolved Universal Terrestrial Radio Access (E-UTRA); Relay Radio Transmission and Reception (Release 11) (Sep. 2012).
3GPP TS 36.216 V10.0.0, Technical Specification; $3^{rd}$ Generation Partnership Project; Technical Specification Group Radio Access Network; Evolved Universal Terrestrial Radio Access (E-UTRA); Physical Layer for Relaying Operation (Release 10) (Sep. 2010).
U.S. Appl. No. 62/034,125, filed Aug. 6, 2014, entitled "Synchronization Signals for Device-to-Device Communcations".
3GPP TS 23.202 V12.0.0, $3^{rd}$ Generation Partnership Project; Technical Specification Group Core Network and Terminals; Circuit Switched Data Bearer Services (Release 12) (Oct. 2014).
3GPP TR 36.843 V12.0.1, Technical Report; $3^{rd}$ Generation Partnership Project; Technical Specification Group Radio Access Network; Study on LTE Device to Device Proximity Services; Radio Aspects (Release 12) (Mar. 2014).
3GPP TS 36.331 V10.0.0, Technical Specification; $3^{rd}$ Generation Partnership Project; Technical Specification Group Radio Access Network; Evolved Universal Terrestrial Radio Access (E-UTRA); Radio Resource Control (RRC); Protocol Specification (Release 10) (Dec. 2010).
3GPP TS 36.304 V10.0.0, Technical Specification; $3^{rd}$ Generation Partnership Project; Technical Specification Group Radio Access Network; Evolved Universal Terrestrial Radio Access (E-UTRA); User Equipment (UE) Procedures in Idle Mode (Release 10) (Dec. 2010).
3GPP TS 23.303 V12.0.0, Technical Specification, $3^{rd}$ Generation Partnership Project; Technical Specification Group Services and System Aspects; Proximity-based Service (ProSe); Stage 2 (Release 12) (Feb. 2014).
3GPP TS 36.133 V10.0.0, Technical Specification; $3^{rd}$ Generation Partnership Project; Technical Specification Group Radio Access Network; Evolved Universal Terrestrial Radio Access (E-UTRA); Requirements for Support of Radio Resource Management (Release 10) (Oct. 2010).
Office Action dated Jun. 5, 2017 in U.S. Appl. No. 14/995,339.
Final Office Action dated Dec. 29, 2017 in U.S. Appl. No. 14/995,339.
RP-160677, 3GPP TSG RAN Meeting #71, "New SI: Further Enhancements LTE Device-to-Device, UE-to-Network Relays for Wearables", Qualcomm Incorporated, Intel Corporation, Huawei, HiSilicon, LG Electronics Inc., Gothenburg, Sweden, Mar. 7-10, 2016.
3GPP TR 36.888, V12.0.0, $3^{rd}$ Generation Partnership Project; Technical Specification Group Radio Access Network; Study on provision of low-cost Machine-Type Communications (MTC) User Equipments (UEs) based on LTE (Release 12) (Jun. 2013).
RP-161303, 3GPP TSG RAN Meeting #72, Qualcomm Incorporated, Intel, Huawei, HiSilicon, LG Electronics Inc., "Revision of SI: Further Enhancements to LTE Device to Device, UE to Network Relays for IoT and Wearables", Busan, Korea, Jun. 13-16, 2016.
R2-165599, 3GPP TSG-RAN2 Meeting #95, "Relaying options of CP/UP", LG Electronics Inc., Gothenburg, Sweden, Aug. 22-26, 2016.
3GPP TS 36.331, V 13.2.0, $3^{rd}$ Generation Partnership Project; Technical Specification Group Radio Access Network; Evolved Universal Terrestrial Radio Access (E-UTRA); Radio Resource Control (RRC); Protocol specification (Release 13) (Jun. 2016).
3GPP TS 36.304, V 13.2.0, $3^{rd}$ Generation Partnership Project; Technical Specification Group Radio Access Network; Evolved Universal Terrestrial Radio Access (E-UTRA); User Equipment (UE) procedures in idle mode (Release 13) (Jun. 2016).
3GPP TS 36.300, V 13.4.0, $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13) (Jun. 2016).
R2-165254, 3GPP TSG-RAN WG2 Meeting #95, "Considerations on the evolved UE-to-Network Relay scenario and architecture", ZTE, Gothenburg, Sweden, Aug. 22-26, 2016.
3GPP TS 36.213, V 13.2.0, $3^{rd}$ Generation Partnership Project; Technical Specification Group Radio Access Network; Evolved Universal Terrestrial Radio Access (E-UTRA); Physical layer procedures (Release 13) (Jun. 2016).
Office Action dated Oct. 3, 2018 in U.S. Appl. No. 14/995,339.

* cited by examiner

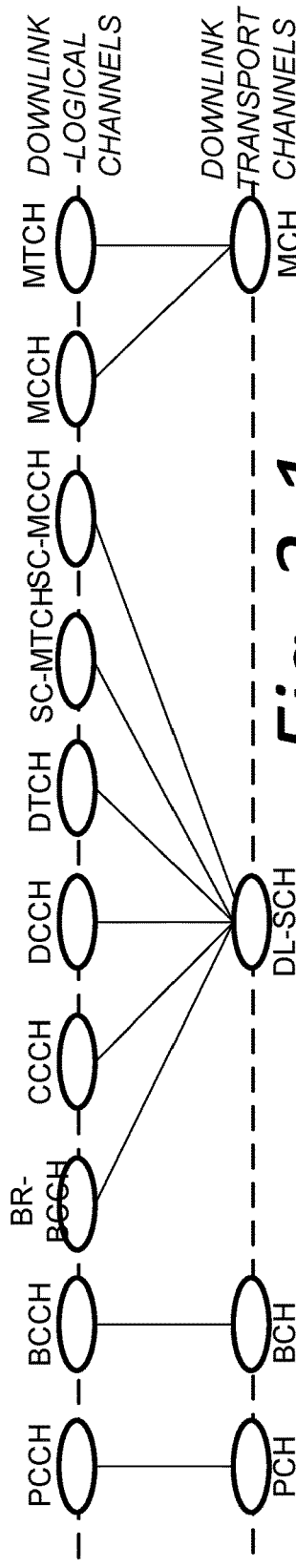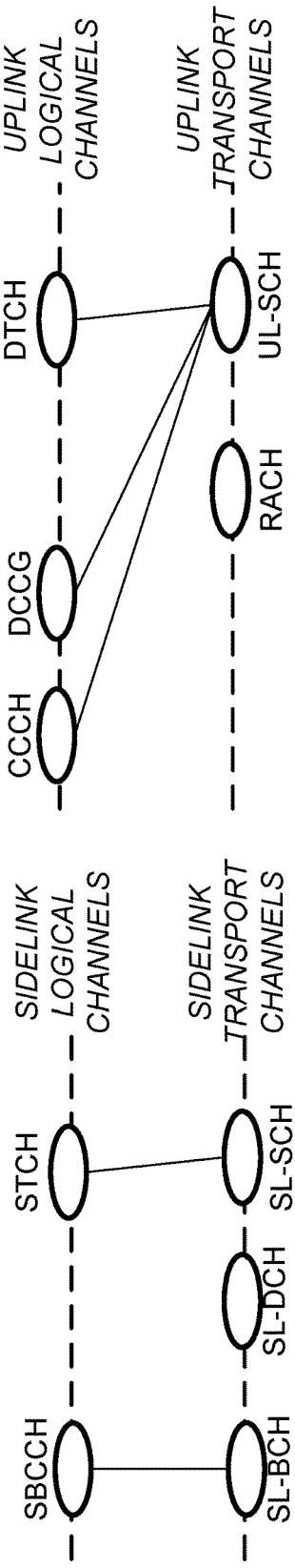

PROVIDING AND OBTAINING SYSTEM INFORMATION FOR REMOTE WIRELESS TERMINAL

This application claims the priority and benefit of U.S. Provisional Patent Application 62/401,803, filed Sep. 29, 2016, entitled "PROVIDING AND OBTAINING SYSTEM INFORMATION FOR REMOTE WIRELESS TERMINAL", which is incorporated by reference herein in its entirety.

TECHNICAL FIELD

The technology relates to wireless communications, and particularly to methods and apparatus for requesting, transmitting, and using system information (SI) in wireless communications.

BACKGROUND

In wireless communication systems, a radio access network generally comprises one or more access nodes (such as a base station) which communicate on radio channels over a radio or air interface with plural wireless terminals. In some technologies such a wireless terminal is also called a User Equipment (UE). A group known as the 3rd Generation Partnership Project ("3GPP") has undertaken to define globally applicable technical specifications and technical reports for present and future generation wireless communication systems. The 3GPP Long Term Evolution ("LTE") and 3GPP LTE Advanced (LTE-A) are projects to improve an earlier Universal Mobile Telecommunications System ("UMTS") mobile phone or device standard in a manner to cope with future requirements.

In typical cellular mobile communication systems, the base station broadcasts on the radio channels certain information which is required for mobile stations to access to the network. In Long-Term Evolution (LTE) and LTE Advanced (LTE-A), such information is called "system information" ("SI"). Each access node, such as an evolved NodeB ("eNB"), broadcasts such system information to its coverage area via several System Information Blocks (SIBs) on downlink radio resources allocated to the access node.

In RAN#71, the study item (SI) "Further Enhancements LTE Device to Device, UE to Network Relays for IoT and Wearables" (also called Further enhanced D2D (FeD2D)) was agreed. See, e.g., RP-160677, "New SI: Further Enhancements LTE Device-to-Device, UE-to-Network Relays for Wearables", Qualcomm Incorporated, Intel Corporation, Huawei, HiSilicon, LG Electronics Inc., Gothenburg, Sweden, Mar. 7-10, 2016, incorporated herein by reference. The main focus of this SI is to address the issue of power efficiency for evolved remote UEs (e.g., Internet of Things (IoT)), such as machine type communication (MTC) [See, e.g., 3GPP TR 36.888, V12.0.0, "Study on provision of low-cost Machine-Type Communications (MTC) User Equipments (UEs) based on LTE, incorporated herein by reference] or narrowband (NB-IoT), or wearable devices).

To achieve this goal, the following objectives were proposed:
  study and evaluate a generic Layer 2 evolved UE-to-Network Relay (eUTNR) architecture, including methods for the network to identify, address, and reach an evolved Remote UE via an evolved ProSe UE-to-Network Relay (UTNR) UE:
  Study the possibility of a common solution supporting the following use cases:
   a. UE to network relaying over non-3GPP access (Bluetooth/WiFi).
   b. UE to network relaying over LTE sidelink.
   c. Unidirectional and bidirectional UE to network relay.

In order to make further progress in this study, the following coverage scenarios were agreed in RAN#72 [See, e.g., RP-161303, Further Enhancements to LTE Device to Device, UE to Network Relays for IoT and Wearables, RAN#72, Korea, June 2016, incorporated herein by reference]:
  Evolved Remote UE and evolved ProSe UE-to-Network Relay UE are EUTRAN incoverage.
  Evolved ProSe UE-to-Network Relay UE has a Uu connection to the eNB and evolved Remote UE can be in enhanced coverage. "Enhanced coverage" implies that the UE is connecting to the network via NB-IOT or Rel-13 MTC in CE mode.
  Evolved ProSe UE-to-Network Relay UE is in EUTRAN coverage and evolved Remote UE is out of coverage of EUTRAN.

Relay nodes (RN) play important roles in LTE Rel-13 device to device (D2D) communications, as it can help extend network coverage. In FeD2D, 3GPP RAN2 is studying enhancements on UE-to-Network relay to support commercial use cases, e.g. IoT and wearable devices, etc. One aspect being considered is the QoS support of the UE-to-Network relay over LTE sidelink. Another aspect is generic Layer 2 evolved UE-to-Network Relay architecture study, instead of Layer 3 UTNR in Rel-13, so as to let network be able to control and charge the evolved remote UEs. Another aspect is for evolved remote UE energy saving, especially for NB-IoT and MTC UEs in their enhanced coverage, large amount of repetitions have to be done in order to maintain the coverage, which not only waste lots of spectrum resources, but also consumes lots of power for evolved remote UEs. Transmission via Evolved UTNR can help deep coverage evolved remote UE save power, and out of coverage evolved remote UE being able to connect to the network.

Both user plane (UP) and control plane (CP) can be relayed through evolved UTNR. Reading the broadcast information (e.g. system information) over Uu interface seems to be burdensome to the UE if many repetitions of the UEs are required to read those broadcast information. In the current 3GPP, very few simple and high level discussions were made on this topic. The question has been raised that, since relay UE does not know the category of the remote UE, the relay UE does not know which system information blocks are necessary for remote UE. See, e.g., R2-165599, "Relaying options of CP/UP", LG Electronics Inc., Gothenburg, Sweden, Aug. 22-26, 2016, incorporated herein by reference. Thus, with respect to a remote UE, "it needs to be evaluated whether the benefit of reception of many repetitions is comparable to unnecessary SIB reception".

In addressing problems posed above and particularly issues regarding system information, it must be remembered that, while the evolved UTNR should always be in coverage, the evolved remote UE can be in coverage, or in enhanced coverage, or out of coverage, with each of these differing scenarios having different issues in terms of both power consumption and in the evolved UE reading system information.

What is needed, therefore, and an example object of the technology disclosed herein, are methods, apparatus, and techniques for enabling a remote UE/evolved remote UE to obtain system information.

SUMMARY

In one of its example aspects the technology disclosed herein concerns a UE-to-Network Relay (UTNR) node comprising a radio access network. The UTNR node comprises receiver circuitry, processor circuitry, and transmitter circuitry. The receiver circuitry is configured to obtain system information over a Uu interface from a base station node of the radio access network. The processor circuitry is arranged to configure control information for transmission to a remote UE and to include in the control information all system information which is available or decodable from the base station. The transmitter circuitry is configured to transmit the control information to the remote UE over a non-Uu radio interface.

In an example embodiment and mode the non-Uu interface is a PC5 interface.

In an example embodiment and mode the non-Uu interface is a non-3GPP interface.

In an example embodiment and mode the processor circuitry is arranged to include the all system information, available or decodable from the base station, in the control information without regard of category type of the remote UE.

In one of its example aspects the technology disclosed herein concern a UE-to-Network Relay (UTNR) node comprising a radio access network. The UTNR node comprises receiver circuitry, processor circuitry, and transmitter circuitry. The receiver circuitry is configured to receive, from a remote UE over a non-Uu radio interface, a request message configured to obtain system information, the request message including request message content related to system information suitable for the remote UE. The processor circuitry is arranged to configure a response message including the system information suitable for the remote UE in dependence on the message content. The transmitter circuitry is configured to transmit the response message to the remote UE over the non-Uu radio interface.

In an example embodiment and mode the request message content is category information of the remote UE, and wherein the processor circuitry is configured to determine the system information suitable for the remote UE based on the category information of the remote UE.

In an example embodiment and mode the request message content comprises identification of type(s) of system information suitable for the remote UE.

In an example embodiment and mode the request message content comprises a list of one or more system information blocks suitable for the remote UE.

In an example embodiment and mode the receiver circuitry is further configured to obtain system information over a Uu interface from a base station node of the radio access network during a system information acquisition window comprising plural repetitions of transmission of the system information over the Uu interface; and the processor is arranged to configure the response message upon completion of the system information acquisition window.

In an example embodiment and mode the receiver circuitry is further configured to obtain system information over a Uu interface from a base station node of the radio access network during a system information acquisition window comprising plural repetitions of transmission of the system information over the Uu interface; and the processor is arranged to configure response message prior to completion of the system information acquisition window.

In an example embodiment and mode the non-Uu interface is a PC5 interface.

In an example embodiment and mode the non-Uu interface is a non-3GPP interface.

In an example embodiment and mode the transmitter circuitry is further configured to transmit an indication that the UE-to-Network Relay (UTNR) node is ready to transmit system information over the non-Uu interface, and the receiver circuitry is configured to thereafter receive, from the remote UE over the non-Uu radio interface, the request message including the request message content related to the system information suitable for the remote UE.

In one of its example aspects the technology disclosed herein concerns a UE-to-Network Relay (UTNR) node comprising a radio access network. The UTNR node comprises transmitter circuitry and processor circuitry. The transceiver circuitry is configured to transmit and receive first protocol layer messages comprising a UE sidelink discovery procedure over a non-UU interface with a remote UE. The processor circuitry configured to process in the UE sidelink discovery procedure a message of a first protocol layer whereby the processor circuitry determines type(s) of system information suitable for the remote UE. The transceiver circuitry is further configured to transmit the type(s) of system information suitable for the remote UE over the non-Uu interface using a second protocol layer, the second protocol layer being lower than the first protocol.

In an example embodiment and mode the message of the first protocol layer comprises a request message transmitted by the remote UE including request message content related to system information suitable for the remote UE.

In an example embodiment and mode the request message content is category information of the remote UE, and the processor circuitry is configured to determine the system information suitable for the remote UE based on the category information of the remote UE.

In an example embodiment and mode the request message content comprises identification of type(s) of system information suitable for the remote UE.

In one of its example aspects the technology disclosed herein concerns a UE-to-Network Relay (UTNR) node comprising a radio access network. The UTNR node comprises receiver circuitry, processor circuitry, and transmitter circuitry. The receiver circuitry is configured to obtain system information including a master system information block and other system information block information over a Uu interface from a base station node of the radio access network. The processor circuitry is arranged to prepare a sidelink master system block for transmission to a remote UE by including at least some of the other system block information obtained over the Uu interface in a vacant portion of the master system information block, the included other system block information being pertinent to sidelink communications. The transmitter circuitry is configured to transmit the sidelink master system information block to the remote UE over a non-Uu radio interface.

In an example embodiment and mode the vacant portion of the master system information block comprises reserved bits of the master system information block.

In one of its example aspects the technology disclosed herein concerns a UE-to-Network Relay (UTNR) node comprising a radio access network. The UTNR node comprises receiver circuitry configured to obtain system information including a master system information block and other system information block information over a Uu interface from a base station node of the radio access network; processor circuitry arranged to prepare content of a sidelink broadcast channel to include at least a portion of the system information obtained over the Uu interface and to prepare content of a sidelink shared channel to include another portion of the system information; transmitter circuitry configured to transmit the sidelink broadcast channel and the sidelink shared channel to the remote UE over a non-Uu radio interface.

In an example embodiment and mode the at least a portion of the system information obtained over the Uu interface is system information obtained from a master system information block received over the Uu interface; and wherein the another portion of the system information obtained over the Uu interface is system information other than master system information block information.

In an example embodiment and mode the processor circuitry is arranged to: prepare content a sidelink broadcast transport channel to include at least a portion of the system information obtained over the Uu interface and a sidelink shared transport channel to include another portion of the system information; map the sidelink broadcast transport channel to a sidelink broadcast physical channel and to map the sidelink shared transport channel to a sidelink shared physical channel. The transmitter circuitry is configured to transmit the sidelink broadcast physical channel and the sidelink shared physical channel to the remote UE over the non-Uu radio interface.

In one of its example aspects the technology disclosed herein concerns a UE-to-Network Relay (UTNR) node comprising a radio access network. The UTNR node comprises receiver circuitry, processor circuitry, and transmitter circuitry. The receiver circuitry is configured to obtain system information including a master system information block and other system information block information over a Uu interface from a base station node of the radio access network. The processor circuitry is arranged to include the system information obtained over the Uu interface in a sidelink shared channel. The transmitter circuitry is configured to transmit the sidelink shared channel to the remote UE over a non-Uu radio interface.

In one of its example aspects the technology disclosed herein concerns a user equipment (UE) comprising receiver circuitry and processor circuitry. The receiver circuitry is configured to obtain system information over a non-Uu interface from a UE-to-Network Relay (UTNR) node, the system information obtained over the non-Uu interface including all system information which is available to the UE-to-Network Relay (UTNR) node or decodable by the UE-to-Network Relay (UTNR) node from a base station over a Uu interface. The processor circuitry is arranged to use the system information obtained over the non-Uu interface in conjunction with sidelink communications.

In an example embodiment and mode the non-Uu interface is a PC5 interface.

In an example embodiment and mode the non-Uu interface is a non-3GPP interface.

In one of its example aspects the technology disclosed herein concerns a user equipment (UE) comprising processor circuitry, transmitter circuitry, and receiver circuitry. The processor circuitry is arranged to generate a request message configured to obtain system information, the request message including request message content related to system information suitable for the UE. The transmitter circuitry is configured to transmit the request message to a UE-to-Network Relay (UTNR) node over a non-Uu interface. The receiver circuitry is configured to receive from the UE-to-Network Relay (UTNR) node over the non-Uu interface a response message comprising the system information suitable for the UE.

In an example embodiment and mode the request message content is category information of the UE.

In an example embodiment and mode the request message content comprises identification of type(s) of system information suitable for the UE.

In an example embodiment and mode the request message content comprises a list of one or more system information blocks suitable for the UE.

In an example embodiment and mode the non-Uu interface is a PC5 interface.

In an example embodiment and mode the non-Uu interface is a non-3GPP interface.

In an example embodiment and mode the receiver circuitry is further configured to receive an indication that the UE-to-Network Relay (UTNR) node is ready to transmit system information over the non-Uu interface, and wherein the transmitter circuitry is configured to thereafter transmit, from the UE over the non-Uu radio interface, the request message including the request message content related to the system information suitable for the UE.

In one of its example aspects the technology disclosed herein concerns a user equipment (UE) comprising transmitter circuitry and processor circuitry. The transceiver circuitry is configured to transmit and receive first protocol layer messages comprising a UE sidelink discovery procedure over a non-UU interface with a UE-to-Network Relay (UTNR) node. The processor circuitry is configured to include in the UE sidelink discovery procedure a message of a first protocol layer configured to indicate type(s) of system information suitable for the UE. The transceiver circuitry is further configured to receive the type(s) of system information suitable for the UE over the non-Uu interface from the UE-to-Network Relay (UTNR) node using a second protocol layer, the second protocol layer being lower than the first protocol.

In an example embodiment and mode the message of the first protocol layer comprises a request message transmitted by the UE including request message content related to system information suitable for the UE.

In an example embodiment and mode the request message content is category information of the UE.

In an example embodiment and mode the request message content comprises identification of type(s) of system information suitable for the remote UE.

In one of its example aspects the technology disclosed herein concerns a user equipment (UE) comprising receiver circuitry and processor circuitry. The receiver circuitry is configured to receive a sidelink master system information block over a non-Uu radio interface from a UE-to-Network Relay (UTNR) node. The processor circuitry is configured to obtain from the sidelink master system information block both a master system information block and other system information block information received by the UE-to-Network Relay (UTNR) node over a Uu interface from a base station node of the radio access network, the other system information block information being included in a vacation portion of the master system information block received by the UE-to-Network Relay (UTNR) node over the Uu interface.

In an example embodiment and mode the vacant portion of the master system information block comprises reserved bits of the master system information block.

In one of its example aspects the technology disclosed herein concerns a user equipment (UE) comprising receiver circuitry and processor circuitry. The receiver circuitry is configured to receive both a sidelink broadcast channel and a sidelink shared channel over a non-Uu radio interface from a UE-to-Network Relay (UTNR) node. The processor circuitry is configured: to obtain from the sidelink broadcast channel content of at least a portion of system information block received by the UE-to-Network Relay (UTNR) node over a Uu interface; and to obtain from the sidelink shared channel content of at least another portion of system information received by the UE-to-Network Relay (UTNR) node over the Uu interface.

In an example embodiment and mode the at least a portion of the system information obtained over the Uu interface is system information obtained from a master system information block received over the Uu interface; and wherein the another portion of the system information obtained over the Uu interface is system information other than master system information block information.

In an example embodiment and mode the processor circuitry is arranged to obtain from a sidelink broadcast physical channel the at least a portion of the system information obtained over the Uu interface and to obtain from a sidelink shared physical channel the another portion of the system information.

In one of its example aspects the technology disclosed herein concerns a user equipment (UE) comprising receiver circuitry and processor circuitry. The receiver circuitry is configured to receive a sidelink shared channel over a non-Uu radio interface from a UE-to-Network Relay (UTNR) node. The processor circuitry configured to obtain from the sidelink shared channel content system information received by the UE-to-Network Relay (UTNR) node over the Uu interface.

In one of its example aspects the technology disclosed herein concerns a method in a UE-to-Network Relay (UTNR) node comprising a radio access network. The method comprises: obtaining system information over a Uu interface from a base station node of the radio access network; using processor circuitry to configure control information for transmission to a remote UE and to include in the control information all system information which is available or decodable from the base station; and, transmitting the control information to the remote UE over a non-Uu radio interface.

In one of its example aspects the technology disclosed herein concerns a method in a UE-to-Network Relay (UTNR) node comprising a radio access network. The method comprises: receiving, from a remote UE over a non-Uu radio interface, a request message configured to obtain system information, the request message including request message content related to system information suitable for the remote UE; using processor circuitry to configure a response message including the system information suitable for the remote UE in dependence on the message content; and, transmitting the response message to the remote UE over the non-Uu radio interface.

In an example embodiment and mode the request message content is category information of the remote UE, and wherein the method further comprises the processor circuitry determining the system information suitable for the remote UE based on the category information of the remote UE.

In an example embodiment and mode the request message content comprises identification of type(s) of system information suitable for the remote UE.

In an example embodiment and mode the request message content comprises a list of one or more system information blocks suitable for the remote UE.

In an example embodiment and mode the method further comprises: transmitting an indication that the UE-to-Network Relay (UTNR) node is ready to transmit system information over the non-Uu interface, and thereafter receiving, from the remote UE over the non-Uu radio interface, the request message including the request message content related to the system information suitable for the remote UE.

In one of its example aspects the technology disclosed herein concerns a method in UE-to-Network Relay (UTNR) node comprising a radio access network, the method comprising: transmitting and receiving first protocol layer messages comprising a UE sidelink discovery procedure over a non-UU interface with a remote UE; processor circuitry processing in the UE sidelink discovery procedure a message of a first protocol layer whereby the processor circuitry determines type(s) of system information suitable for the remote UE; and, transmitting the type(s) of system information suitable for the remote UE over the non-Uu interface using a second protocol layer, the second protocol layer being lower than the first protocol.

In an example embodiment and mode the message of the first protocol layer comprises a request message transmitted by the remote UE including request message content related to system information suitable for the remote UE.

In an example embodiment and mode the request message content is category information of the remote UE, and wherein the method further comprises the processor circuitry determining the system information suitable for the remote UE based on the category information of the remote UE.

In an example embodiment and mode the request message content comprises identification of type(s) of system information suitable for the remote UE.

In one of its example aspects the technology disclosed herein concerns a method UE-to-Network Relay (UTNR) node comprising a radio access network. The method comprises: obtaining system information including a master system information block and other system information block information over a Uu interface from a base station node of the radio access network; preparing a sidelink master system block for transmission to a remote UE by including at least some of the other system block information obtained over the Uu interface in a vacant portion of the master system information block, the included other system block information being pertinent to sidelink communications; and, transmitting the sidelink master system information block to the remote UE over a non-Uu radio interface.

In an example embodiment and mode the vacant portion of the master system information block comprises reserved bits of the master system information block.

In one of its example aspects the technology disclosed herein concerns a method in a UE-to-Network Relay (UTNR) node comprising a radio access network. The method comprises: obtaining system information including a master system information block and other system information block information over a Uu interface from a base station node of the radio access network; using processor circuitry preparing content of a sidelink broadcast channel to include at least a portion of the system information obtained over the Uu interface and to prepare content of a sidelink shared channel to include another portion of the system information; and, transmitting the sidelink broadcast channel and the sidelink shared channel to the remote UE over a non-Uu radio interface.

In an example embodiment and mode the method further comprises obtaining the at least a portion of the system information obtained over the Uu interface from a master system information block received over the Uu interface; and further comprises obtaining the another portion of the system information over the Uu interface is system information other than master system information block information.

In an example embodiment and mode the method further comprises the processor circuitry: preparing content a sidelink broadcast transport channel to include at least a portion of the system information obtained over the Uu interface and a sidelink shared transport channel to include another portion of the system information; mapping the sidelink broadcast transport channel to a sidelink broadcast physical channel and mapping the sidelink shared transport channel to a sidelink shared physical channel. The transmitter circuitry transmits the sidelink broadcast physical channel and the sidelink shared physical channel to the remote UE over the non-Uu radio interface.

In one of its example aspects the technology disclosed herein concerns a method in a UE-to-Network Relay (UTNR) node comprising a radio access network. The method comprises: obtaining system information including a master system information block and other system information block information over a Uu interface from a base station node of the radio access network; using processor circuitry to include the system information obtained over the Uu interface in a sidelink shared channel; and, transmitting the sidelink shared channel to the remote UE over a non-Uu radio interface.

In one of its example aspects the technology disclosed herein concerns a method in a user equipment (UE) comprising: obtaining system information over a non-Uu interface from a UE-to-Network Relay (UTNR) node, the system information obtained over the non-Uu interface including all system information which is available to the UE-to-Network Relay (UTNR) node or decodable by the UE-to-Network Relay (UTNR) node from a base station over a Uu interface; and, processor circuitry arranged to use the system information obtained over the non-Uu interface in conjunction with sidelink communications.

In one of its example aspects the technology disclosed herein concerns a method in a user equipment (UE) comprising: using processor circuitry to generate a request message configured to obtain system information, the request message including request message content related to system information suitable for the UE; transmitting the request message to a UE-to-Network Relay (UTNR) node over a non-Uu interface; and, receiving from the UE-to-Network Relay (UTNR) node over the non-Uu interface a response message comprising the system information suitable for the UE.

In an example embodiment and mode the request message content is category information of the UE.

In an example embodiment and mode the request message content comprises identification of type(s) of system information suitable for the UE.

In an example embodiment and mode the request message content comprises a list of one or more system information blocks suitable for the UE.

In an example embodiment and mode method further comprises receiving an indication that the UE-to-Network Relay (UTNR) node is ready to transmit system information over the non-Uu interface, and thereafter transmitting, from the UE over the non-Uu radio interface, the request message including the request message content related to the system information suitable for the UE.

In one of its example aspects the technology disclosed herein concerns a method in user equipment (UE) comprising: transmitting and receiving first protocol layer messages comprising a UE sidelink discovery procedure over a non-UU interface with a UE-to-Network Relay (UTNR) node; including in the UE sidelink discovery procedure a message of a first protocol layer configured to indicate type(s) of system information suitable for the UE; receiving the type(s) of system information suitable for the UE over the non-Uu interface from the UE-to-Network Relay (UTNR) node using a second protocol layer, the second protocol layer being lower than the first protocol.

In an example embodiment and mode the message of the first protocol layer comprises a request message transmitted by the UE including request message content related to system information suitable for the UE.

In an example embodiment and mode the request message content is category information of the UE.

In an example embodiment and mode the request message content comprises identification of type(s) of system information suitable for the remote UE.

In one of its example aspects the technology disclosed herein concerns a method in a user equipment (UE) comprising: receiving a sidelink master system information block over a non-Uu radio interface from a UE-to-Network Relay (UTNR) node; obtaining from the sidelink master system information block both a master system information block and other system information block information received by the UE-to-Network Relay (UTNR) node over a Uu interface from a base station node of the radio access network, the other system information block information being included in a vacation portion of the master system information block received by the UE-to-Network Relay (UTNR) node over the Uu interface.

In an example embodiment and mode the vacant portion of the master system information block comprises reserved bits of the master system information block.

In one of its example aspects the technology disclosed herein concerns a method in user equipment (UE) comprising: receiving both a sidelink broadcast channel and a sidelink shared channel over a non-Uu radio interface from a UE-to-Network Relay (UTNR) node; using processor circuitry to obtain from the sidelink broadcast channel content of at least a portion of system information block received by the UE-to-Network Relay (UTNR) node over a Uu interface; to obtain from the sidelink shared channel content of at least another portion of system information received by the UE-to-Network Relay (UTNR) node over the Uu interface.

In an example embodiment and mode the at least a portion of the system information obtained over the Uu interface is system information obtained from a master system information block received over the Uu interface; and wherein the another portion of the system information obtained over the Uu interface is system information other than master system information block information.

In an example embodiment and mode the method further comprises the processor circuitry obtaining from a sidelink broadcast physical channel the at least a portion of the system information obtained over the Uu interface and obtaining from a sidelink shared physical channel the another portion of the system information.

In one of its example aspects the technology disclosed herein concerns a method in a user equipment (UE) comprising: receiving a sidelink shared channel over a non-Uu radio interface from a UE-to-Network Relay (UTNR) node; and, using processor circuitry to obtain from the sidelink shared channel content system information received by the UE-to-Network Relay (UTNR) node over the Uu interface.

In one of its example aspects the technology disclosed herein concerns a user equipment (UE) comprising transmitter circuitry and processor circuitry. The transmitter circuitry is configured: to communicate over a Uu interface with a base station node when the UE is in network coverage or in enhanced coverage; and to communicate over a non-Uu interface with a UE-to-Network Relay (UTNR) when the UE is out of network coverage or in enhanced coverage. The processor circuitry is configured to determine whether the UE is to obtain system information over the Uu interface or over the non-Uu interface when the UE is in network coverage or in enhanced coverage. The transceiver is configured to obtain the system information in accordance with the determination.

In an example embodiment and mode the processor is configured to always obtain the system information over the Uu interface when the system information is available from over both the Uu interface and the non-Uu interface.

In an example embodiment and mode the processor is configured to obtain the system information over the non-Uu interface when the UE is a paired relationship with the UE-to-Network Relay (UTNR) node.

In an example embodiment and mode the paired relationship comprises a persistently maintained connection between the UE and the relay.

In an example embodiment and mode the paired relationship comprises the UE persistently monitoring the non-Uu interface with the UE-to-Network Relay (UTNR) node.

In an example embodiment and mode when the processor circuitry in unable to monitor both the Uu interface and the non-Uu interface, the processor is configured to determine the interface over which the UE receives system information as being the interface over which the UE is capable of receiving the system information.

In an example embodiment and mode the processor circuitry is configured to detect a physical layer problem or a radio link failure over the Uu interface and upon the detection is further configured obtain the system information over the non-Uu interface.

In an example embodiment and mode when the processor circuitry is configured to obtain an indication that the UE-to-Network Relay (UTNR) node detects a physical layer problem or a radio link failure over the Uu interface and thereupon to obtain the system information over the Uu interface or from another UTNR.

In one of its example aspects the technology disclosed herein concerns a user equipment (UE) comprising transceiver circuitry and processor circuitry. The transceiver circuitry is configured: to communicate over a Uu interface with a base station node when the UE is not in network coverage but is in enhanced coverage; and to communicate over a non-Uu interface with a UE-to-Network Relay (UTNR) when the UE is out of network coverage but is in enhanced coverage. The processor circuitry configured to determine whether the UE is to obtain system information over the Uu interface or over the non-Uu interface when the UE is not in network coverage but is in enhanced coverage. The transceiver is configured to obtain the system information in accordance with the determination.

In an example embodiment and mode the processor is configured to obtain the system information over the non-Uu interface when the UE is in enhanced coverage.

In an example embodiment and mode the processor is configured to obtain the system information over the non-Uu interface when the UE is in enhanced coverage Mode B.

In an example embodiment and mode the processor is configured to obtain the system information over the Uu interface when the UE is in enhanced coverage Mode A.

In an example embodiment and mode when the UE is in enhanced coverage Mode A the processor is configured to use criteria to make a determination whether to obtain the system information over the Uu interface or over the non-Uu interface.

In an example embodiment and mode the processor is configured to make the determination dependent upon a reference signal received power (RSRP) over the Uu interface.

In an example embodiment and mode the processor is configured to make the determination dependent upon a number of repetitions of the system information over the Uu interface.

In an example embodiment and mode the processor is configured to make the determination dependent upon a comparison of a reference signal received power (RSRP) over the Uu interface and a sidelink reference signal received power (S-RSRP) over the non-Uu interface.

In one of its example aspects the technology disclosed herein concerns a user equipment (UE) comprising a transceiver and processor circuitry. The transceiver is configured: to communicate over a Uu interface with a base station node when the UE is in enhanced coverage; and to communicate over a non-Uu interface with a UE-to-Network Relay (UTNR) when the UE is in enhanced coverage. The processor circuitry is configured to: obtain (1) system information over the Uu interface and (2) system information over the non-Uu interface when the UE is in enhanced coverage and use diversity combining of both (1) and (2) to determine system information.

In one of its example aspects the technology disclosed herein concerns a method in user equipment (UE) comprising: communicating over a Uu interface with a base station node when the UE is in network coverage or in enhanced coverage; communicating over a non-Uu interface with a UE-to-Network Relay (UTNR) when the UE is out of network coverage or in enhanced coverage; using processor circuitry to determine whether the UE is to obtain system information over the Uu interface or over the non-Uu interface when the UE is in network coverage or in enhanced coverage; and, obtaining the system information in accordance with the determination.

In an example embodiment and mode the method further comprises using the processor circuitry to always obtain the system information over the Uu interface when the system information is available from over both the Uu interface and the non-Uu interface.

In an example embodiment and mode the method further comprises using the processor circuitry to obtain the system information over the non-Uu interface when the UE is a paired relationship with the UE-to-Network Relay (UTNR) node.

In an example embodiment and mode the paired relationship comprises a persistently maintained connection between the UE and the relay.

In an example embodiment and mode the paired relationship comprises the UE persistently monitoring the non-Uu interface with the UE-to-Network Relay (UTNR) node In an example embodiment and mode method further comprises when the processor circuitry is unable to monitor both the Uu interface and the non-Uu interface, using the processor circuitry to determine the interface over which the UE receives system information as being the interface over which the UE is capable of receiving the system information.

In an example embodiment and mode the method further comprises the processor circuitry obtaining an indication of a physical layer problem or a radio link failure over the Uu interface and obtaining the system information over the non-Uu interface.

In an example embodiment and mode the method further comprises when the processor circuitry obtaining an indication that the UE-to-Network Relay (UTNR) node detects a physical layer problem or a radio link failure over the Uu interface and thereupon obtaining the system information over the Uu interface or from another UTNR.

In one of its example aspects the technology disclosed herein concerns a method in user equipment (UE) comprising: communicating over a Uu interface with a base station node when the UE is out of coverage but in enhanced coverage; and communicating over a non-Uu interface with a UE-to-Network Relay (UTNR) when the UE is out of network coverage or in enhanced coverage. The method further comprises using processor circuitry to determine whether the UE is to obtain system information over the Uu interface or over the non-Uu interface when the UE is out of network coverage BUT in enhanced coverage; and obtaining the system information in accordance with the determination.

In an example embodiment and mode the method further comprises using the processor circuitry to obtain the system information over the non-Uu interface when the UE is in enhanced coverage.

In an example embodiment and mode the method further comprise using the processor circuitry to obtain the system information over the non-Uu interface when the UE is in enhanced coverage Mode B.

In an example embodiment and mode the method further comprises using the processor circuitry to obtain the system information over the Uu interface when the UE is in enhanced coverage Mode A.

In an example embodiment and mode when the UE is in enhanced coverage Mode A, the method further comprises the processor circuitry using criteria to make a determination whether to obtain the system information over the Uu interface or over the non-Uu interface.

In an example embodiment and mode the method further comprises using the processor circuitry to make the determination dependent upon a reference signal received power (RSRP) over the Uu interface.

In an example embodiment and mode the method further comprises using the processor circuitry to make the determination dependent upon a number of repetitions of the system information over the Uu interface.

In an example embodiment and mode the method further comprises using the processor circuitry to make the determination dependent upon a comparison of a reference signal received power (RSRP) over the Uu interface and a sidelink reference signal received power (S-RSRP) over the non-Uu interface.

In one of its example aspects the technology disclosed herein concerns a method in user equipment (UE) comprising: communicating over a Uu interface with a base station node when the UE is in enhanced coverage; communicating over a non-Uu interface with a UE-to-Network Relay (UTNR) when the UE is in enhanced coverage; and using processor circuitry to: obtain (1) system information over the Uu interface and (2) system information over the non-Uu interface when the UE is in enhanced coverage and use diversity combining of both (1) and (2) to determine system information.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

FIG. 2-1 is a diagrammatic view of mapping between downlink transport channels and downlink physical channels.

FIG. 2-2 is a diagrammatic view of mapping between uplink transport channels and uplink physical channels.

FIG. 2-3 is a diagrammatic view of mapping between sidelink transport channels and sidelink physical channels.

FIG. 2-4 is a diagrammatic view of mapping between downlink transport channels and downlink narrowband physical channels.

FIG. 2-5 is a diagrammatic view of mapping between uplink transport channels and uplink narrowband physical channels.

FIG. 3-1 is a diagrammatic view of mapping between downlink logical channels and downlink transport channels.

FIG. 3-2 is a diagrammatic view of mapping between Sidelink logical channels and Sidelink transport channels.

FIG. 3-3 is a diagrammatic view of mapping between uplink logical channels and uplink transport channels.

FIG. 4 is a diagrammatic view showing system information acquisition normally.

FIG. 5-1 through FIG. 5-4 are schematic views of communications networks wherein a remote/evolved remote UE obtains system information according to differing techniques.

FIG. 6-1 through FIG. 6-4 are flowcharts showing basic, representative acts or steps performed by UE-to-Network Relay (UTNR) nodes of the respective networks of FIG. 5-1 through FIG. 5-4.

FIG. 7-1 through FIG. 7-4 are flowcharts showing basic, representative acts or steps performed by remote/evolved remote UEs of the respective networks of FIG. 5-1 through FIG. 5-4.

FIG. 8-1 through FIG. 8-3 are schematic views of communications networks wherein system information is transported to a remote/evolved remote UE according to differing techniques.

FIG. 9-1 through FIG. 9-3 are flowcharts showing basic, representative acts or steps performed by UE-to-Network Relay (UTNR) nodes of the respective networks of FIG. 8-1 through FIG. 8-4.

FIG. 10-1 through FIG. 10-3 are flowcharts showing basic, representative acts or steps performed by remote/evolved remote UEs of the respective networks of FIG. 8-1 through FIG. 8-3.

DETAILED DESCRIPTION

Figure 1:
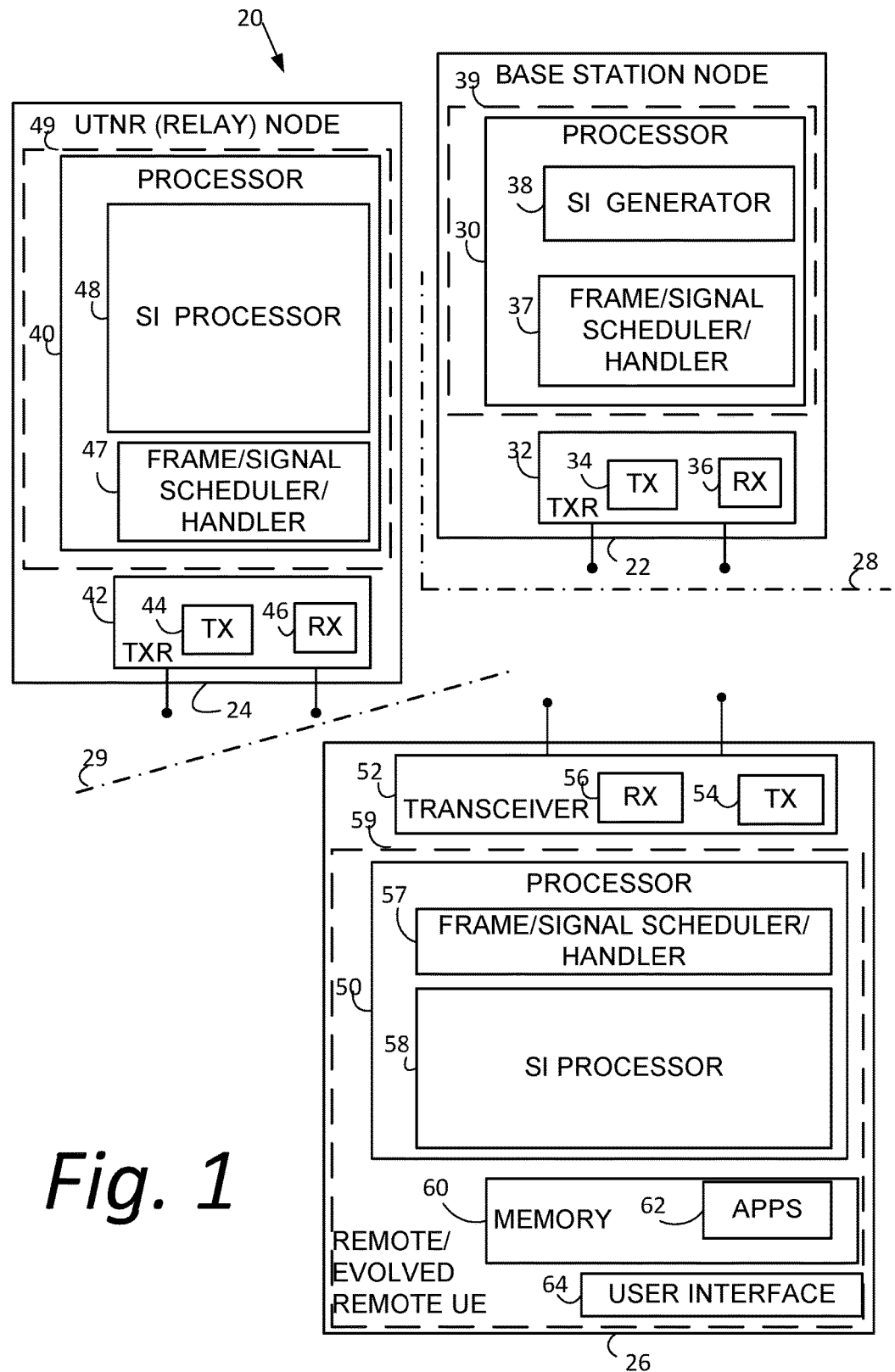
FIG. 1 is a schematic view of a generic communications networks wherein a remote/evolved remote UE obtains system information.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

A. Overview

A.1 Select Terminology

As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc.

As used herein, the term "user equipment (UE)" or "wireless terminal" can refer to any electronic device used to communicate voice and/or data via a telecommunications system, such as (but not limited to) a cellular network. Other terminology may be used to refer to user equipment (UE) and non-limiting examples of such devices can include wireless terminal, mobile station, mobile device, access terminal, subscriber station, mobile terminal, remote station, user terminal, terminal, subscriber unit, cellular phones, smart phones, personal digital assistants ("PDAs"), laptop computers, netbooks, e-readers, wireless modems, etc.

As used herein, the term "access node", "node", or "base station" can refer to any device or group of devices that facilitates wireless communication or otherwise provides an interface between a wireless terminal and a telecommunications system. A non-limiting example of a base station can include, in the 3GPP specification, a Node B ("NB"), an enhanced Node B ("eNB"), a gNB (base station for New Radio (NR)), a home eNB ("HeNB") or some other similar terminology. Another non-limiting example of a base station is an access point. An access point may be an electronic device that provides access for wireless terminal to a data network, such as (but not limited to) a Local Area Network ("LAN"), Wide Area Network ("WAN"), the Internet, etc. Although some examples of the systems and methods disclosed herein may be described in relation to given standards (e.g., 3GPP Releases 8, 9, 10, 11, 12, and/or or higher), the scope of the present disclosure should not be limited in this regard. At least some aspects of the systems and methods disclosed herein may be utilized in other types of wireless communication systems.

As used herein, the term "telecommunication system" or "communications system" can refer to any network of devices used to transmit information. A non-limiting example of a telecommunication system is a cellular network or other wireless communication system.

As used herein, the term "cellular network" can refer to a network distributed over cells, each cell served by at least one fixed-location transceiver, such as a base station. A "cell" may be any communication channel that is specified by standardization or regulatory bodies to be used for International Mobile Telecommunications-Advanced ("IMTAdvanced"). All or a subset of the cell may be adopted by 3GPP as licensed bands (e.g., frequency band) to be used for communication between a base station, such as a Node B, and a UE terminal. A cellular network using licensed frequency bands can include configured cells. Configured cells can include cells of which a UE terminal is aware and in which it is allowed by a base station to transmit or receive information.

As used herein, the term "Bandwidth Reduced" refers to operation in downlink and uplink with a limited channel bandwidth of 6 PRBs. which practically means Machine Type Communication (MTC) service (Channel bandwidth limited to 1.4 MHz).

As used herein, "NB-IoT" ("Narrowband Internet of Things") allows access to network services via E-UTRA with a channel bandwidth limited to 180 kHz. (1 PRB)

As used herein, a NB-IoT UE is a user equipment (UE) that uses NB-IoT.

As used herein, "sidelink" is a UE to UE interface for sidelink communication and sidelink discovery. The sidelink corresponds to the PC5 interface as defined in TS 23.303, incorporated herein by reference.

As used herein, "sidelink communication" is a functionality enabling ProSe Direct Communication as defined in TS 23.303, between two or more nearby UEs, using E-UTRA technology but not traversing any network node.

As used herein, "sidelink discovery" is a functionality enabling ProSe Direct Discovery as defined in TS 23.303 [68], using E-UTRA technology but not traversing any network node.

A.2 Example Aspects

In some of its example aspects the technology disclosed herein provides flexible and systematic methods for system information transmission/relaying to remote UEs, such as IoT and wearable based device to device communications, and may have advantages such as UE power efficiency, for example.

In some of its example aspects the technology disclosed herein combines the existing sidelink broadcast channel re-design with the system information relaying so as to minimize the design of system information relaying.

In some of its example aspects the technology disclosed herein provides on demand system information, so as to let relaying UE only transmit useful system information to remote UE, so as to minimize the remote UE's power consumption reading useless system information, as well as saving power and resources of relaying UE transmitting useless system information.

In some of its example aspects the technology disclosed herein, when the remote UE is in different coverage situations, different designs are provided A.3 Example Network Hardware FIG. 1 shows a generic example embodiment and mode of a communications system 20 suitable for illustrating provision of system information to a remote/evolved remote UE. The communications system 20 comprises base station node 22, UE-to-Network Relay (UTNR) node 24, and remote/evolved remote UE 26. The base station node 22 may be any type of radio access node that performs base station type operations, such as a node often called eNodeB or eNB or gNB. As used herein, any reference to a relay node is to be understood as meaning a remote/evolved remote UE 24. The remote/evolved remote UE 24 may be, for example, a wireless terminal such as a user equipment (UE) that is capable of performing relay functions as described herein. Any reference herein to "user equipment" or "UE" is to be understood as meaning to a remote/evolved remote UE 26.

The base station node 22 communicates over Uu interface 28 with UE-to-Network Relay (UTNR) node 24, and with remote/evolved remote UE 26 when remote/evolved remote UE 26 is in coverage or extended coverage. The UE-to-Network Relay (UTNR) node 24 may communicate with remote/evolved remote UE 26 over non-Uu interface 29. Both Uu interface 28 and non-Uu interface 29 are air or radio interfaces. Examples of non-Uu interface 29 include the PC5 interface (for sidelink communications), but is not so limited and may also include non-3GPP interfaces such as Bluetooth and WiFi, for example. The Uu interface 28 and non-Uu interface 29 are illustrated by dotted-dashed lines.

For describing the structure pertinent to the technical aspects described herein, each of base station node 22, UE-to-Network Relay (UTNR) node 24, and remote/ evolved remote UE 26 are shown in FIG. 1 as comprising a transceiver and processor circuitry. It should be understood that each of base station node 22, UE-to-Network Relay (UTNR) node 24, and remote/evolved remote UE 26 may indeed comprise other hardware and functionalities for implementing other aspects of respective node or UE operation, as known to the person skilled in the art.

In the above regard, base station node 22 is shown in FIG. 1 as comprising base station processor circuitry 30 (also known as base station processor 30) and base station transceiver 32. The base station transceiver 32 in turn typically comprises base station transmitter circuitry 34 and base station receiver circuitry 36, which are also called base station transmitter 34 and base station receiver 36, respectively. Base station transceiver 32 with its base station transmitter 34 and base station receiver 36 communicates over Uu interface 28 with UE-to-Network Relay (UTNR) node 24 and, when in coverage or extended coverage, with remote/evolved remote UE 26.

UE-to-Network Relay (UTNR) node 24 is shown in FIG. 1 as comprising relay processor circuitry 40 (also known as relay processor 40) and relay transceiver 42. The relay transceiver 42 in turn typically comprises relay transmitter circuitry 44 and relay receiver circuitry 46, which are also called relay transmitter 44 and relay receiver 46, respectively. Relay transceiver 42 with its relay transmitter 44 and relay receiver 46 communicate over non-Uu interface 29 with remote/evolved remote UE 26 when the remote/evolved remote UE 26 is in coverage of UE-to-Network Relay (UTNR) node 24.

Remote/evolved remote UE 26 is shown in FIG. 1 as comprising UE circuitry 50 (also known as UE processor 50) and UE transceiver 52. The UE transceiver 52 in turn typically comprises UE transmitter circuitry 54 and UE receiver circuitry 56, which are also called UE transmitter 54 and UE receiver 56, respectively. When the remote/evolved remote UE 26 is in coverage or extended coverage with respect to base station node 22, UE transceiver 52 with its UE transmitter circuitry 54 and UE receiver circuitry 56 communicates with base station node 22 over Uu interface 28. When the remote/evolved remote UE 26 is in coverage with respect to UE-to-Network Relay (UTNR) node 24, UE transceiver 52 with its UE transmitter circuitry 54 and UE receiver circuitry 56 communicates with UE-to-Network Relay (UTNR) node 24 over non-Uu interface 29.

For each of base station node 22, UE-to-Network Relay (UTNR) node 24, and remote/evolved remote UE 26, the respective base station transceiver 32, relay transceiver 42, and UE transceiver 52 include antenna(s). The respective base station transmitter 34, relay transmitter 44, and UE transmitter circuitry 54 may comprise, e.g., amplifier(s), modulation circuitry and other conventional transmission equipment. The respective base station receiver 36, relay receiver 46, and UE receiver circuitry 56 may comprise, e.g., amplifiers, demodulation circuitry, and other conventional receiver equipment.

In general operation the base station node 22 may communicate across Uu interface 28 with UE-to-Network Relay (UTNR) node 24 and (when in coverage or extended coverage) with remote/evolved remote UE 26 using predefined configurations of information. By way of non-limiting example, the base station node 22 may communicate over Uu interface 28 using "frames" of information that may be configured to include various channels. In Long Term Evolution (LTE), for example, a frame, which may have both downlink portion(s) and uplink portion(s), may comprise plural subframes, with each LTE subframe in turn being divided into two slots. The frame may be conceptualized as a resource grid (a two dimensional grid) comprised of resource elements (RE). Each column of the two dimensional grid represents a symbol (e.g., an OFDM symbol on downlink (DL) from node to wireless terminal; an SC-FDMA symbol in an uplink (UL) frame from wireless terminal to node). Each row of the grid represents a subcarrier. The frame and subframe structure serves only as an example of a technique of formatting of information that is to be transmitted over a radio or air interface. It should be understood that "frame" and "subframe" may be utilized interchangeably or may include or be realized by other units of information formatting, and as such may bear other terminology (such as blocks, for example). In similar manner, the UE-to-Network Relay (UTNR) node 24 and remote/evolved remote UE 26 may communicate over non-Uu interface 29 with using predefined configurations of information, such as (for example) frames configured for sidelink communications.

To cater to the transmission of frames or other units of information, each of base station node 22, UE-to-Network Relay (UTNR) node 24, and remote/evolved remote UE 26 are illustrated in FIG. 1 as comprising respective frame/signal scheduler/handlers. For example, base station node 22 comprises base station frame/signal scheduler/handler 37; UE-to-Network Relay (UTNR) node 24 comprises UTNR frame/signal scheduler/handler 47; and remote/evolved remote UE 26 comprises UE frame/signal scheduler/handler 57.

In being a frame handler it is understood that each of the respective frame/signal scheduler/handlers 37, 47, and 57 may function in both transmit and receive operations. For example, in a transmit operation the respective frame/signal scheduler/handlers may generate a frame by loading information (e.g., signals or user data) into appropriate resources of the frame (and in so doing essentially serve as a "scheduler"). On the other hand, in a receive operation the respective frame/signal scheduler/handlers may extract or decode information (e.g., signals or user data) from appropriate resources of the frame, and pass on the extracted or decoded information to other functionalities (e.g., applications) for further processing.

Various example aspects of the technology disclosed herein concerns system information, e.g., determining from whence the remote/evolved remote UE 26 obtains system information and how such system information is to be transmitted to remote/evolved remote UE 26. Accordingly, the processors of each of base station node 22, UE-to-Network Relay (UTNR) node 24, and remote/evolved remote UE 26 have units or functionalities involved with system information (SI) processing. In view of the act that such functionalities may comprise processors or be subsumed in the respective base station processor 30, relay processor 40, or UE processor 50, the system information aspects are referred to respectively as system information generator 38 ("SI generator 38") for base station node 22; system information processor 48 ("SI processor 48") for UE-to-Network Relay (UTNR) node 24, and system information processor 58 ("SI processor 58") for remote/evolved remote UE 26.

As described further herein, at least portions of each of base station node 22, UE-to-Network Relay (UTNR) node 24, and remote/evolved remote UE 26 may be realized or implemented using respective machine platforms, such as base station machine platform 39, UTNR platform 49, and UE platform 59 as depicted by respectively labeled broken lines in FIG. 1. Each such platform may comprise a computer with one or more processors or controllers, as hereinafter described with respect to FIG. 18. Each platform typically comprises some form(s) of memory, and such memory may include an operating system and one or more applications comprising instructions stored on non-transient media which are executable by a processor. For example, FIG. 1 shows remote/evolved remote UE 26 as comprising memory 60 and applications 62. One such application for remote/evolved remote UE 26 may be, for example, a sidelink communications application.

The remote/evolved remote UE 26 also typically comprises user interface 64. The UE user interface 64 may serve for both user input and output operations, and may comprise (for example) a screen such as a touch screen that can both display information to the user and receive information entered by the user. The UE user interface 64 may also include other types of devices, such as a speaker, a microphone, or a haptic feedback device, for example.

Although not illustrated, it should be understood that each of UE-to-Network Relay (UTNR) node 24 and remote/evolved remote UE 26 may also comprise memory and user interfaces.

B. System Information

System information is divided into the MasterInformationBlock (MIB) and a number of SystemInformationBlocks (SIBs). The MIB includes a limited number of most essential and most frequently transmitted parameters that are needed to acquire other information from the cell, and is transmitted on BCH. SIBs other than SystemInformationBlockType1 are carried in SystemInformation (SI) messages and mapping of SIBs to SI messages is flexibly configurable by schedulingInfoList included in SystemInformationBlockType1, with restrictions that: each SIB is contained only in a single SI message, and at most once in that message; only SIBs having the same scheduling requirement (periodicity) can be mapped to the same SI message; SystemInformationBlockType2 is always mapped to the SI message that corresponds to the first entry in the list of SI messages in schedulingInfoList. There may be multiple SI messages transmitted with the same periodicity.

SystemInformationBlockType1 and all SI messages are transmitted on DL-SCH.

The Bandwidth reduced Low Complexity (BL) UEs and UEs in Coverage Enhancement (CE) apply Bandwidth Reduced (BR) version of the SIB or SI messages. A UE considers itself in enhanced coverage as specified in TS 36.304 [See, e.g., R2-165254, "Considerations on the evolved UE-to-Network Relay scenario and architecture", ZTE, Gothenburg, Sweden, Aug. 22-26, 2016, incorporated herein by reference]. As used herein, anything applicable for a particular SIB or SI message equally applies to the corresponding BR version unless explicitly stated otherwise.

For NB-IoT, a reduced set of system information block with similar functionality but different content is defined; the UE applies the NB-IoT (NB) version of the MIB and the SIBs. These may be denoted MasterinformationBlock-NB and SystemInformationBlockTypeX-NB herein. All other system information blocks (without NB suffix) are not applicable to NB-IoT; this is not further stated herein As an aside, the physical layer imposes a limit to the maximum size a SIB can take. When DCI format 1C is used the maximum allowed by the physical layer is 1736 bits (217 bytes) while for format 1A the limit is 2216 bits (277 bytes), see TS 36.212 and TS 36.213. For BL UEs and UEs in CE, the maximum SIB and SI message size is 936 bits, see TS 36.213. For NB-IoT, the maximum SIB and SI message size is 680 bits, see TS 36.213.

In addition to broadcasting, E-UTRAN may provide SystemInformationBlockType1, including the same parameter values, via dedicated signalling i.e., within an RRCConnectionReconfiguration message.

The UE applies the system information acquisition and change monitoring procedures for the PCell, except when being a BL UE or a UE in CE or a NB-IoT UE in RRC_CONNECTED mode while T311 is not running. For a SCell, E-UTRAN provides, via dedicated signalling, all system information relevant for operation in RRC_CONNECTED when adding the SCell. However, a UE that is configured with DC shall aquire the MasterInformationBlock of the PSCell but use it only to determine the SFN timing of the SCG, which may be different from the MCG. Upon change of the relevant system information of a configured SCell, E-UTRAN releases and subsequently adds the concerned SCell, which may be done with a single RRC-ConnectionReconfiguration message. Note that E-UTRAN may configure via dedicated signalling different parameter values than the ones broadcast in the concerned SCell.

In the legacy layer 3 relay node (RN) related system information design, a RN configured with an RN subframe configuration does not need to apply the system information acquisition and change monitoring procedures. Upon change of any system information relevant to an RN, E-UTRAN provides the system information blocks containing the relevant system information to an RN configured with an RN subframe configuration via dedicated signalling using the RNReconfiguration message. For RNs configured with an RN subframe configuration, the system information contained in this dedicated signalling replaces any corresponding stored system information and takes precedence over any corresponding system information acquired through the system information acquisition procedure. The dedicated system information remains valid until overridden. Note again that E-UTRAN may configure an RN, via dedicated signalling, with different parameter values than the ones broadcast in the concerned cell.

Table 1 and Table 2 illustrate detailed information of system information (information element (IE). See also 3GPP TS 36.213, V 13.2.0, incorporated herein by reference. Table 1 pertains to System Information as transmitted over the Uu interface; Table 2 pertains to system information for NB-IoT.

The Master Information Block (MIB) is mapped on the BCCH and carried on BCH while all other SI messages are mapped on the BCCH. Except for NB-IoT, all other SI messages than the MIB are dynamically carried on DL-SCH where they can be identified through the SI-RNTI (System Information RNTI). Both the MIB and SystemInformationBlockType1 use a fixed schedule with a periodicity of 40 and 80 ms respectively. For NB-IoT the MIB-NB and SystemInformationBlockType1-NB use a fixed schedule with a periodicity of 640 and 2560 ms respectively. The scheduling of other SI messages is flexible and indicated by SystemInformationBlockType1. For NB-IoT, the MIB contains all information required to acquire SIB1 and SIB1 contains all information required to acquire other SI messages.

Except for NB-IoT, the eNB may schedule DL-SCH transmissions concerning logical channels other than BCCH in the same subframe as used for BCCH. The minimum UE capability restricts the BCCH mapped to DL-SCH e.g. regarding the maximum rate.

The Paging message is used to inform UEs in RRC_IDLE and UEs in RRC_CONNECTED about a system information change. For NB-IoT, the UE is not required to detect SIB changes when in RRC_CONNECTED, and the network may release the NB-IoT UE to RRC_IDLE if it wants the NB-IoT UE to acquire changed SIB(s).

Except for NB-IoT, system information may also be provided to the UE by means of dedicated signaling, e.g., upon handover.

C. Channel Mapping Relationships

The transport channels and logical channels are located in the medium access control (MAC) layer; while physical channels are located in Physical layer.

C.1 Mapping Between Transport and Physical Channels

Figures 1, 2:
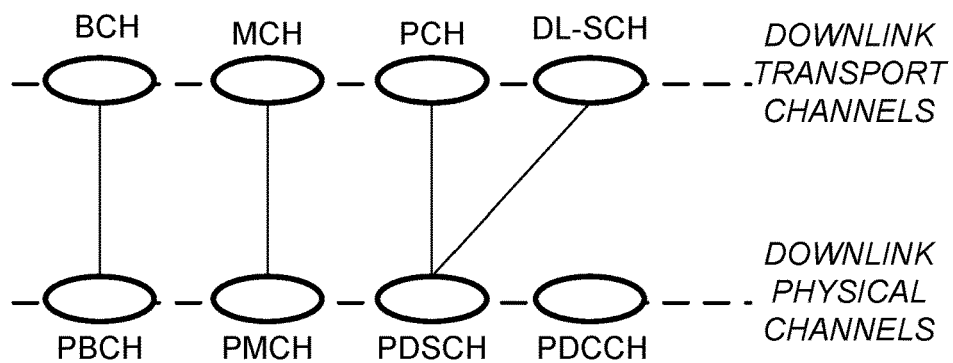
Figure 2:
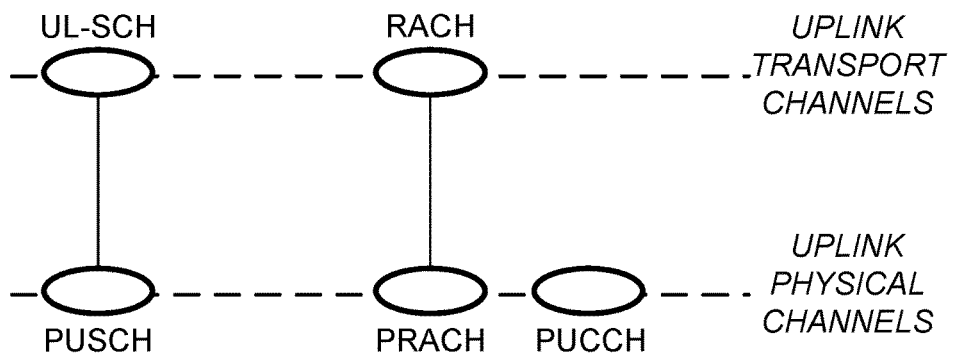

FIG. 2-1 is a diagrammatic view of mapping between downlink transport channels and downlink physical channels.

Figures 2, 3:
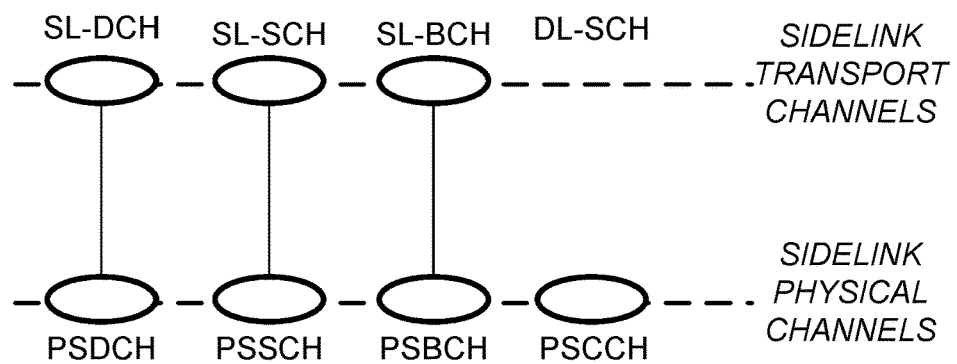

FIG. 2-2 is a diagrammatic view of mapping between uplink transport channels and uplink physical channels FIG. 2-3 is a diagrammatic view of mapping between sidelink transport channels and sidelink physical channels.

Figures 2, 3, 4:
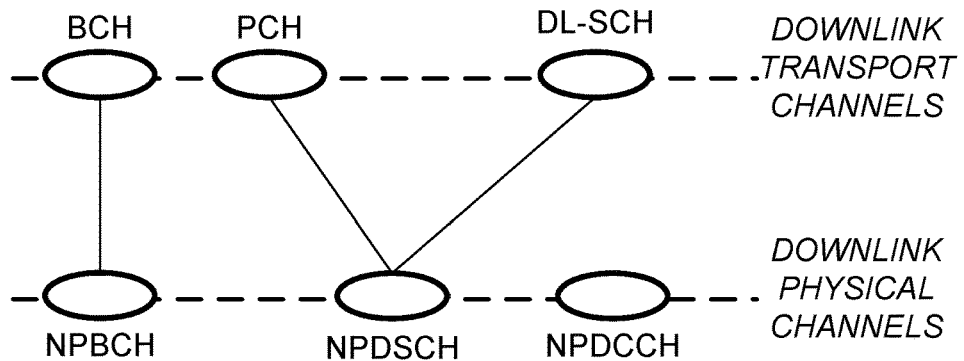

FIG. 2-4 is a diagrammatic view of mapping between downlink transport channels and downlink narrowband physical channels.

FIG. 2-5 is a diagrammatic view of mapping between uplink transport channels and uplink narrowband physical channels.

C.2 Mapping Between Logical and Transport Channels

FIG. 3-1 is a diagrammatic view of mapping between downlink logical channels and downlink transport channels.

FIG. 3-2 is a diagrammatic view of mapping between Sidelink logical channels and Sidelink transport channels.

FIG. 3-3 is a diagrammatic view of mapping between uplink logical channels and uplink transport channels.

In partial summary, for system information channel mapping:

MIB information takes the mapping BCCH-BCH-PBCH;

All SIB information takes the mapping BCCH-DL-SCH-PDSCH;

As "The Bandwidth reduced Low Complexity (BL) UEs and UEs in Coverage Enhancement (CE) apply Bandwidth Reduced (BR) version of the SIB or SI messages", so the SIB information for BL UEs and UEs in CE mode takes the mapping BR-BCCH-DL-SCH-PDSCH;

The sidelink system information takes the mapping SBCCH-SL-BCH-PSBCH;

The NB-IoT MIB information takes the mapping BCCH-BCH-NPBCH;

The NB-IoT SIB information takes the mapping BCCH-DL-SCH-NPDSCH.

D. System Information Scheduling

The Master Information Block (MIB) uses a fixed schedule with a periodicity of 40 ms and repetitions made within 40 ms. The first transmission of the MIB is scheduled in subframe #0 of radio frames for which the SFN mod 4=0, and repetitions are scheduled in subframe #0 of all other radio frames. For TDD/FDD system with a bandwidth larger than 1.4 MHz that supports Bandwidth reduced Low Complexity (BL) UEs or UEs in Coverage Enhancement (CE), MIB transmission may be repeated in subframe#9 of the previous radio frame for FDD and subframe #5 of the same radio frame for TDD.

The SystemInformationBlockType1 uses a fixed schedule with a periodicity of 80 ms and repetitions made within 80 ms. The first transmission of SystemInformationBlockType1 is scheduled in subframe #5 of radio frames for which the SFN mod 8=0, and repetitions are scheduled in subframe #5 of all other radio frames for which SFN mod 2=0.

For Bandwidth reduced Low Complexity (BL) UEs or UEs in Coverage Enhancement (CE), Master Information Block (MIB) is applied which may be provided with additional repetitions, while for SIB1 and further SI messages, separate messages are used which are scheduled independently and with content that may differ. The separate instance of SIB1 is named as SystemInformationBlock- Type1-BR. The SystemInformationBlockType1-BR uses a schedule with a periodicity of 80 ms.

The SI messages are transmitted within periodically occurring time domain windows (referred to as SI-windows) using dynamic scheduling. Each SI message is associated with a SI-window and the SI-windows of different SI messages do not overlap. That is, within one SI-window only the corresponding SI is transmitted. The length of the SI-window is common for all SI messages, and is configurable. Within the SI-window, the corresponding SI message can be transmitted a number of times in any subframe other than MBSFN subframes, uplink subframes in TDD, and subframe #5 of radio frames for which SFN mod 2=0. The UE acquires the detailed time-domain scheduling (and other information, e.g. frequency-domain scheduling, used transport format) from decoding SI-RNTI on PDCCH (see TS 36.321 [6]). For a BL UE or a UE in CE, the detailed time/frequency domain scheduling information for the SI messages is provided in SystemInformationBlockType1-BR.

For UEs other than BL UE or UEs in CE SI-RNTI is used to address SystemInformationBlockType1 as well as all SI messages.

SystemInformationBlockType1 configures the SI-window length and the transmission periodicity for the SI messages.

D.1 Scheduling for NB-IoT

The MasterinformationBlock-NB (MIB-NB) uses a fixed schedule with a periodicity of 640 ms and repetitions made within 640 ms. The first transmission of the MIB-NB is scheduled in subframe #0 of radio frames for which the SFN mod 64=0 and repetitions are scheduled in subframe #0 of all other radio frames. The transmissions are arranged in 8 independently decodable blocks of 80 ms duration.

The SystemInformationBlockType1-NB (SIB1-NB) uses a fixed schedule with a periodicity of 2560 ms. SIB1-NB transmission occurs in subframe #4 of every other frame in 16 continuous frames. The starting frame for the first transmission of the SIB1-NB is derived from the cell PCID and the number of repetitions within the 2560 ms period and repetitions are made, equally spaced, within the 2560 ms period (see TS 36.213 [23]).

The SI messages are transmitted within periodically occurring time domain windows (referred to as SI-windows) using scheduling information provided in SystemInformationBlockType1-NB. Each SI message is associated with a SI-window and the SI-windows of different SI messages do not overlap. That is, within one SI-window only the corresponding SI is transmitted. The length of the SI-window is common for all SI messages, and is configurable.

Within the SI-window, the corresponding SI message can be transmitted a number of times over 2 or 8 consecutive NB-IoT downlink subframes. The UE acquires the detailed time/frequency domain scheduling information and other information, e.g. used transport format for the SI messages from schedulingInfoList field in SystemInformationBlockType1-NB. The UE is not required to accumulate several SI messages in parallel but may need to accumulate a SI message across multiple SI windows, depending on coverage condition.

SystemInformationBlockType1-NB configures the SI-window length and the transmission periodicity for all SI messages.

E. System Information Acquisition

FIG. 4 is a diagrammatic view showing system information acquisition normally.

The UE applies the system information acquisition procedure to acquire the Access Stratum (AS) and Non-Access Stratum (NAS) system information that is broadcasted by the E-UTRAN. The procedure applies to UEs in RRC_IDLE and UEs in RRC_CONNECTED.

For Bandwidth reduced Low Complexity (BL) UE, UE in CE and NB-IoT UE, specific conditions apply, as specified below.

E.1 Initiation

The UE shall apply the system information acquisition procedure upon selecting (e.g. upon power on) and upon re-selecting a cell, after handover completion, after entering E-UTRA from another RAT, upon return from out of coverage, upon receiving a notification that the system information has changed, upon receiving an indication about the presence of an ETWS notification, upon receiving an indication about the presence of a CMAS notification, upon receiving a notification that the EAB parameters have changed, upon receiving a request from CDMA2000 upper layers and upon exceeding the maximum validity duration. Unless explicitly stated otherwise in the procedural specification, the system information acquisition procedure overwrites any stored system information, i.e., delta configuration is not applicable for system information and the UE discontinues using a field if it is absent in system information unless explicitly specified otherwise.

For Bandwidth reduced Low Complexity (BL) UEs and UEs in Coverage Enhancement (CE), all SI information required by the UE in RRC_CONNECTED except MIB is provided by the eNB at handover with dedicated signaling.

E.2 System Information Required by the UE

Table 3 shows system information required by the UE.

F. PSBCH Transmission of System Information

The MasterinformationBlock-SL includes the information transmitted by a UE transmitting SLSS, i.e., acting as synchronization reference, via SL-BCH. Table 4 describes the MasterinformationBlock-SL; field descriptions for the MasterinformationBlock-SL; how the UE shall set the contents of the MasterinformationBlock-SL, and what the UE does upon receipt of the MasterinformationBlock-SL.

G. Bandwidth Reduced Low Complexity (BL) Related Coverage Enhancement (CE) Behaviors If cell selection criterion S in normal coverage is not fulfilled for a cell, UE shall consider itself to be in enhanced coverage if the cell selection criterion S for enhanced coverage is fulfilled, where

| | |
|---|---|
| $Q_{rxlevmin}$ | UE applies coverage specific value $Q_{rxlevmin\_CE}$ (dBm) |
| $Q_{qualmin}$ | UE applies coverage specific value $Q_{qualmin\_CE}$ (dB) |

For the UE in enhanced coverage, coverage specific values $Q_{rxlevmin\_CE}$ and $Q_{qualmin\_CE}$ are only applied for the suitability check in enhanced coverage (i.e. not used for measurement and reselection thresholds).

H. Support of UE in Enhanced Coverage

A UE in enhanced coverage is a UE that requires the use of enhanced coverage functionality to access the cell. Two enhanced coverage modes (mode A, mode B) are supported. The support of enhanced coverage mode A is mandatory for a Bandwidth reduced Low Complexity (BL) UE.

A UE may access a cell using enhanced coverage functionality only if the MIB of the cell indicates that scheduling information for SIB1 specific for Bandwidth reduced Low Complexity (BL) UEs is scheduled. System information procedures for UEs in enhanced coverage are identical to the system information procedures for bandwidth reduced low complexity UEs. A UE capable of enhanced coverage acquires, if needed, and uses legacy system information when in normal coverage if it is not a Bandwidth reduced Low Complexity (BL) UE. A UE capable of enhanced coverage acquires, if needed, and uses system information specific for UEs in enhanced coverage. A UE in enhanced coverage is not required to detect SIB change when in RRC_CONNECTED.

A set of PRACH resources (e.g. time, frequency, preamble); each associated with a coverage enhancement level, is provided in SIB. Number of PRACH repetitions and number of maximum preamble transmission attempts per coverage enhancement level are provided in SIB. UEs in same enhanced coverage level use random access resources associated with the same enhanced coverage level. Time/frequency resources and repetition factor for random access response messages for UEs in enhanced coverage are derived from the used PRACH resources. A PDSCH-Config information element is illustrated in Table 5.

A UE in enhanced coverage is paged using the same mechanism for paging BL UEs. The starting subframe of a paging occasion and the repetition pattern (in both time and frequency domain for downlink common control signaling) of that paging occasion are determined irrespective of the UEs enhanced coverage level.

The paging request from the MME for a UE supporting enhanced coverage functionality may contain enhanced coverage level related information and corresponding cell ID.

A UE in RRC_IDLE does not inform the network when it changes the enhanced coverage level.

A UE in enhanced coverage camps on a suitable cell where S criterion for UEs in enhanced coverage is fullfilled. The UE shall re-select to inter-frequency cells in which it is able to operate in normal coverage over cells in which it has to be in enhanced coverage.

Connected mode mobility mechanisms such as measurement reporting, network controlled handover, etc., are supported for UEs in enhanced coverage. No additional mechanisms are introduced to support the use of enhanced coverage functionality to access an E-UTRA cell during inter-RAT handovers.

I. On-Demand System Information for Remote/Evolved Remote UE

Concerning the topic of on-demand system information for a remote/evolved remote UE, it is assumed herein that the remote/evolved remote UE obtains system information via the UNTR/evolved UNTR relaying. Otherwise, if the remote/evolved remote UE receives system information from network directly in Uu interface, it is just like any normal UE in the coverage to receive system information.

As used herein, a remote/evolved remote UE obtaining system information via the UTNR/evolved UTNR relaying means any one of the techniques described in sections I.1 through I.4 hereof.

I.1 Relaying of all System Information to Remote/Evolved Remote UE

For embodiments and modes of section I.1, all the system information is either available to UNTR/evolved UNTR, or decoded by UNTR/evolved UNTR. In the example embodiments and modes of section I.1 the UNTR/evolved UNTR does not have to care what category remote/evolved remote UE requires system information from it. Rather, in the example embodiments and modes of section I.1 the UE-to-Network Relay (UTNR) node 24 just relays what it has to remote/evolved remote UE.

Figures 2, 3, 4, 5:
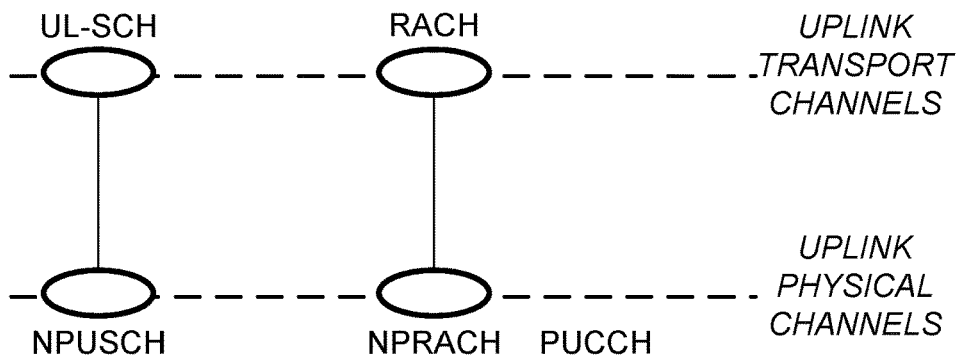
Figure 4:
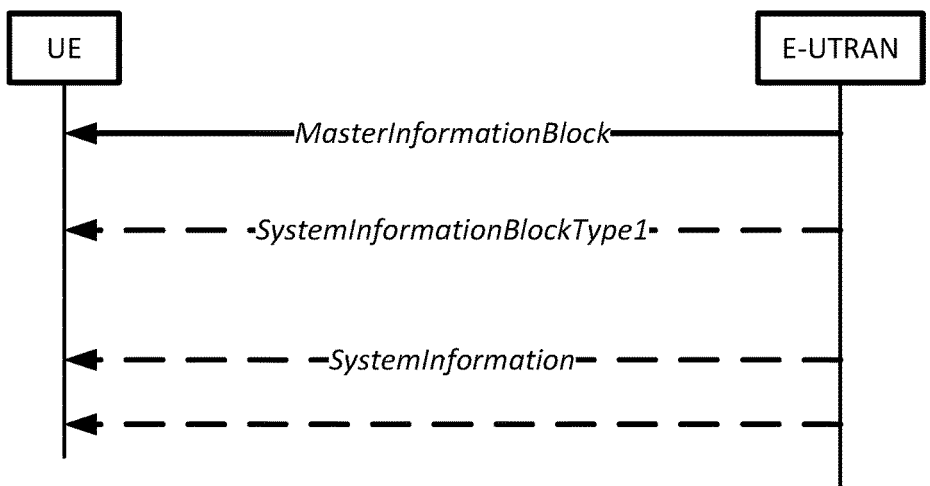
Figures 1, 5:
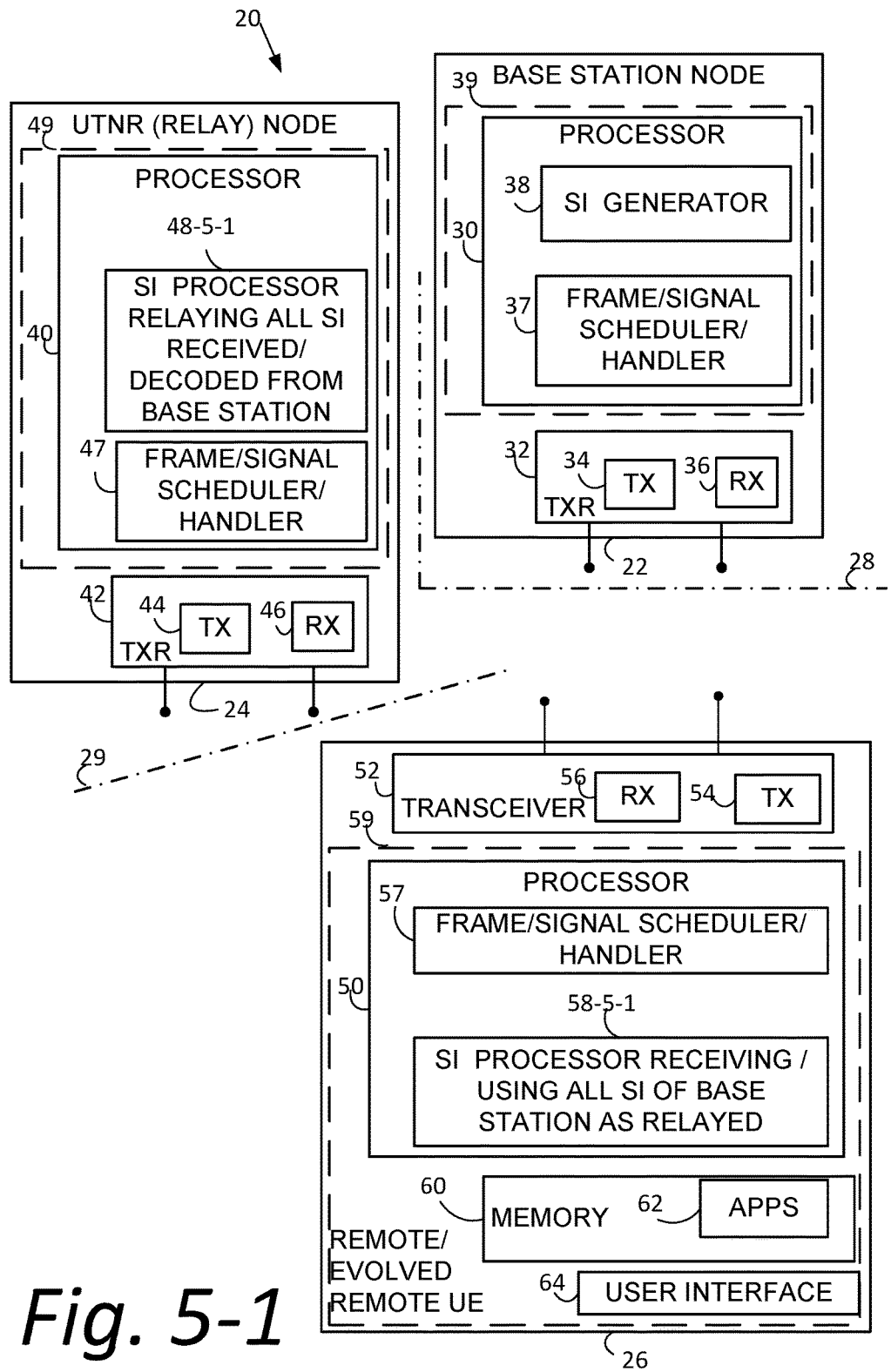
Figures 2, 5:
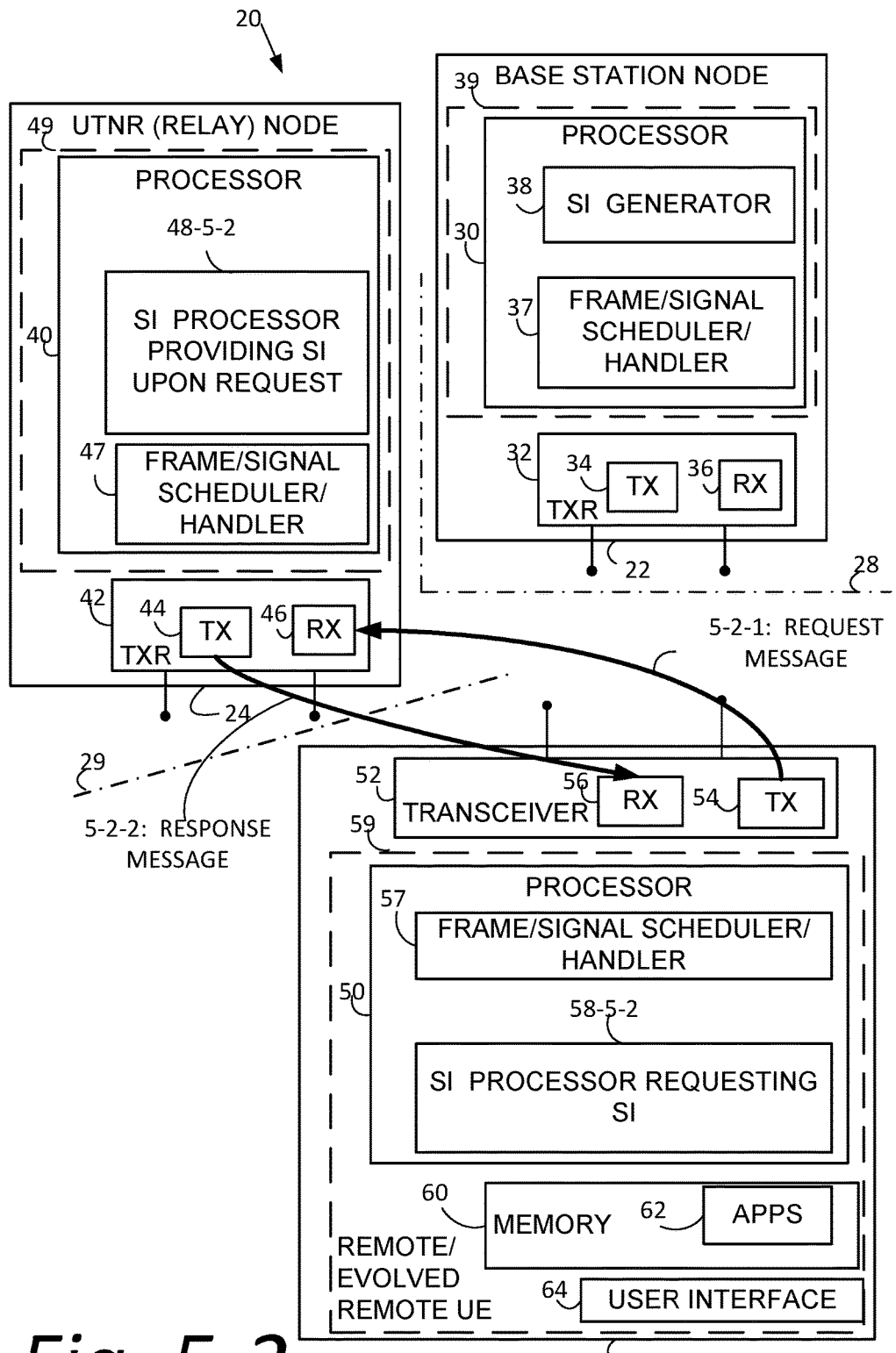
Figures 3, 5:
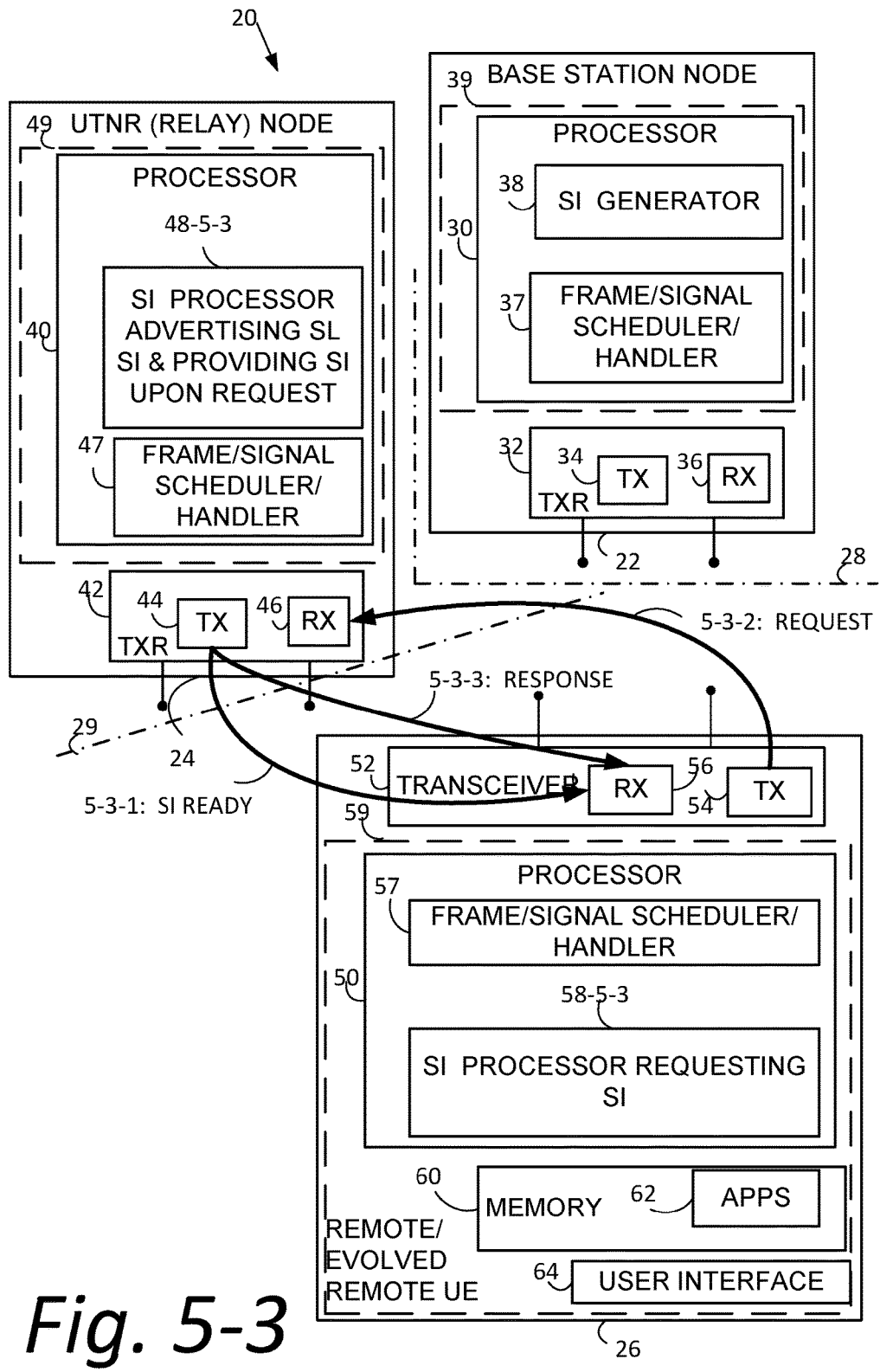
Figures 4, 5:
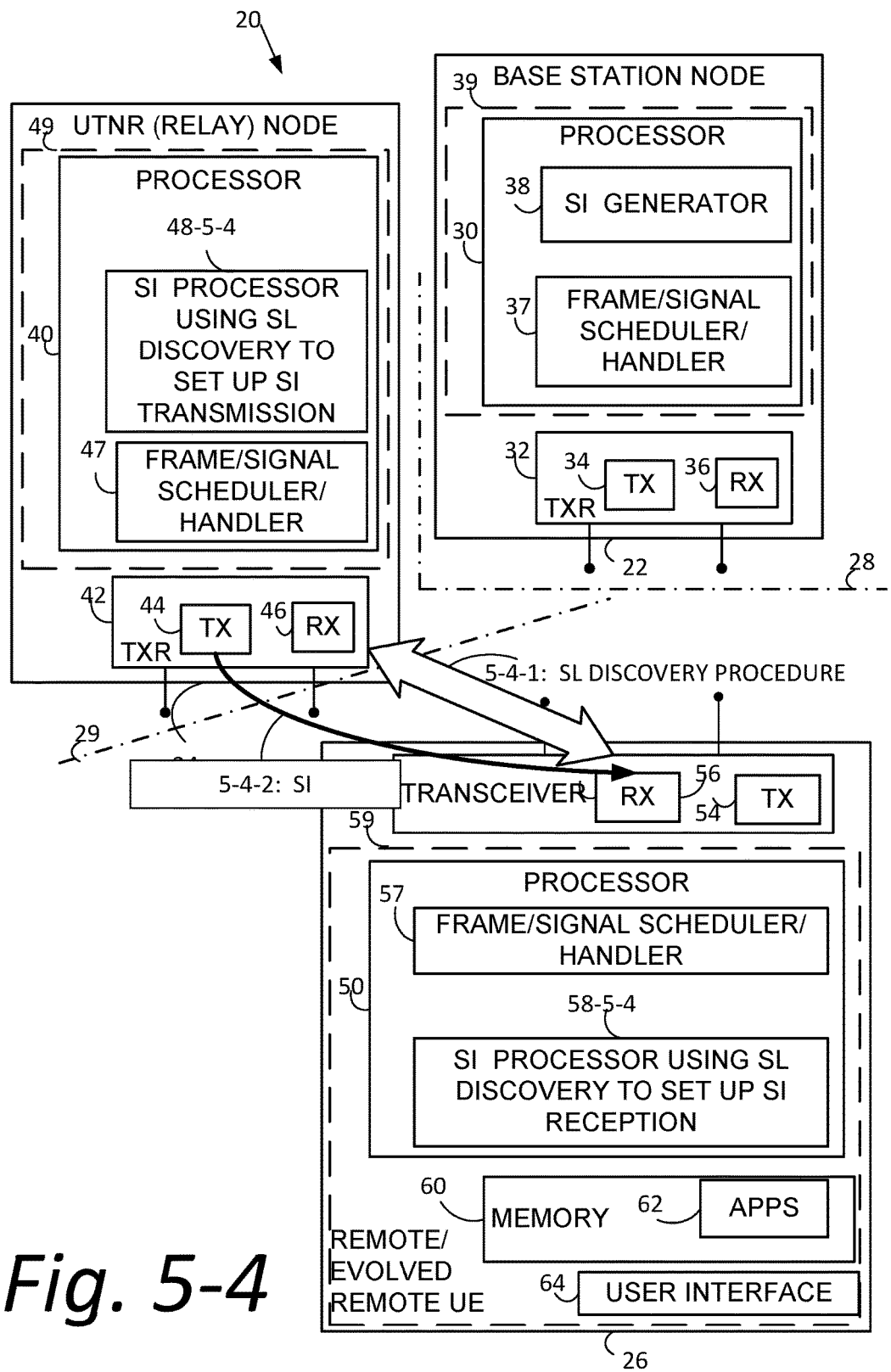

FIG. 5-1 shows an example UE-to-Network Relay (UTNR) node 24 and example remote/evolved remote UE 26 for section I.1 embodiments and modes. In FIG. 5-1, the relay receiver 46 is configured to obtain system information over Uu interface 28 from the base station node 22 of the radio access network. The SI processor 48-5-1 is arranged to configure control information for transmission to remote/evolved remote UE 26 and to include in the control information all system information which is available or decodable from base station node 22. The relay transmitter 44 is configured to transmit the control information to the remote/evolved remote UE 26 over a non-Uu radio interface, e.g., non-Uu interface 29.

In the remote/evolved remote UE 26 of FIG. 5-1, UE receiver 56 is configured to obtain system information over the non-Uu interface (e.g., non-Uu interface 29) from the UE-to-Network Relay (UTNR) node 24. The system information obtained over the non-Uu interface includes all system information which is available to the UE-to-Network Relay (UTNR) node or decodable by the UE-to-Network Relay (UTNR) node from the base station 22 over the Uu interface 28. The UE processor 50 is arranged to use the system information obtained over the non-Uu interface 29 in conjunction with, e.g., sidelink communications, e.g., at the instigation of a sidelink communications application executed by UE processor 50.

Figures 1, 6:
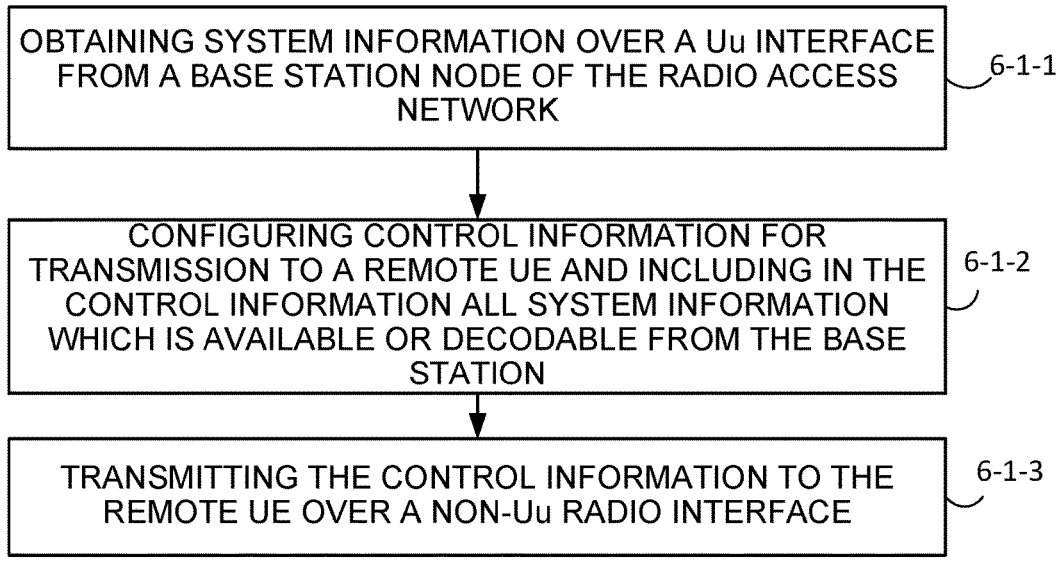

FIG. 6-1 shows example acts or steps performed by example embodiments and modes of the UE-to-Network Relay (UTNR) node 24 of FIG. 5-1. Act 6-1-1 comprises the relay receiver 46 obtaining system information over a Uu interface from a base station node of the radio access network. Act 6-1-2 comprises the relay processor 40 configuring control information for transmission to a remote UE and including in the control information all system information which is available or decodable from the base station. Act 6-1-3 comprises the relay transmitter 44 transmitting the control information to the remote UE over the non-Uu radio interface 29.

In the example embodiments and modes of the UE-to-Network Relay (UTNR) node 24 of FIG. 5-1 and section I.1, the relay processor 40 is arranged to include the all system information, available or decodable from the base station, in the control information without regard of category type of the remote UE. As used herein, "category" or "category type" encompasses the UE category types described by 3GPP, such as in 3GPP TS 36.306 Table 4.1-1, for example, as well as IoT, machine-to-machine, and other such category descriptions pertinent to type of use or protocol utilized by the remote/evolved remote UE 26.

Figures 1, 7:
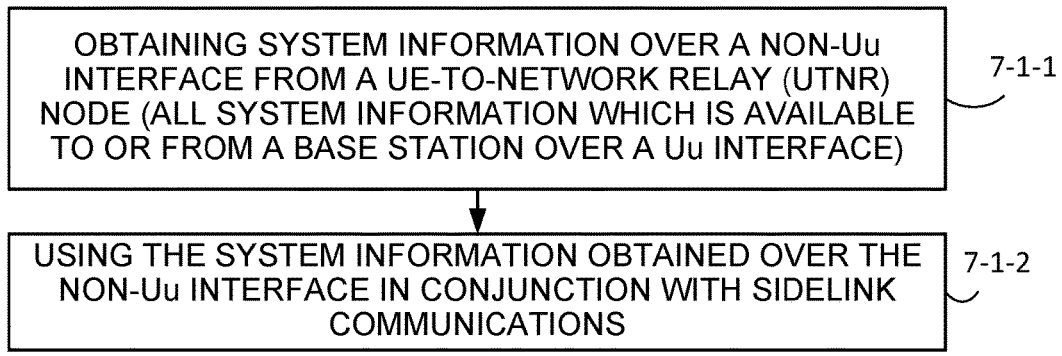
Figures 2, 6:
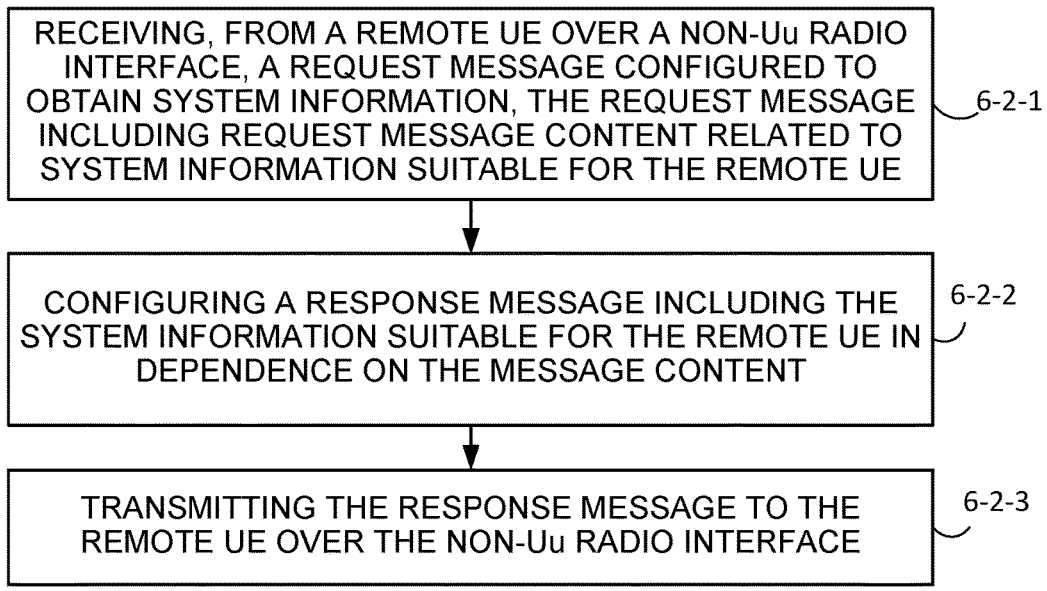
Figures 2, 7:
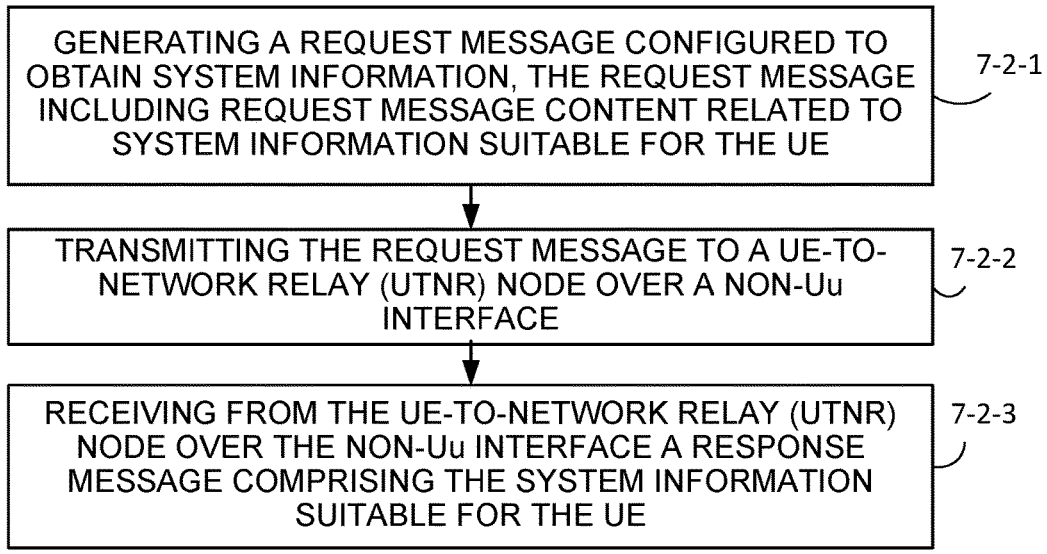
Figures 3, 6:
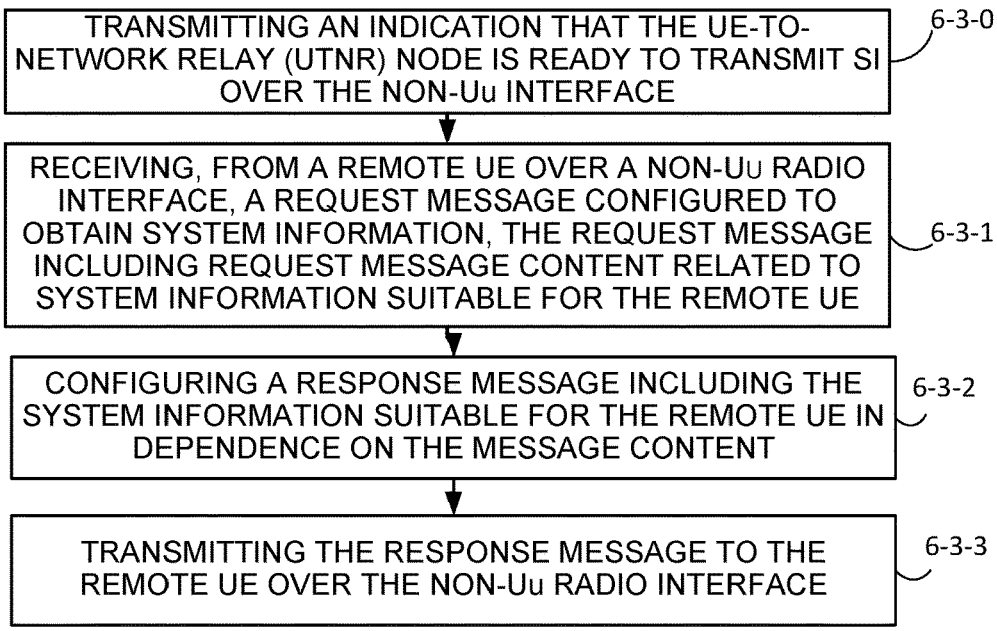
Figures 3, 7:
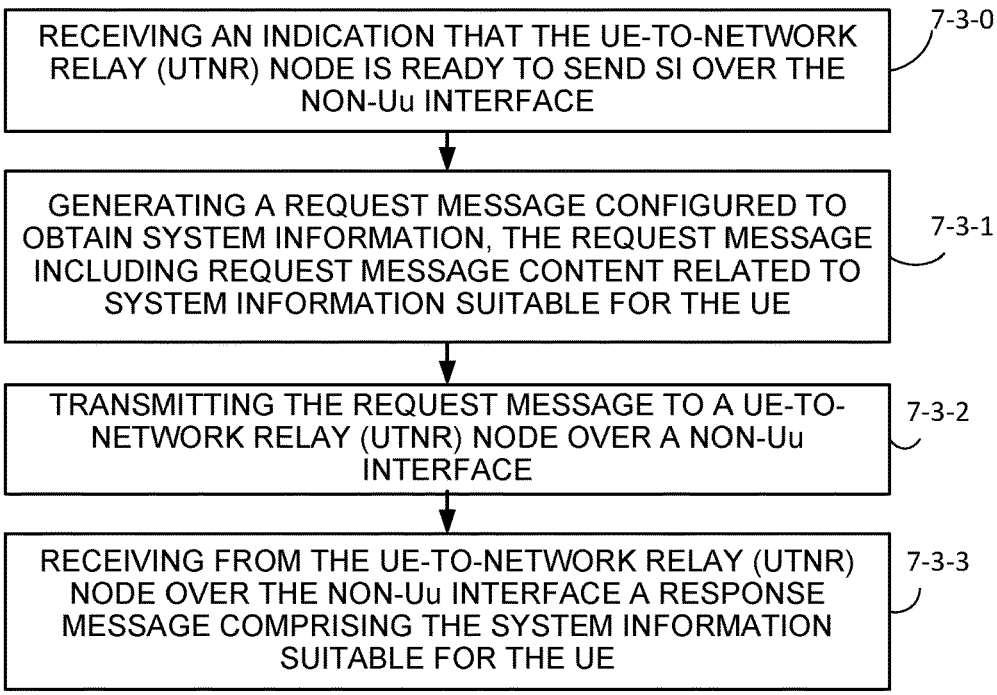
Figures 4, 6:
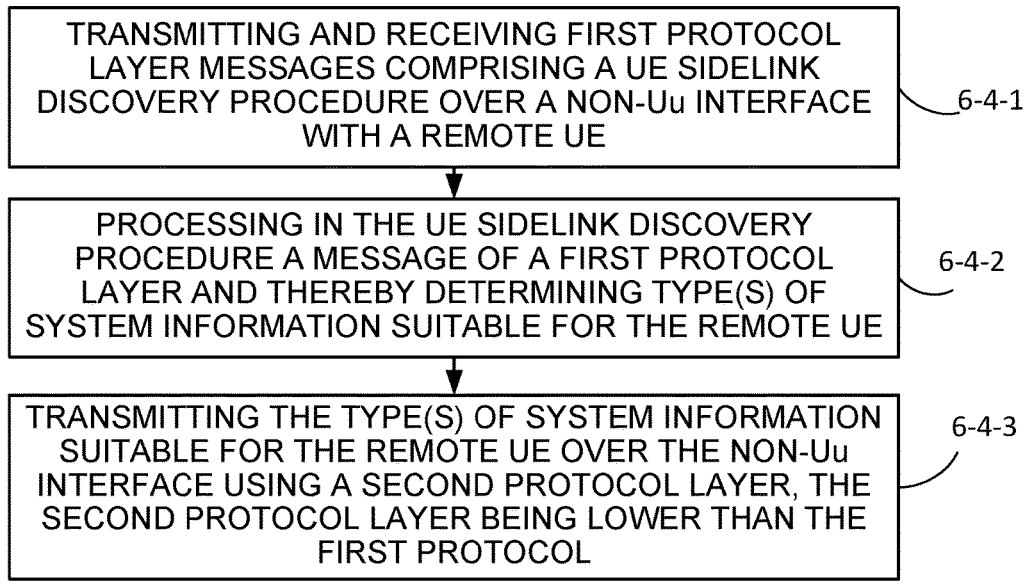
Figures 4, 7:
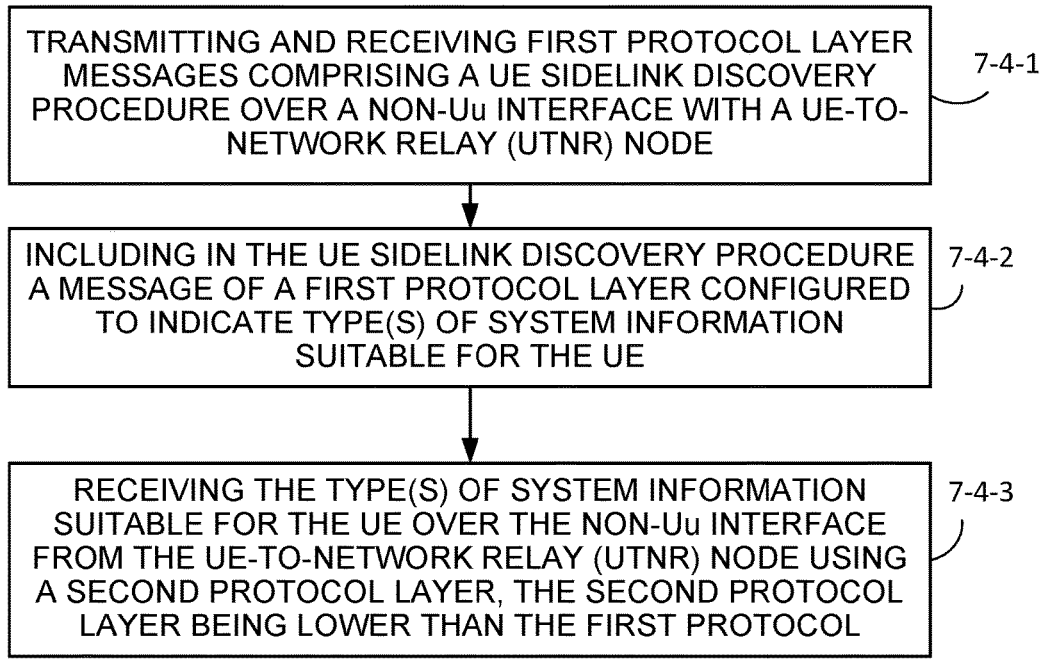

FIG. 7-1 shows example acts or steps performed by example embodiments and modes of the remote/evolved remote UE 26 of FIG. 5-1. Act 7-1-1 comprises the UE receiver 56 obtaining system information over a non-Uu interface (e.g., non-Uu interface 29) from the UE-to-Network Relay (UTNR) node 24. The system information obtained over the non-Uu interface at act 7-1-1 includes all system information which is available to the UE-to-Network Relay (UTNR) node or decodable by the UE-to-Network Relay (UTNR) node from a base station over the Uu interface 28. Act 7-1-2 comprises the UE processor 50 using the system information obtained over the non-Uu interface 29 in conjunction with, e.g., sidelink communications.

I.2 UE Initiates Request for System Information

For embodiments and modes of section I.2, the remote/evolved remote UE 26 initiates a new system information request procedures to the UNTR/evolved UNTR. In this request, at least one of the following should be indicated in the request message: (1) The UE's category information; and/or (2) what type(s) of system information the UE requests. For embodiments and modes of section I.2, the UNTR/evolved UNTR 24 either responds with confirmation and relays the system information to the remote/evolved remote UE in the next system information acquisition window, or responds with system information stored to the remote/evolved remote UE.

FIG. 5-2 shows an example UE-to-Network Relay (UTNR) node 24 and example remote/evolved remote UE 26 for section I.2 embodiments and modes. The remote/evolved remote UE 26 of FIG. 5-2 comprises UE processor 50 arranged to generate a request message configured to obtain system information. An example such request message is shown as message 5-2-1 in FIG. 5-2. The request message includes request message content related to system information suitable for the UE. Such request message content may be either category information of the UE, or an identification of type(s) of system information suitable for the UE (e.g., a list of one or more system information blocks suitable for the UE). The remote/evolved remote UE 26 of FIG. 5-2 further comprises UE transmitter 54 configured to transmit the request message to UE-to-Network Relay (UTNR) 24 node over non-Uu interface 29, as well as UE receiver 56 configured to receive from the UE-to-Network Relay (UTNR) node over the non-Uu interface a response message (illustrated as response message 5-2-2) comprising the system information suitable for the UE.

In FIG. 5-2, the UE-to-Network Relay (UTNR) node 24 comprises receiver circuitry 46 configured to receive, from remote UE 26 over non-Uu radio interface 29, the request message 5-2-1 configured to obtain system information. As mentioned above, the request message includes request message content related to system information suitable for the remote UE. The relay processor 40 and SI processor 48-5-2 in particular is arranged to configure a response message including the system information suitable for the remote UE in dependence on the message content. If the request message content is category of the remote/evolved remote UE 26, the SI processor 48-5-2 may obtain appropriate system information for the particular category through a lookup procedure or the like (e.g., fetching the types of system information [e.g., system information blocks (SIBs)]) based on a predetermined relation of category and system information blocks needed for a UE of such category, and include such system information block(s) (SIB) in the response message. If the request message content is a list of one or more system information blocks suitable for the UE, the SI processor 48-5-2 may obtain the listed/identified system information block(s) (SIB) and include such system information block(s) (SIB) in the response message.

FIG. 7-2 shows example acts or steps performed by example embodiments and modes of the remote/evolved remote UE 26 of FIG. 5-2. Act 7-2-1 comprises using processor circuitry to generate a request message configured to obtain system information, the request message including request message content related to system information suitable for the UE. Act 7-2-2 comprises transmitting the request message to a UE-to-Network Relay (UTNR) node over a non-Uu interface. Act 7-2-3 comprises receiving from the UE-to-Network Relay (UTNR) node over the non-Uu interface a response message comprising the system information suitable for the UE.

FIG. 6-2 shows example acts or steps performed by example embodiments and modes of the UE-to-Network Relay (UTNR) node 24 of FIG. 5-2. Act 6-2-1 comprises receiving, from a remote UE over a non-Uu radio interface, a request message (e.g., request message 5-2-1) configured to obtain system information. The request message 5-2-1 includes request message content related to system information suitable for the remote UE. Act 6-2-2 comprises using processor circuitry 40 to configure a response message (e.g., response message 5-2-2) including the system information suitable for the remote UE in dependence on the message content. Act 6-2-3 comprises transmitting the response message 5-2-2 to the remote UE over the non-Uu radio interface 29.

In some example embodiments and modes of section I.2 and FIG. 5-2, relay receiver 46 is configured to obtain system information over a Uu interface from a base station node of the radio access network during a system information acquisition window. The system information acquisition window comprises a time period in which plural repetitions of transmission of the system information occur over the Uu interface. In some example implementations, the SI processor 48-5-2 configures the response message 5-2-2 upon completion of the system information acquisition window. That is, the SI processor 48-5-2 waits for all repetitions of the system information of the system information acquisition window to be received before sending the response message 5-2-2. But in other example implementations the SI processor 48-5-2 may be programmed or arranged to send the response message 5-2-2 earlier, e.g., as early as possible. For example, after receiving the request message the SI processor 48-5-2 may send the response message 5-2-2 after only a predetermined number of repetitions of the system information are received (the predetermined number of repetitions of the system information in such case being less than the number of repetitions that would otherwise had been received during the entire system information acquisition window). As an alternative, the SI processor 48-5-2 may send the response message immediately upon receiving the request message. In this regard, if the request message is received between the $x^{th}$ and $x+1^{th}$ repetition of transmission of the system information, and if the SI processor 48-5-2 sends the response right after reception of the request message, i.e., before the reception of the $x+1^{th}$ repetition of transmission of the system information.

I.3 UE Request for System Information after UTNR Advertisement of Availability of System Information for Remote UE In the example embodiments and modes of section I.3 the E-UTRAN is informed that the UE is interested or no longer interested to receive sidelink communication or discovery, as well as to request assignment or release of transmission resources for sidelink communication or discovery announcements or sidelink discovery gaps and to report parameters related to sidelink discovery from system information of inter-frequency/PLMN cells.

Example embodiments and modes of nodes and UE of section I.3 are illustrated in FIG. 5-3. FIG. 5-3 also shows signaling/message flow for an example implementation of the example embodiments and modes of section I.3, showing particularly message flow between UE-to-Network Relay (UTNR) node 24 and remote/evolved remote UE 26 in accordance with the example implementation. Message 5-3-1 comprises a system information availability message that indicates that the UE-to-Network Relay (UTNR) node 24 is capable of providing system information to an interested remote/evolved remote UE 26. Such system information may be sidelink system information, or SIBX, or SIB-NB, or SIB18/SIB19. For example, the message 5-3-1 may indicate that the UE-to-Network Relay (UTNR) node 24 is capable of and ready for relaying SIB18/SIB19 information. As a general example, message 5-3-1 may even include SIB18/SSIB19 information, and thereby indicate that the UTNR is ready to transmit system information necessary for the remote/evolved remote UE 26, if requested. Receipt of the message 5-3-1 by the remote/evolved remote UE 26 triggers an opportunity for the remote/evolved remote UE 26 to indicate to UE-to-Network Relay (UTNR) node 24 that the remote/evolved remote UE 26 wants to receive system information, which the remote/evolved remote UE 26 may do by sending message 5-3-2. Thus message 5-3-2 thus comprises an indication that the remote/evolved remote UE 26 wants to acquire the system information for the remote/evolved remote UE 26. Message 5-3-2 may be similar, for example, to a SidelinkUEInformation message, which is described in detail in Table 6, but serves the purpose of a request message to request the system information necessary for the remote/evolved remote UE 26 in a manner similar to message 5-2-1 described with reference to section I.2. The message 5-3-2 thus may include request message content related to system information suitable for the UE (e.g., a category type for the remote/evolved remote UE 26 or a listing of requested SIBs, for example). Upon receipt of the request message 5-3-2, the UE-to-Network Relay (UTNR) node 24 prepares and sends a response message 5-3-4, similar to message 5-2-2 described with reference to section I.2, which provides the appropriate system information for the remote/evolved remote UE 26. Thus, in the example embodiments and modes of section I.3 and FIG. 5-3 the remote/evolved remote UE 26 does not initiate a system information request, at least not until after the remote/evolved remote UE 26 is first informed that the UE-to-Network Relay (UTNR) node 24 has system information useful for the remote/evolved remote UE 26.

FIG. 5-3 shows an example UE-to-Network Relay (UTNR) node 24 and example remote/evolved remote UE 26 for section I.3 embodiments and modes. The UE-to-Network Relay (UTNR) node 24 of FIG. 5-3 is similar to that of FIG. 5-2, but the SI processor 48-5-3 and relay transmitter 44 are further configured to transmit an indication that the UE-to-Network Relay (UTNR) node is ready to transmit system information over the non-Uu interface, e.g., the system information availability message 5-3-1. Moreover, the relay receiver 46 is further configured to thereafter receive, from the remote UE over the non-Uu radio interface 29, the request message 5-3-2 (including the request message content related to the system information suitable for the remote UE).

The remote/evolved remote UE 26 of FIG. 5-3 is similar to the remote/evolved remote UE 26 of FIG. 5-2, but differs in that UE receiver 56 is further configured to receive an indication that the UE-to-Network Relay (UTNR) node is ready to transmit system information over the non-Uu interface, e.g., message 5-3-1. Moreover, the UE transmitter 54 is configured to thereafter transmit, from the UE over the non-Uu radio interface, the request message 5-3-2 (the request message 5-3-2 including the request message content related to the system information suitable for the UE).

FIG. 6-3 shows example acts or steps performed by example embodiments and modes of the UE-to-Network Relay (UTNR) node 24 of FIG. 5-3. Act 6-3-0 comprises transmitting an indication that the UE-to-Network Relay (UTNR) node is ready to transmit system information over the non-Uu interface (e.g., message 5-3-1). Other acts of FIG. 6-3 are similar to those of FIG. 6-2 and thus are similarly suffixed, it being understood that the act 6-3-1 through 6-3-3 are performed in sequence after act 6-3-0.

FIG. 7-3 shows example acts or steps performed by example embodiments and modes of the remote/evolved remote UE 26 of FIG. 5-3. Act 7-3-0 comprises comprising receiving an indication that the UE-to-Network Relay (UTNR) node is ready to transmit system information over the non-Uu interface. Other acts of FIG. 7-3 are similar to those of FIG. 7-2 and thus are similarly suffixed, it being understood that the acts 7-3-1 through 7-3-3 are performed in sequence after act 7-3-0.

I.4 Sidelink Discovery Procedure Leading to UE Receiving System Information

The embodiments and modes of section I.4 and FIG. 5-4 utilize a sidelink discovery procedure. As is well known, there are two types of sidelink discovery procedures: sidelink discovery procedure A and sidelink discovery procedure B. Sidelink discovery mode A involves a sidelink device transmitting an equivalent to say "I am here". Sidelink discovery mode B involves a sidelink device transmitting an equivalent to say "who is there". In either sidelink discovery procedure mode the UNTR/evolved UNTR and the remote/evolved remote UE may have a hand shake conversation. The sidelink discovery procedure is performed in higher layers.

The embodiments and modes of section I.4 and FIG. 5-4 involve the UE-to-Network Relay (UTNR) node 24 and the remote/evolved remote UE 26 participating in a sidelink discovery procedure. After the UE-to-Network Relay (UTNR) node 24 and remote/evolved remote UE 26 are hooked in discovery procedure, the system information requested through information mentioned in above section I.2 can be exchanged in higher layer, then the higher layer of the UNTR/evolved UNTR can configure the UNTR/evolved UNTR to relay (in the lower layer) the requested system information to the remote/evolved remote UE.

FIG. 5-4 shows an example UE-to-Network Relay (UTNR) node 24 and example remote/evolved remote UE 26 for section I.4 embodiments and modes. In FIG. 5-4, the UE-to-Network Relay (UTNR) node 24 comprises relay transceiver 42 configured to transmit and receive first protocol layer messages comprising a UE sidelink discovery procedure (illustrated by arrow 5-4-1) over a non-UU interface with a remote UE. The UE-to-Network Relay (UTNR) node 24 of FIG. 5-4 also comprises relay processor 40 configured to process in the UE sidelink discovery procedure a message of a first protocol layer whereby the processor circuitry determines type(s) of system information suitable for the remote UE. The message of the first protocol layer comprises a request message transmitted by the remote UE including request message content related to system information suitable for the remote UE. The UE-to-Network Relay (UTNR) node 24 of FIG. 5-4 further comprises relay transmitter 44 which is further configured to transmit the type(s) of system information suitable for the remote UE over the non-Uu interface using a second protocol layer, the second protocol layer being lower than the first protocol. A response message of the second protocol layer is shown by arrow 5-4-2 in FIG. 5-4.

In the remote/evolved remote UE 26 of FIG. 5-4 comprises UE transceiver 52 configured to transmit and receive first protocol layer messages comprising a UE sidelink discovery procedure 5-4-1 over a non-UU interface 29 with a UE-to-Network Relay (UTNR) node 24. The remote/evolved remote UE 26 of FIG. 5-4 further comprises UE processor 50 configured to include, in the UE sidelink discovery procedure 5-4-1, a message of a first protocol layer configured to indicate type(s) of system information suitable for the UE. The UE transceiver 52 is further configured to receive (in response message 5-4-2) the type(s) of system information suitable for the UE over the non-Uu interface from the UE-to-Network Relay (UTNR)

node using a second protocol layer, the second protocol layer being lower than the first protocol.

FIG. 6-4 shows example acts or steps performed by example embodiments and modes of the UE-to-Network Relay (UTNR) node 24 of FIG. 5-4. Act 6-4-1 comprises transmitting and receiving first protocol layer messages comprising a UE sidelink discovery procedure over a non-UU interface with a remote UE. Act 6-4-2 comprises the relay processor 40 processing in the UE sidelink discovery procedure a message of a first protocol layer whereby the relay processor 40 determines type(s) of system information suitable for the remote UE. Act 6-4-3 comprises transmitting the type(s) of system information suitable for the remote UE over the non-Uu interface using a second protocol layer, the second protocol layer being lower than the first protocol.

FIG. 7-4 shows example acts or steps performed by example embodiments and modes of the remote/evolved remote UE 26 of FIG. 5-4. Act 7-4-1 comprises transmitting and receiving first protocol layer messages comprising a UE sidelink discovery procedure 5-4-1 over a non-UU interface with a UE-to-Network Relay (UTNR) node. Act 7-4-2 comprises including in the UE sidelink discovery procedure a message of a first protocol layer configured to indicate type(s) of system information suitable for the UE. Act 7-4-3 comprises receiving (e.g., in response message 5-4-2) the type(s) of system information suitable for the UE over the non-Uu interface from the UE-to-Network Relay (UTNR) node using a second protocol layer, the second protocol layer being lower than the first protocol. The second layer over which the system information is transmitted is the physical layer, so the sidelink discovery procedure occurs in a layer that is higher than the physical layer.

As indicated above, the sidelink discovery procedure 5-4-1 may comprise a message of the first protocol layer comprises a request message transmitted by the remote UE including request message content related to system information suitable for the remote UE. As understood from section I.2 hereof, in some example implementations the request message content may be category information of the remote UE, and in such implementation the relay processor 40 determines the system information suitable for the remote UE based on the category information of the remote UE. In other example implementations, the request message content may comprise identification of type(s) of system information suitable for the remote UE (e.g., a list of System Information Blocks (SIBs), from which the relay processor 40 can readily obtained the desired System Information Blocks (SIBs) and include same in the response message 5-4-2.

J. System Information Transmission/Relay

As mentioned in section F hereof, the MasterinformationBlock-SL carried in PSBCH delivers necessary system information for sidelink communication/discovery. The UNTR/evolved UNTR reads the corresponding MIB/SIB information, fills in the MasterinformationBlock-SL accordingly (such as SIB1 and SIB2 information), and sends it out in PSBCH to the remote/evolve remote UE. In essence, this is not pure relay. Therefore, this section J refers, at least in part, to "PSBCH based system information transmission/relay".

As used herein, the remote/evolved remote UE obtaining system information via the UNTR/evolved UNTR relaying/transmission encompasses one or more of the techniques of sections J.1-J.4.

J.1 UTNR Builds Master Information Block (MIB)-SL

In the example embodiments and modes of section J.1, all system information needed by remote/evolved remote UE (based on the system information alternatives mentioned in section I) are transmitted by a Physical sidelink Broadcast Channel (PSBCH). After decoding the system information as received over Uu interface 28 from base station node 22, the UNTR/evolved UNTR fills system information in the message carried in PSBCH. In an example implementation this may be done by filling in the reserved null bits of the message MasterinformationBlock-SL (currently there are still some reserved bits in the message MasterinformationBlock-SL for further use), or a new message with all information necessarily for remote/evolved remote UE in it. The example embodiments and modes of section J.1 actually means there is no system information relaying for remote/evolved remote UE.

Figures 1, 8:
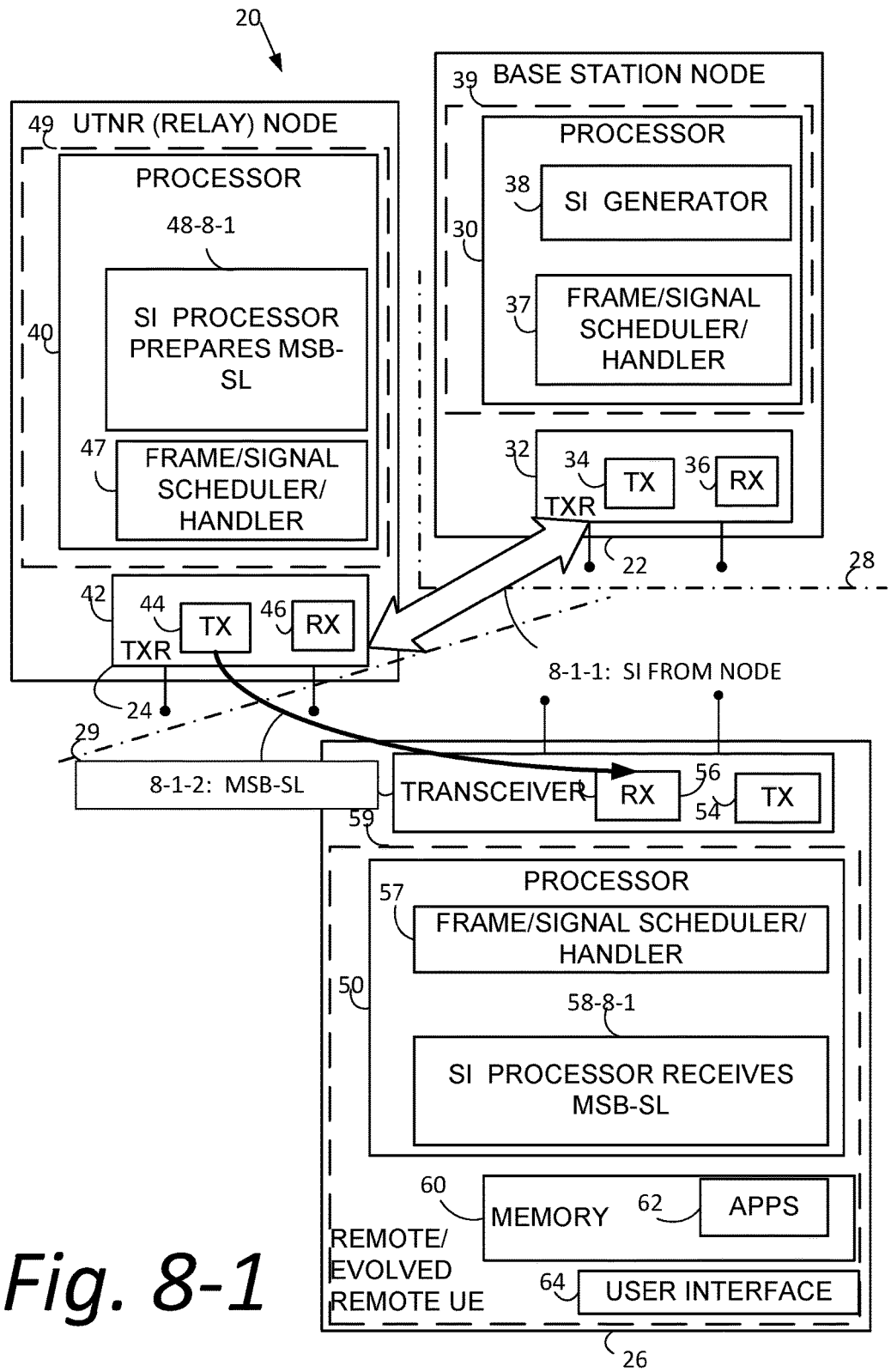
Figures 2, 8:
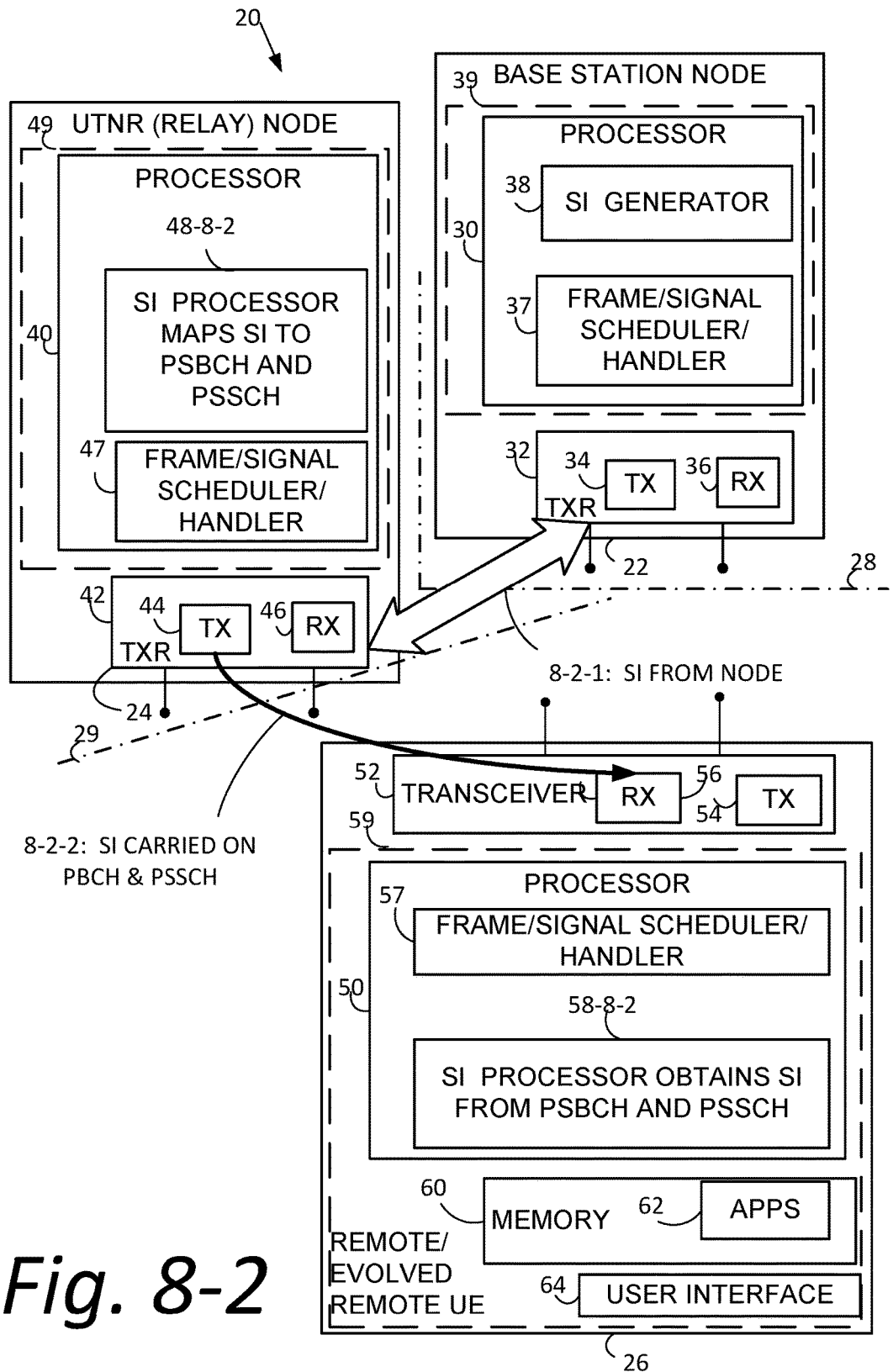
Figures 3, 8:
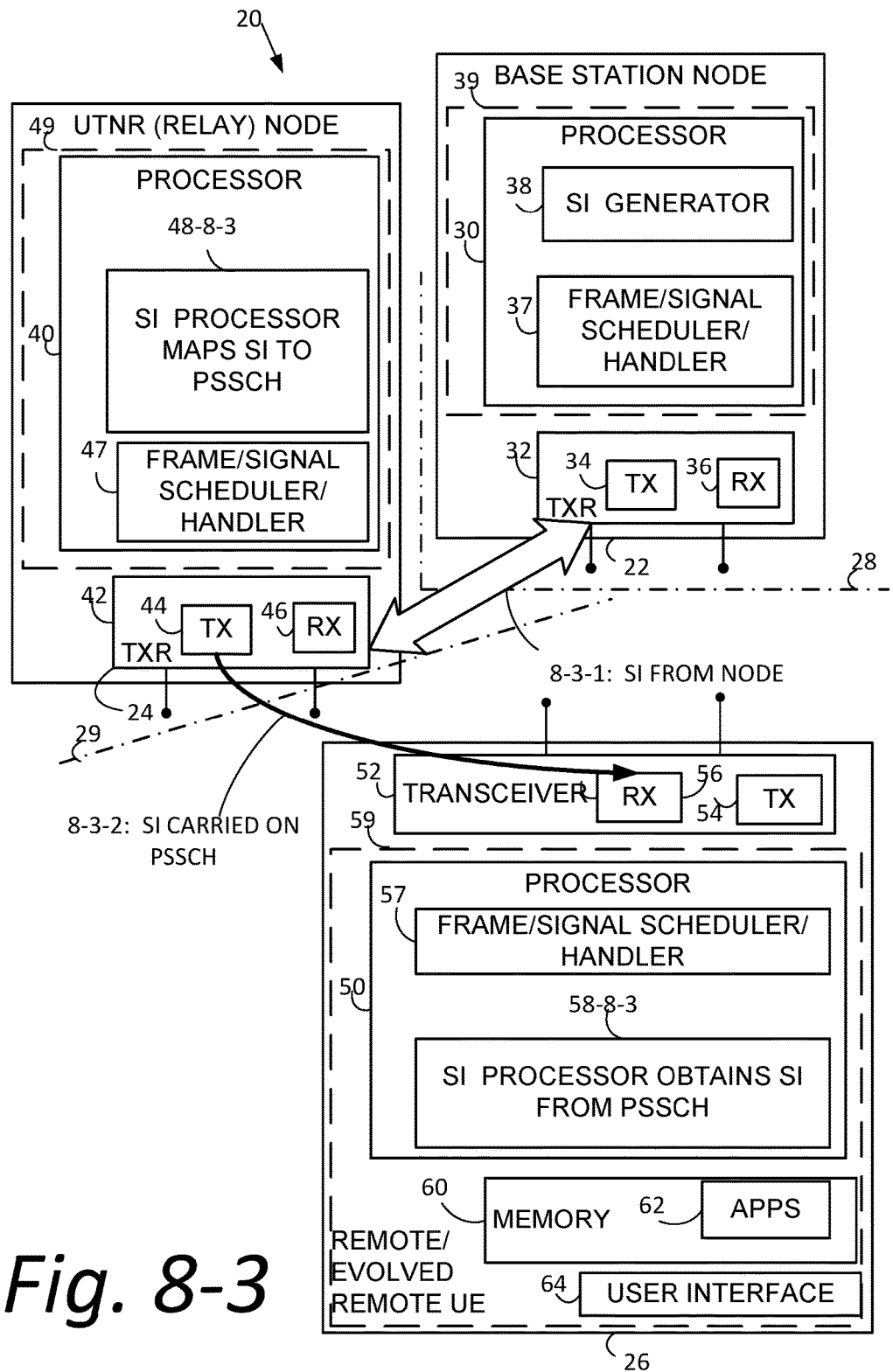

FIG. 8-1 shows an example UE-to-Network Relay (UTNR) node 24 and example remote/evolved remote UE 26 for section J.1 embodiments and modes. In FIG. 8-1, the UE-to-Network Relay (UTNR) node 24 comprises relay receiver 46 configured to obtain system information including a master system information block and other system information block information over a Uu interface 28 from a base station node 22 of the radio access network. The relay processor 40 is arranged to prepare a sidelink master system block for transmission to a remote UE by including at least some of the other system block information obtained over the Uu interface in a vacant portion of the master system information block, the included other system block information being pertinent to sidelink communications. In an example implementation, the vacant portion of the master system information block comprises reserved bits of the master system information block The relay transmitter 44 is configured to transmit the sidelink master system information block to the remote UE over a non-Uu radio interface 29.

In the remote/evolved remote UE 26 of FIG. 8-1, UE receiver 56 is configured to receive a sidelink master system information block MSB-SL over a non-Uu radio interface from a UE-to-Network Relay (UTNR) node. The UE processor 50 is configured to obtain from the sidelink master system information block both a master system information block and other system information block information received by the UE-to-Network Relay (UTNR) node over a Uu interface from a base station node of the radio access network. As mentioned above, the other system information block information being included in a vacation portion of the master system information block received by the UE-to-Network Relay (UTNR) node over the Uu interface.

Figures 1, 9:
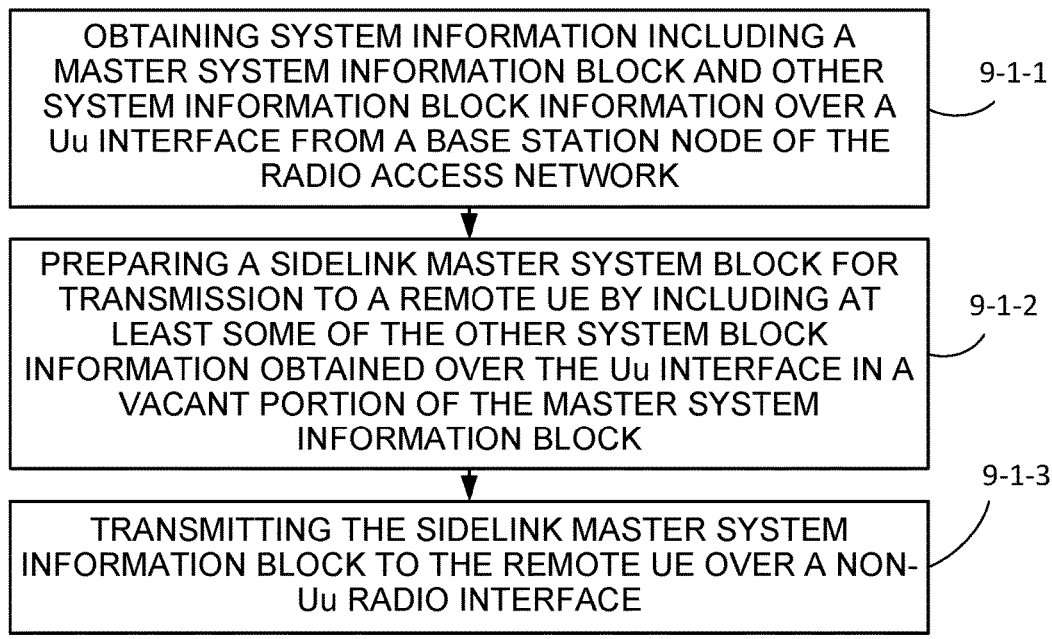

FIG. 9-1 shows example acts or steps performed by example embodiments and modes of the UE-to-Network Relay (UTNR) node 24 of FIG. 8-1. Act 9-1-1 comprises obtaining system information including a master system information block and other system information block information over a Uu interface from a base station node of the radio access network. Transmission of the master system information block and other system information block information over a Uu interface from a base station node is shown by arrow 8-1-1 in FIG. 8-1. Act 9-1-2 comprises the SI processor 48-8-1 preparing a sidelink master system block for transmission to a remote UE by including at least some of the other system block information obtained over the Uu interface in a vacant portion of the master system information block, the included other system block information being pertinent to sidelink communications. Act 9-1-3 comprises the relay receiver 46 transmitting the sidelink master system information block (denoted as MSB-SL and represented by arrow 8-1-2 in FIG. 8-1) to the remote UE over a non-Uu radio interface 29.

Figures 1, 10:
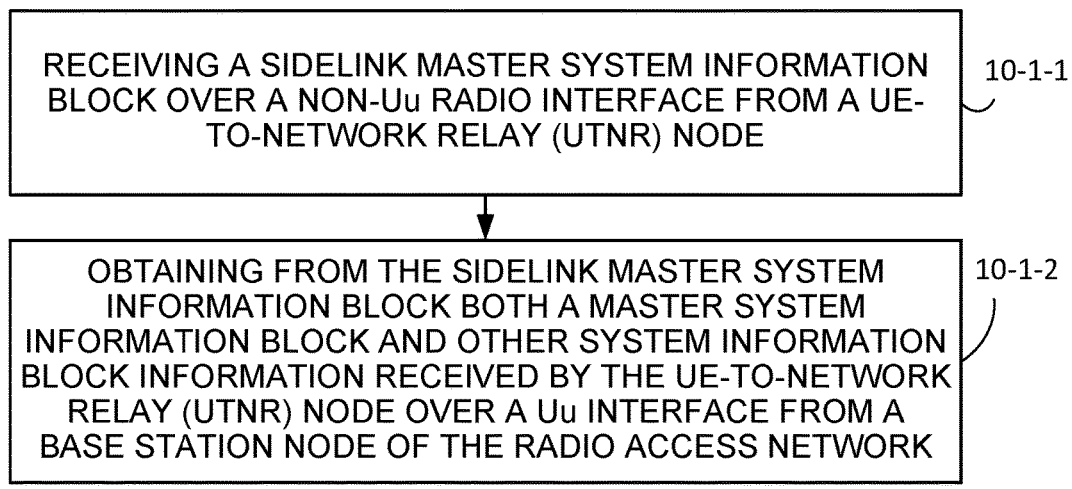
Figures 2, 9:
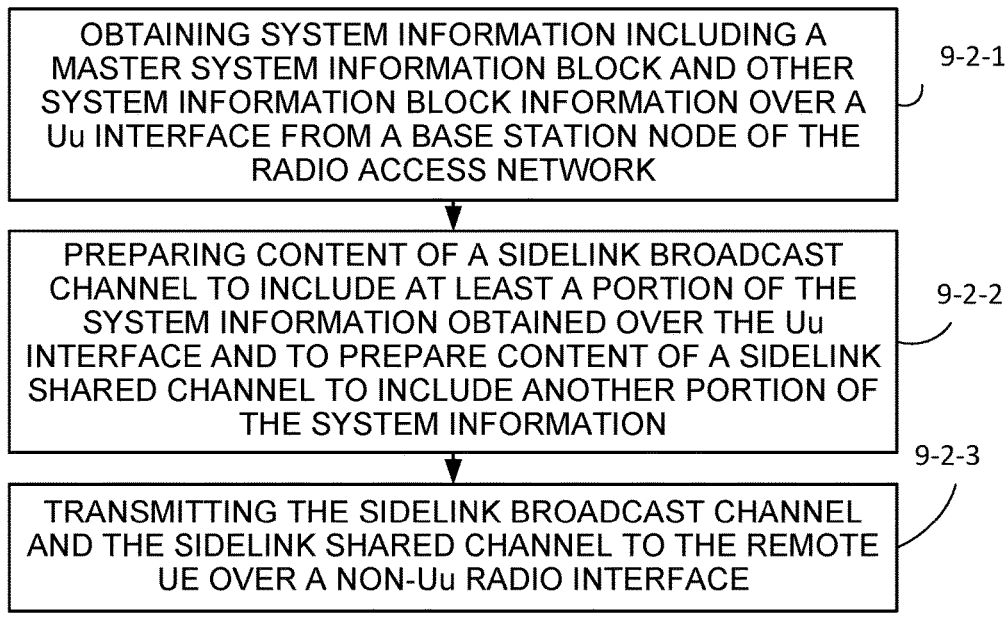
Figures 2, 10:
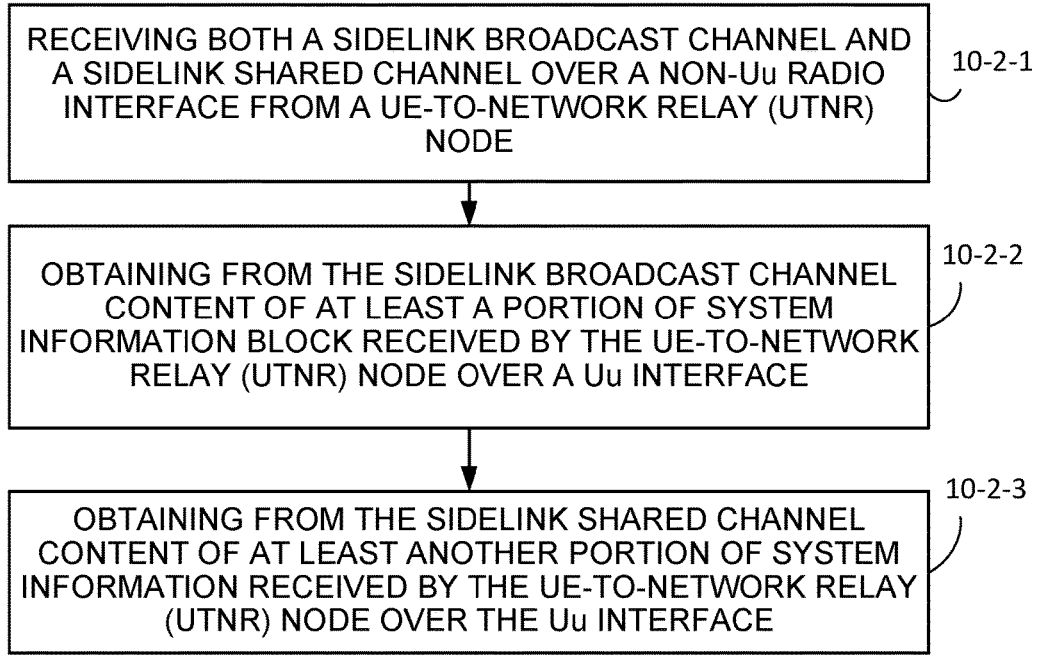
Figures 3, 9:
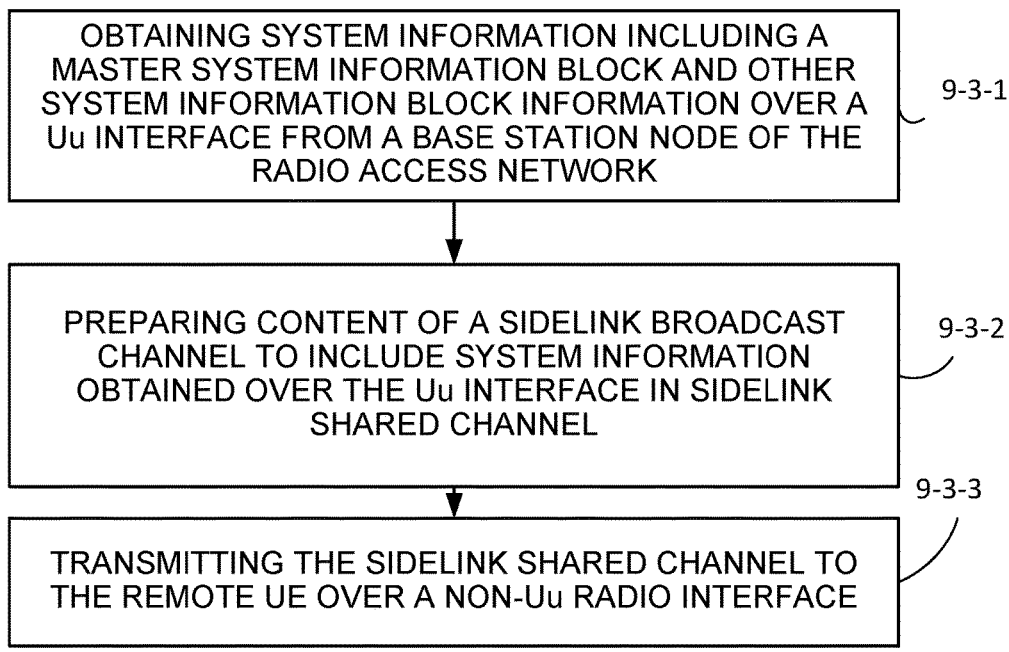
Figures 3, 10:
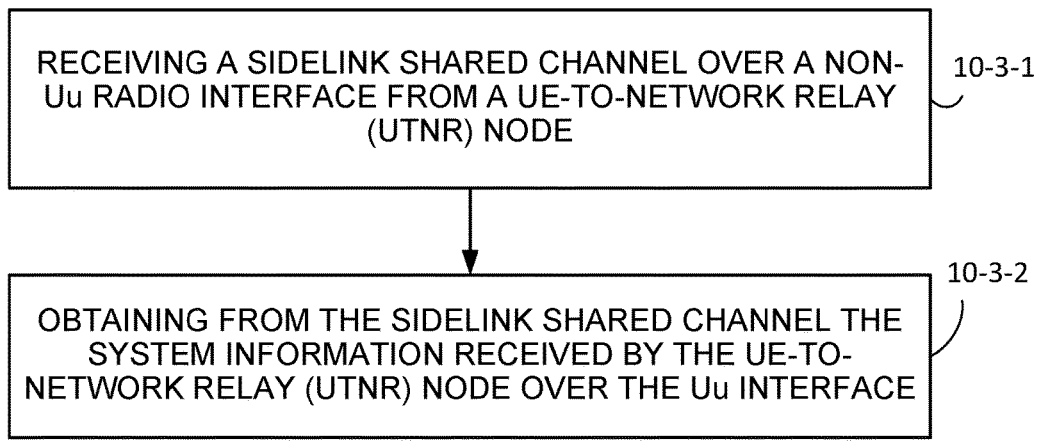

FIG. 10-1 shows example acts or steps performed by example embodiments and modes of the remote/evolved remote UE 26 of FIG. 8-1. Act 10-1-1 comprises receiving a sidelink master system information block over a non-Uu radio interface from a UE-to-Network Relay (UTNR) node. Act 10-1-2 comprises obtaining from the sidelink master system information block both a master system information block and other system information block information received by the UE-to-Network Relay (UTNR) node over a Uu interface from a base station node of the radio access network, the other system information block information being included in a vacation portion of the master system information block received by the UE-to-Network Relay (UTNR) node over the Uu interface.

J.2 UTNR Maps System Information to Plural SL Channels

Figure 11:
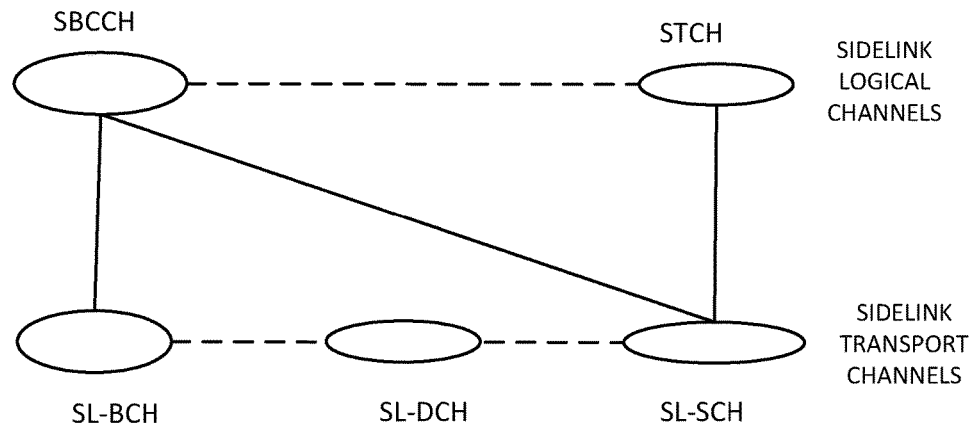
FIG. 11 is a diagrammatic view showing a mapping of SBCCH to SL-BCH and to SL-SCH.

In the example embodiments and modes of section J.2, the SBCCH is mapped to not only SL-BCH, but also to SL-SCH as shown in FIG. 11. The SL-BCH is still mapped to PSBCH, and the SL-SCH is mapped to PSSCH as shown in FIG. 2-3. These mappings are performed by SI processor 48-8-2 of FIG. 8-2.

In the section J.2 FIG. 8-2 example embodiments and modes, MasterinformationBlock-SL still carries MIB information for sidelink. If necessary, some extra bits for other necessarily MIB information can be carried as well in this message; then other SIB information can be carried by PSSCH. Therefore, all system information needed by remote/evolved remote UE (based on the system information alternatives mentioned in section I) are transmitted by PSBCH and PSSCH. Thus, similar to section J.1, the techniques of section J.2 are not pure relaying, but all MIB/SIB information carried by PSBCH/PSSCH is filled in or supplied by UNTR/evolved UNTR.

FIG. 8-2 shows an example UE-to-Network Relay (UTNR) node 24 and example remote/evolved remote UE 26 for section J.2 embodiments and modes. In FIG. 8-2, the UE-to-Network Relay (UTNR) node 24 comprises relay receiver 46 configured to obtain system information including a master system information block and other system information block information over a Uu interface from a base station node of the radio access network (as indicated by arrow 8-2-1 in FIG. 8-2). The SI processor 48-8-2 prepares content of a sidelink broadcast channel to include at least a portion of the system information obtained over the Uu interface and to prepare content of a sidelink shared channel to include another portion of the system information. The relay transmitter 44 is configured to transmit the sidelink broadcast channel (e.g., the PSBCH) and the sidelink shared channel (e.g., the PSSCH) to the remote UE over a non-Uu radio interface 29.

In the example embodiments and modes of section J.2, at least a portion of the system information obtained over the Uu interface is system information obtained from a master system information block received over the Uu interface; and another portion of the system information obtained over the Uu interface is system information other than master system information block information.

In an example implementation, the SI processor 48-8-2 is configured to: prepare content a sidelink broadcast transport channel to include at least a portion of the system information obtained over the Uu interface and a sidelink shared transport channel to include another portion of the system information; map the sidelink broadcast transport channel to a sidelink broadcast physical channel and to map the sidelink shared transport channel to a sidelink shared physical channel. The relay transmitter 44 is configured to transmit the sidelink broadcast physical channel and the sidelink shared physical channel to the remote UE over the non-Uu radio interface.

In the remote/evolved remote UE 26 of FIG. 8-2, UE receiver 56 is configured to receive both a sidelink broadcast channel and a sidelink shared channel over a non-Uu radio interface from a UE-to-Network Relay (UTNR) node. The UE processor 50 is configured to obtain from the sidelink broadcast channel content of at least a portion of system information block received by the UE-to-Network Relay (UTNR) node over a Uu interface, and to obtain from the sidelink shared channel content of at least another portion of system information received by the UE-to-Network Relay (UTNR) node over the Uu interface.

FIG. 9-2 shows example acts or steps performed by example embodiments and modes of the UE-to-Network Relay (UTNR) node 24 of FIG. 8-2. Act 9-2-1 comprises obtaining system information including a master system information block and other system information block information over a Uu interface from a base station node of the radio access network. Act 9-2-2 comprises using processor circuitry to prepare content of a sidelink broadcast channel to include at least a portion of the system information obtained over the Uu interface and to prepare content of a sidelink shared channel to include another portion of the system information. Act 9-2-3 comprises transmitting the sidelink broadcast channel and the sidelink shared channel to the remote UE over a non-Uu radio interface.

FIG. 10-2 shows example acts or steps performed by example embodiments and modes of the evolved remote UE 26 of FIG. 8-2. Act 10-2-1 comprises receiving both a sidelink broadcast channel and a sidelink shared channel over a non-Uu radio interface from a UE-to-Network Relay (UTNR) node. Act 10-2-2 comprises using processor circuitry to obtain from the sidelink broadcast channel content of at least a portion of system information block received by the UE-to-Network Relay (UTNR) node over a Uu interface. Act 10-2-3 comprises using processor circuitry to obtain from the sidelink shared channel content of at least another portion of system information received by the UE-to-Network Relay (UTNR) node over the Uu interface.

J.3 UTNR Maps System Information Only to PSSCH

In the embodiments and modes of section J.3 all system information needed by remote/evolved remote UE (based on the system information alternatives mentioned in section I) are relayed by the UNTR/evolved UNTR. In this case, since anyway there should be system information relay, there is even no need for PSBCH transmission anyway (only regarding UNTR, as out of coverage or non-UNTR in coverage UEs may still need to transmit PSBCH to perform Rel-13 network timing extension behaviors), so as to save the resource and power for the UNTR/evolved UNTR for transmission, as well as the power for the remote/evolved remote for monitoring and reception the PSBCH channel.

Most information carried by PSBCH is actually from MIB/SIB information, so there is no need to consider them anymore. The remaining PC5 related information, such as "inCoverage" indicator, if the remote/evolved remote UE can decode the relayed system information, the UE knows it is from in coverage UNTR/evolved UNTR, so there is no need to indicate this; such as "directFrameNumber" and "directSubframeNumber", the UE can get system frame number (SFN) from relayed system information directly, so the remote/evolved remote UE uses SFN directly as its timing, without requirement for using DFN as its timing.

Regarding the relay methods, it could be relayed by PSBCH (not filling the message carried by PSBCH as Alternative 1 indicated, but just relaying the whole information directly), or by PSBCH and PSSCH together, with the broadcast channel mapping relationship mentioned in section J.3.

FIG. 8-3 shows an example UE-to-Network Relay (UTNR) node 24 and example remote/evolved remote UE 26 for section J.3 embodiments and modes. In FIG. 8-2, the UE-to-Network Relay (UTNR) node 24 comprises relay receiver 46 configured to obtain system information including a master system information block and other system information block information over a Uu interface from a base station node of the radio access network (as indicated by arrow 8-3-1 in FIG. 8-3). The SI processor 48-8-3 prepares content of a sidelink shared channel to include the system information. The relay transmitter 44 is configured to transmit the sidelink shared channel (e.g., the PSSCH) to the remote UE over a non-Uu radio interface 29.

In the remote/evolved remote UE 26 of FIG. 8-3, UE receiver 56 is configured to receive a sidelink shared channel over a non-Uu radio interface from a UE-to-Network Relay (UTNR) node. The UE processor 50 is configured to obtain system information from the sidelink shared channel received by the UE-to-Network Relay (UTNR) node over the Uu interface.

FIG. 9-3 shows example acts or steps performed by example embodiments and modes of the UE-to-Network Relay (UTNR) node 24 of FIG. 8-3. Act 9-3-1 comprises obtaining system information including a master system information block and other system information block information over a Uu interface from a base station node of the radio access network. Act 9-3-2 comprises using processor circuitry to prepare content a sidelink shared channel to include the system information. Act 9-3-3 comprises transmitting the sidelink shared channel to the remote UE over a non-Uu radio interface.

FIG. 10-3 shows example acts or steps performed by example embodiments and modes of the evolved remote UE 26 of FIG. 8-3. Act 10-3-1 comprises receiving a sidelink shared channel over a non-Uu radio interface from a UE-to-Network Relay (UTNR) node. Act 10-3-2 comprises using processor circuitry to obtain from the sidelink shared channel the system information received by the UE-to-Network Relay (UTNR) node over the Uu interface.

J.4 Combination of Techniques

Any combinations of the above sections J.1 to J.3 may be utilized, such as some system information can be transmitted by PSBCH, and some system information are relayed by PSSCH, or some system information can be relayed by PSBCH, and some system information are transmitted by PSSCH.

K. Coverage Related System Information Transmission/Relaying

Figure 12:
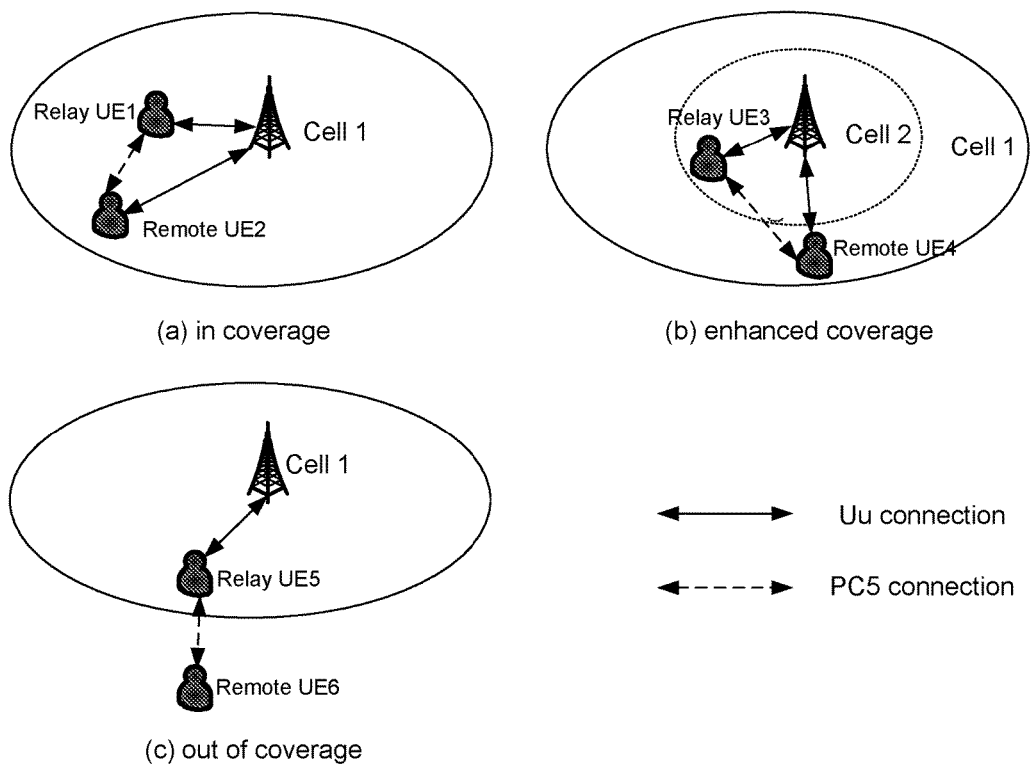
FIG. 12 is a diagrammatic view showing different coverage scenarios for an evolved remote UE.

FIG. 12 is a diagrammatic view showing different coverage scenarios for an evolved remote UE. In FIG. 12, in some example embodiments and modes the connections may all be bi-directional, but the technology disclosed herein also covers the case wherein some or all of connections may be uni-directional. Thus, FIG. 12 is drawn as bi-directional only for example purposes. Moreover, in FIG. 12 the dashed connection lines denote either a PC5 sidelink connection or non-3GPP connection (such as WiFi, Bluetooth, etc.).

Figure 13:
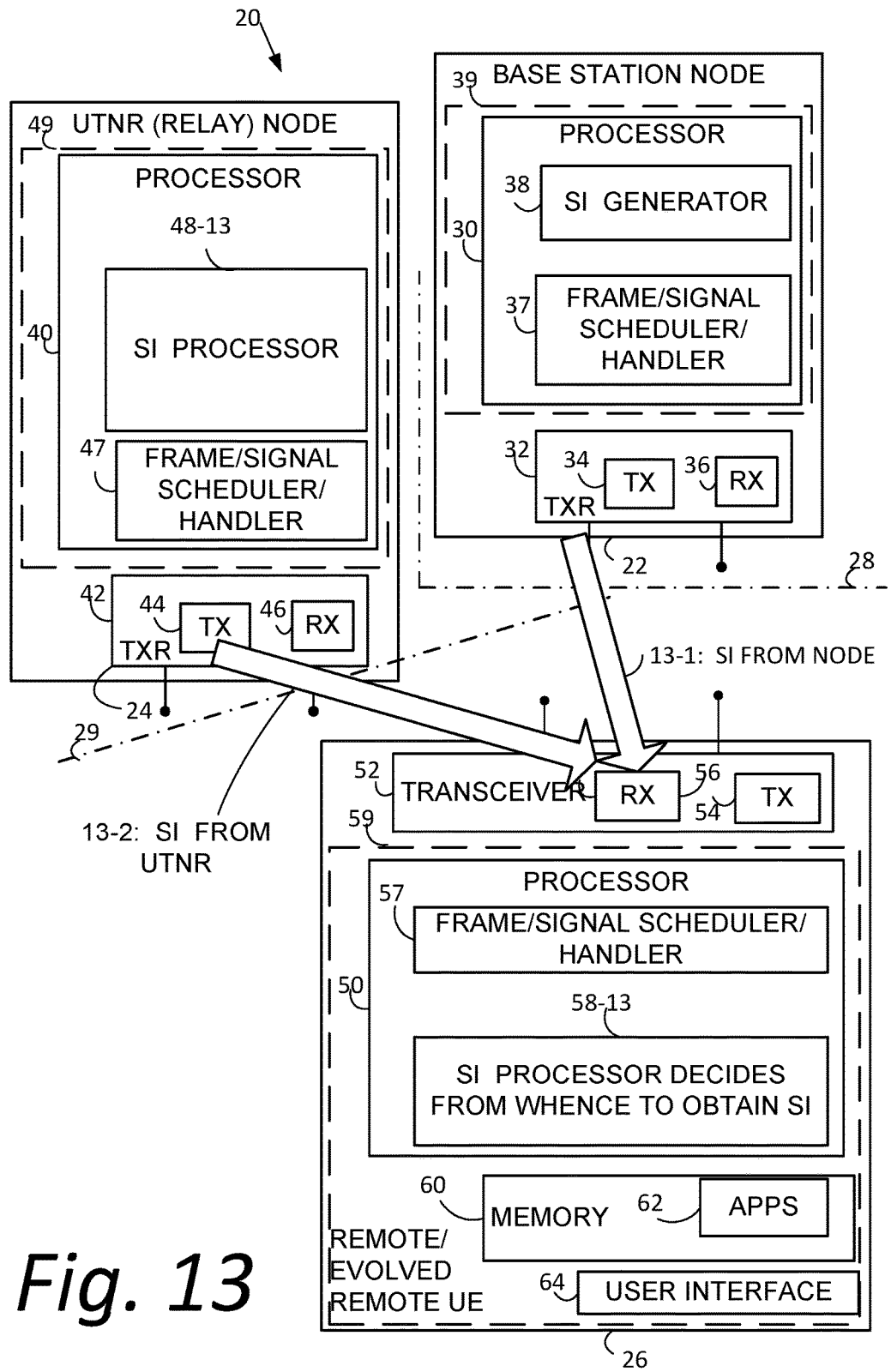
FIG. 13 is a schematic view of a generic communications network wherein a remote/evolved remote UE makes a decision regarding source of system information to use for communications.

FIG. 13 shows an example UE-to-Network Relay (UTNR) node 24 and example remote/evolved remote UE 26 for section K embodiments and modes. In FIG. 13, the remote/evolved remote UE 26 comprises UE transceiver 52 configured to communicate over a Uu interface 28 with a base station node when the UE is in network coverage or in enhanced coverage, and to communicate over a non-Uu interface 29 with a UE-to-Network Relay (UTNR) when the UE is out of network coverage or in enhanced coverage. The UE processor 50 is configured to determine whether the UE is to obtain system information over the Uu interface or over the non-Uu interface when the UE is in network coverage or in enhanced coverage. In other words, the UE processor 50 is configured to determine from whence (the base station node 22 or the UE-to-Network Relay (UTNR) node 24) to obtain the system information. The UE transceiver 52 is configured to obtain the system information in accordance with the determination.

K.1 when the Remote/Evolved UE is in Coverage

Figure 14:
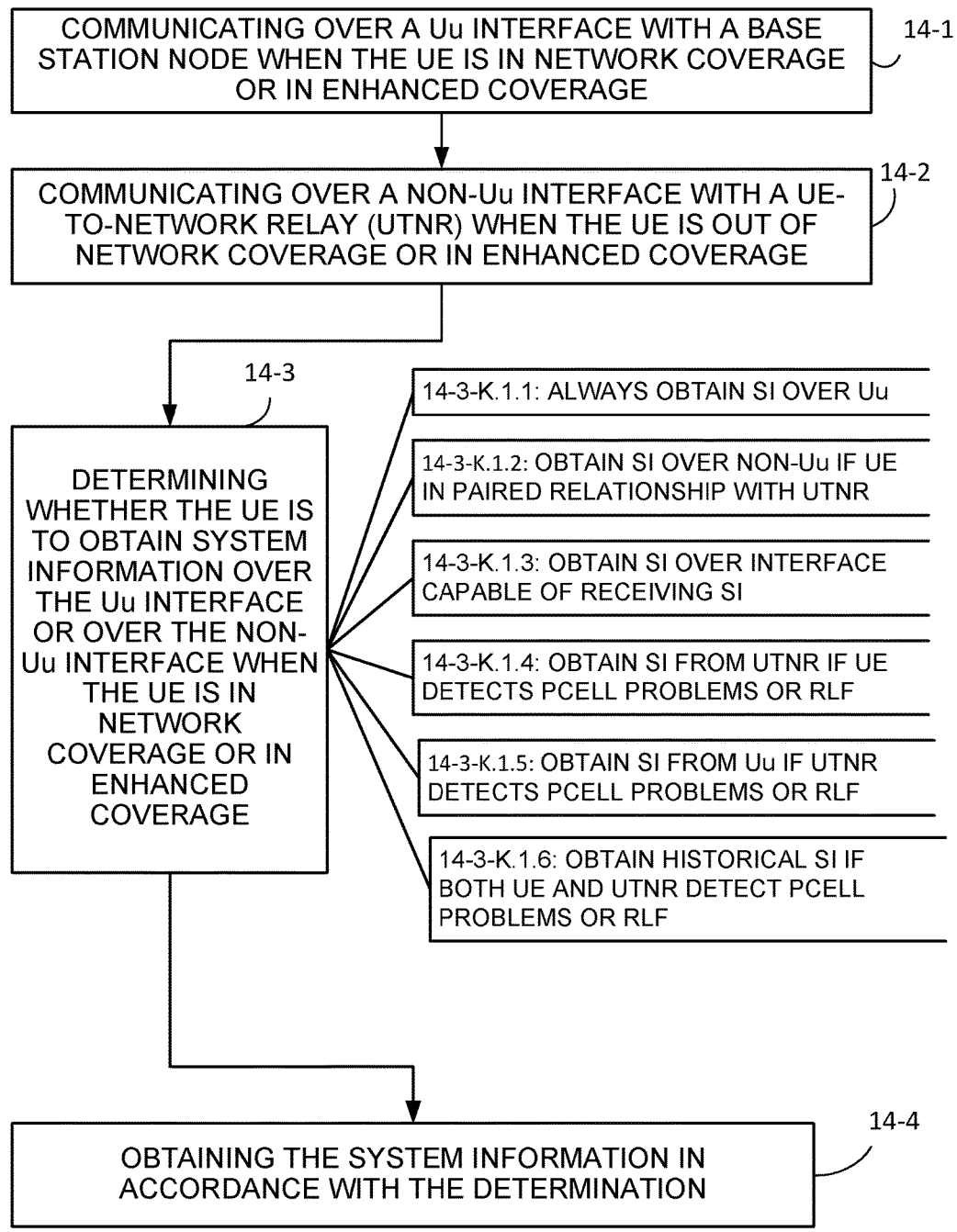
FIG. 14 is a flowchart showing basic, representative acts or steps performed by a remote/evolved remote UE of the network of FIG. 13, and further showing various alternative techniques for making the decision regarding source of system information to use for communications when the remote/evolved remote UE is in network coverage or in enhanced coverage.

FIG. 14 shows example, representative acts or steps performed by remote/evolved remote UE 26 for determining a source of the system information to be used by the remote/evolved remote UE 26 when the remote/evolved remote UE 26 is in coverage and also in extended coverage. Act 14-1 comprises the UE transceiver 52 communicating over a Uu interface with a base station node when the UE is in network coverage or in enhanced coverage. Act 14-2 comprises the UE transceiver 52 communicating over a non-Uu interface with a UE-to-Network Relay (UTNR) when the UE is out of network coverage or in enhanced coverage. Act 14-3 comprises using processor circuitry, e.g., UE processor 50-13, to determine whether the UE is to obtain system information over the Uu interface or over the non-Uu interface when the UE is in network coverage or in enhanced coverage. Act 14-3 comprises the UE processor 50-13 working with UE transceiver 52 for obtaining the system information in accordance with the determination.

Example embodiments and modes of sections K.1.1 through K.1.6 below describe differing techniques for the remote/evolved UE to determine how to obtain system information when the remote/evolved UE is in coverage. In essence, the UE processor 50 performs act 14-3 differently for the different sections K.1.1 through K.1.6, as also illustrated in FIG. 14.

K.1.1 Aways from Base Station

In accordance with example embodiments and modes of section K.1.1: The remote/evolved remote UE always receives all MIB/SIB information from Uu interface between remote/evolved remote and network directly. In other words, the UE processor 50 is configured to always obtain the system information over the Uu interface when the system information is available from over both the Uu interface and the non-Uu interface.

K.1.2 from UTNR if Paired Relationship

In accordance with example embodiments and modes of section K.1.2, if the UTNR/evolved UTNR and remote/evolved remote UE are paired, the UTNR/evolved UTNR serves as the agent for the remote/evolved remote UE, and the remote/evolved remote UE always receives all MIB/SIB information from UTNR/evolved UTNR in the PC5 interface between UTNR/evolved UTNR and remote/evolved remote UE. As used herein, "paired" means any situation that the remote/evolved remote UE is attached to the UTNR/evolved UTNR, e.g., the remote/evolved remote UE always maintains a connection with the UTNR/evolved UTNR; or if there is not always connection for power issue, the remote/evolved remote UE can monitor UTNR/evolved UTNR, and may only monitor interface with UTNR/evolved UTNR without monitoring Uu interface with eNB directly.

Thus, in accordance with the example embodiments and modes of section K.1.2 the UE processor 50 is configured to obtain the system information over the non-Uu interface when the UE is a paired relationship with the UE-to-Network Relay (UTNR) node. In an example implementation the paired relationship comprises a persistently maintained connection between the UE and the relay. In another example implementation the paired relationship comprises the UE persistently monitoring the non-Uu interface with the UE-to-Network Relay (UTNR) node. As used herein, "persistent" may be, for example, over a predetermined length of time.

K.1.3 Low Capabiity UE

In accordance with example embodiments and modes of section K.1.3, if the remote/evolved remote UE is low complexity low cost device, it has no capability to monitor both of Uu interface and other interface, such as PC5 or Bluetooth, then the remote/evolved remote UE reads MIB/SIB information in the interface capable of receiving system information. In other words, when the SI processor 58-13 is unable to monitor both the Uu interface and the non-Uu interface, the SI processor 58-13 determines the interface over which the UE receives system information as being the interface over which the UE is capable of receiving the system information. Thus for section K.1.3 the remote/evolved remote UE 26 can only read the MIB/SIB information in the interface capable of receiving system information, which is an issue of UE capability and likely will be a long-term if not permanent issue.

K.1.4 UE Detects Problems or RLF at PCell

In accordance with example embodiments and modes of section K.1.4, if the PCell at which the remote/evolved remote UE detected physical layer problems or radio link failure (RLF), the remote/evolved remote UE may not be able to get the system information in the Uu interface of the cell. Therefore, for section K.1.4 the remote/evolved remote UE receives the system information via UTNR/evolved UTNR relaying, e.g., over the non-Uu interface 29.

K.1.5 UTNR Detects Problems or RLF at PCell

In accordance with example embodiments and modes of section K.1.5, if the UE-to-Network Relay (UTNR) node 24 detects the PCell at which the UTNR/evolved UTNR detected physical layer problems or radio link failure at the PCell, the remote/evolved remote UE receives the system information in the Uu interface. In section K.1.5, the UE-to-Network Relay (UTNR) node 24 UTNR detects there is link problem occurring in the Uu link between UTNR and the network, and communicates with the remote/evolved remote UE 26, e.g., some signaling (dedicated if the UTNR is connected with one remote UE; or dedicated or broadcasted (both may be possible) if the UTNR is connected with multiple remote UE), so the remote UE either finds another UTNR or just receives the system information in the Uu interface.

K.1.6 Problems at PCell for UTNR and UE

In accordance with example embodiments and modes of section K.1.6, if the PCell at which both the UTNR/evolved UTNR and remote/evolved remote UE detected physical layer problems or radio link failure, the remote/evolved remote UE receives the system information via UTNR/evolved UTNR relaying. More particularly, since the UTNR/evolved UTNR cannot receive system information, the system information relayed is the one stored in the UTNR/evolved UTNR (e.g., system information which was previously stored at the UE-to-Network Relay (UTNR) node 24).

K.2 when the Remote/Evolved UE is in Enhanced Coverage

Example embodiments and modes of sections K.2.1 through K.2.6 below describe logic of the remote/evolved UE for obtaining system information when the remote/evolved UE is in enhanced coverage. When the remote/evolved UE is in enhanced coverage the example embodiments and modes of sections K.1.1 through K.1.6 described above may also be used. Thus, the example embodiments and modes of sections K.2.1 through K.2.6 below are in addition to the example embodiments and modes of sections K.1.1 through K.1.6.

Figure 15:
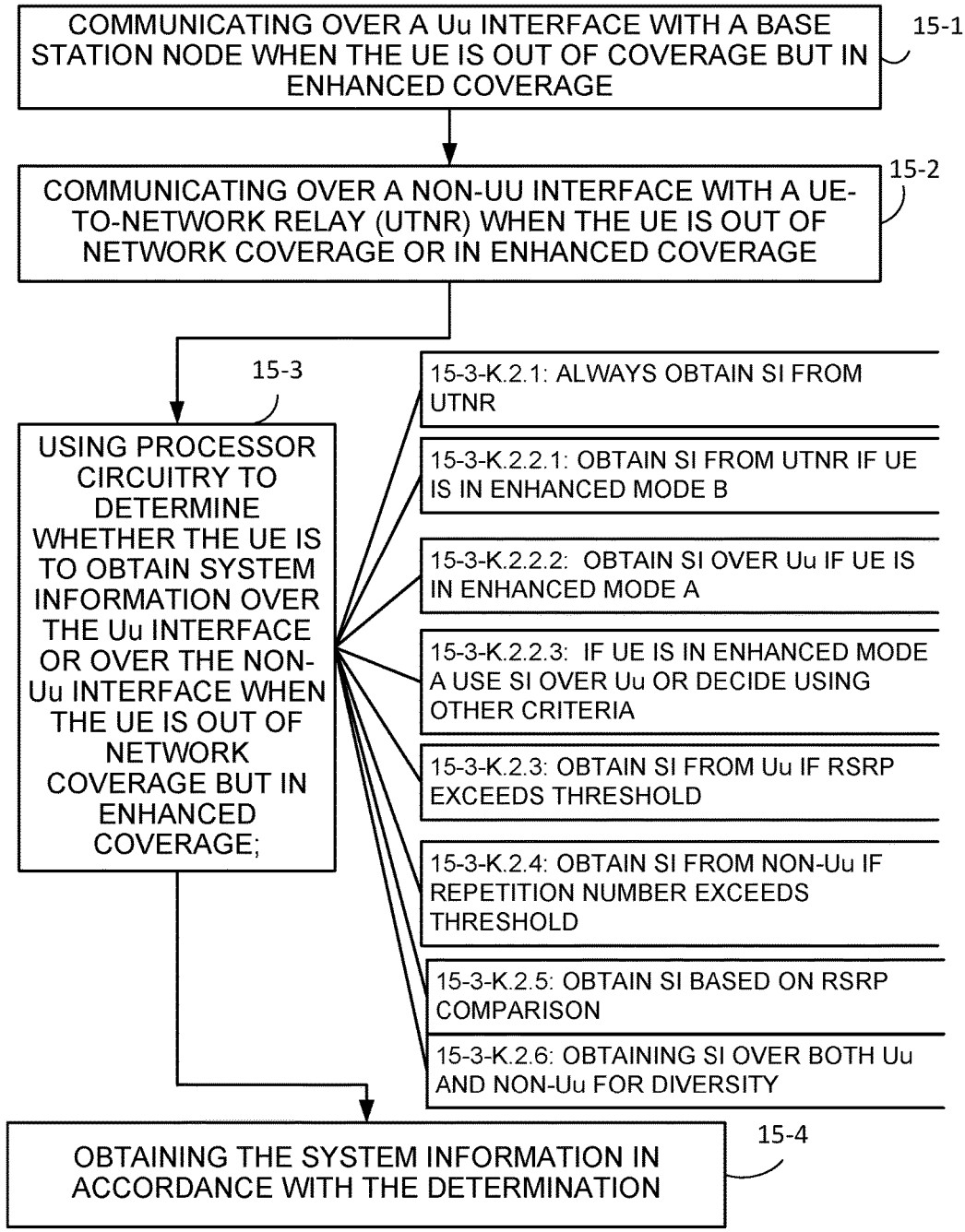
FIG. 15 is a flowchart showing basic, representative acts or steps performed by a remote/evolved remote UE of the network of FIG. 13, and further showing various alternative techniques for making the decision regarding source of system information to use for communications when the remote/evolved remote UE is only in enhanced coverage.

FIG. 15 shows example, representative acts or steps performed by remote/evolved remote UE 26 for determining source of the system information to be used by the remote/evolved remote UE 26 when the remote/evolved remote UE 26 is not in coverage and is in extended coverage. Act 15-1 comprises communicating over a Uu interface with a base station node when the UE is out of coverage but in enhanced coverage. Act 15-2 comprises communicating over a non-Uu interface with a UE-to-Network Relay (UTNR) when the UE is out of network coverage or in enhanced coverage. Act 15-3 comprises using UE processor 50-13 to determine whether the UE is to obtain system information over the Uu interface or over the non-Uu interface when the UE is out of network coverage but in enhanced coverage. Act 15-4 comprises obtaining the system information in accordance with the determination of act 15-3.

In essence, the UE processor 50 performs act 15-3 differently for the different sections K.2.1 through K.2.6, as also illustrated in FIG. 15.

K.2.1 Always Obtain SI from UTNR

In accordance with example embodiments and modes of section K.2.1, if the remote/evolved remote UE is enhanced coverage, the UE uses UTNR/evolved UTNR to relay system information.

K.2.2 Obtain SI in Accordance with Enhanced Coverage Mode

There are two enhanced coverage modes: CEModeA and CEModeB. CEModeA is more like normal coverage behavior with some repetition; CEModeB is more like extreme behavior with large amount of repetition [See, e.g., section G and section H]. In accordance with example embodiments and modes of section K.2.2, only when the remote/evolved remote UE is in CEModeB, the UE uses UTNR/evolved UTNR to relay system information. When the remote/evolved remote UE is in CEModeA, the UE either uses Uu interface to receive system information, or by some further criteria to decide the way to receive system information, e.g., the criteria from section K.2.3 or section K.2.4.

K.2.3 Obtain SI Dependent Upon Uu RSRP

In accordance with example embodiments and modes of section K.2.3, the remote/evolved remote UE 26 decides whether it uses UTNR/evolved UTNR to relay system information according to an RSRP measurement of the Uu interface. For example, the UE processor 58-13 of remote/evolved remote UE 26 may make a comparison of the reference signal received power (RSRP) over the Uu interface 28 with a threshold, and if the RSRP exceeds the threshold, the system information is obtained over the Uu interface 28. The RSRP threshold(s) may be signaled from the network to the remote/evolved remote UE or preconfigured in the UE.

K.2.4 Obtain SI Dependent Upon Repetition Number

In accordance with example embodiments and modes of section K.2.4, the remote/evolved remote UE 26 decides whether it uses UTNR/evolved UTNR to relay system information according to the repetition number the remote/evolved remote UE is allocated. The repetition number is allocated by the base station node 22 to the remote/evolved remote UE 26. For example, the UE SI processor 58-13 of remote/evolved remote UE 26 may make a comparison of the repetition number with a threshold, and if the repetition number exceeds the threshold, the system information is obtained over the non-Uu interface 29. The repetition number threshold(s) may be signaled from the network to the remote/evolved remote UE or pre-configured in the UE.

K.2.5 Obtain SI Dependent Upon RSRP Comparison

In accordance with example embodiments and modes of section K.2.5, the remote/evolved remote UE decides whether it uses UTNR/evolved UTNR to relay system information according to total RSRP value comparison between Uu interface and Uu interface+sidelink S-RSRP (sidelink RSRP). In section K.2.5, there are always two options for comparison: one is Uu link directly between remote and eNB, the other is Uu link between UTNR and eNB+sidelink link between UTNR and remote UE. So the method of section K.2.5 is actually to compare the total energy required for each option and pick the one with less power required. This is system level optimization, so make sure the total system power consumption is the lowest. e.g., the RSRP of direct Uu link is X dB, and the S-RSRP (sidelink RSRP) is Y dB, so for remote UE, its required power Y is always lower than X required for direct Uu connect. However, in this case, the Uu RSRP between UTNR and eNB is Z, and Y+Z>X, if system performance is the first priority to be considered in that deployment, then the direct Uu system information reception should be taken, though at the cost of more remote UE power.

K.2.6 UE Uses System Information Diversity

In accordance with example embodiments and modes of section K.2.6, the remote/evolved remote UE 26 simultaneously receives transmissions (e.g., system information) over two links (Uu interface, and Uu interface+sidelink interface) for sake of diversity for reception, and thereby providing a performance gain for the advanced coverage UE to decode system information. So in section K.2.6, the remote/evolved remote UE 26 can monitor two ways of system information together.

Figure 16:
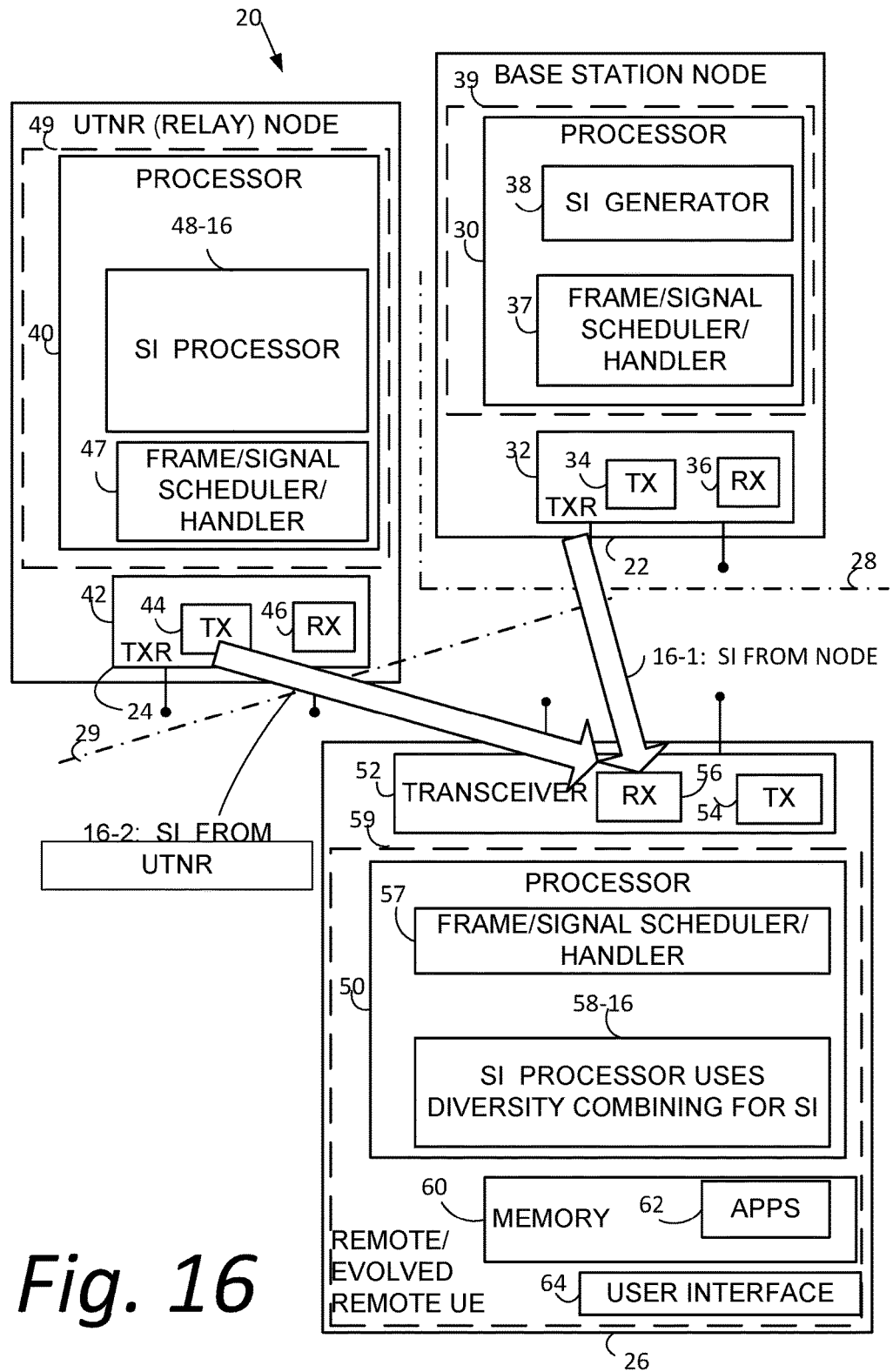
FIG. 16 is a schematic view of a generic communications network wherein a remote/evolved remote UE uses diversity combining of system information over a Uu interface 28 and a non-Uu interface 29 for obtaining system information to use for communications.

FIG. 16 shows an example UE-to-Network Relay (UTNR) node 24 and example remote/evolved remote UE 26 for section K.2.6 embodiments and modes.

In FIG. 16, the remote/evolved remote UE 26 comprises UE transceiver 52 configured to communicate over a Uu interface 28 with a base station node when the UE is in enhanced coverage, and to communicate over a non-Uu interface 29 with a UE-to-Network Relay (UTNR) when the UE is in enhanced coverage. The UE SI processor 58-16 is configured to obtain (1) system information over the Uu interface [as indicated by arrow 16-1] and (2) system information over the non-Uu interface [as indicated by arrow 16-2] when the UE is in enhanced coverage and to use diversity combining of both (1) and (2) to determine system information. As indicated above, use of diversity combining may provide a performance gain for the advanced coverage UE to decode system information.

Figure 17:
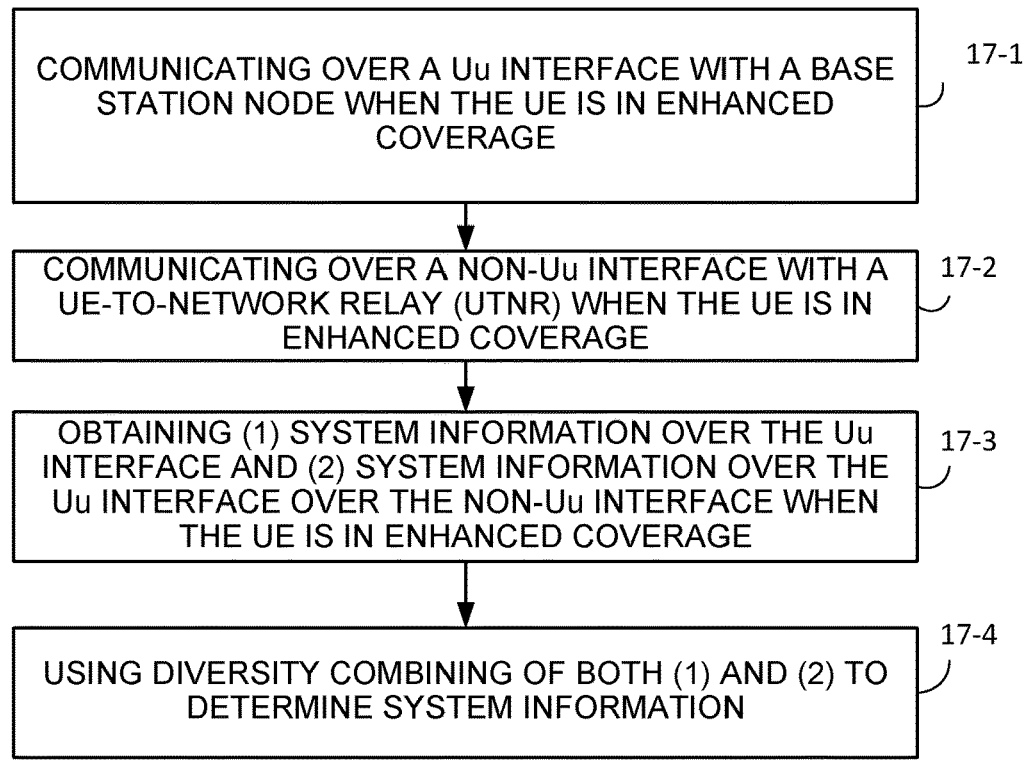
FIG. 17 is a flowchart showing basic, representative acts or steps performed by a remote/evolved remote UE of the network of FIG. 16.

FIG. 17 illustrates example, representative acts or steps performed by the remote/evolved remote UE 26 of FIG. 16 in conjunction with the example embodiments and modes of section K.2.6. Act 17-1 comprises the remote/evolved remote UE 26 communicating over a Uu interface with a base station node when the UE is in enhanced coverage (as depicted by arrow 17-1). Act 17-2 comprises the remote/evolved remote UE 26 communicating over a non-Uu interface with a UE-to-Network Relay (UTNR) when the UE is in enhanced coverage (as depicted by arrow 17-2). Act 17-3 comprises the remote/evolved remote UE 26, and SI processor 58-16 in particular, obtaining (1) system information over the Uu interface and (2) system information over the Uu interface over the non-Uu interface when the UE is in enhanced coverage. Act 17-4 comprises the SI processor 58-16 using diversity combining of both (1) and (2) to determine system information.

K.3 when the Remote/Evolved UE is Out of Coverage

The remote/evolved remote UE has no way to receive system information in Uu interface, the system information is always obtained via UTNR/evolved UTNR.

L. Machine Structure

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system, and is capable of being performed using any CPU architecture. The instructions of such software are stored on non-transient computer readable media.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

Figure 18:
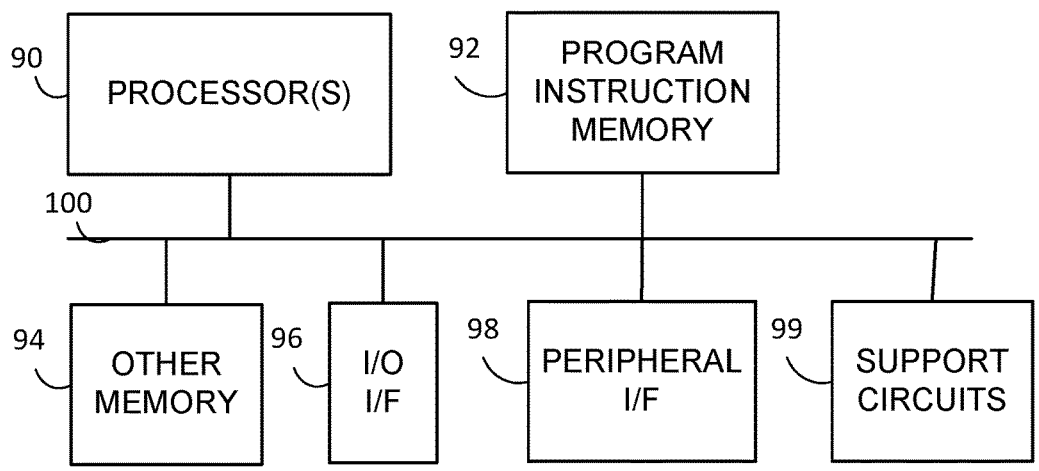
FIG. 18 is a diagrammatic view showing example computer machinery comprising a machine platform which may comprise a base station node, a UE-to-Network Relay (UTNR) node, or a remote/evolved remote UE according to example embodiments and modes.

As mentioned above, certain units and functionalities of base station node 22, UE-to-Network Relay (UTNR) node 24, and remote/evolved remote UE 26 are, in example embodiments, implemented by or on a machine platform, such as the respective platforms 39, 49, and 59 of FIG. 1. Such machine platforms may take the forms of electronic machinery, computer, and/or circuitry. For example, the base station processor 30, relay processor 40, and UE processor 50 of the example embodiments herein described and/or encompassed may be comprised by the machine platform/computer circuitry of FIG. 18. FIG. 18 shows an example of such electronic machinery or circuitry, whether node or terminal, as comprising one or more processor(s) circuits 90, program instruction memory 92; other memory 94 (e.g., RAM, cache, etc.); input/output interfaces 96; peripheral interfaces 98; support circuits 99; and busses 100 for communication between the aforementioned units.

The program instruction memory 92 may comprise coded instructions which, when executed by the processor(s), perform acts including but not limited to those described herein. Thus is understood that each of node processor 30 and terminal processor 40, for example, comprise memory in which non-transient instructions are stored for execution.

The memory 94, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 99 are coupled to the processors 90 for supporting the processor in a conventional manner. These circuits include cache, power supplies, clock circuits, input/output circuitry and subsystems, and the like.

Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

A non-exhaustive list of documents potentially pertinent to the technology disclosed herein includes the following (all of which are incorporated herein by reference):
  3GPP TS 36.331, V 13.2.0
  3GPP TS 36.304, V 13.2.0
  3GPP TS 36.300, V 13.4.0
  R2-165254, "Considerations on the evolved UE-to-Network Relay scenario and architecture", ZTE, Gothenburg, Sweden, Aug. 22-26, 2016.
  3GPP TS 36.213, V 13.2.0
  3GPP TS 23.303
  RP-160677, "New SI: Further Enhancements LTE Device-to-Device, UE-to-Network Relays for Wearables", Qualcomm Incorporated, Intel Corporation, Huawei, HiSilicon, LG Electronics Inc., Gothenburg, Sweden, Mar. 7-10, 2016
  3GPP TR 36.888, V12.0.0, "Study on provision of low-cost Machine-Type Communications (MTC) User Equipments (UEs) based on LTE
  RP-161303, Further Enhancements to LTE Device to Device, UE to Network Relays for IoT and Wearables, RAN#72, Korea, June 2016
  R2-165599, "Relaying options of CP/UP", LG Electronics Inc., Gothenburg, Sweden, Aug. 22-26, 2016.

The technology disclosed herein is thus understood to comprise and encompass the following non-exclusive example embodiment and modes: *

Example Embodiment I.1_UTNR_Apparatus

In one of its example aspects the technology disclosed herein concerns a UE-to-Network Relay (UTNR) node comprising a radio access network. The UTNR node comprises receiver circuitry, processor circuitry, and transmitter circuitry. The receiver circuitry is configured to obtain system information over a Uu interface from a base station node of the radio access network. The processor circuitry is arranged to configure control information for transmission to a remote UE and to include in the control information all system information which is available or decodable from the base station. The transmitter circuitry is configured to transmit the control information to the remote UE over a non-Uu radio interface.

Example Embodiment I.1_UTNR_Apparatus-1

In an example embodiment and mode the non-Uu interface is a PC5 interface.

Example Embodiment I.1_UTNR_Apparatus-2

In an example embodiment and mode the non-Uu interface is a non-3GPP interface.

Example Embodiment I.1_UTNR_Apparatus-3

In an example embodiment and mode the processor circuitry is arranged to include the all system information, available or decodable from the base station, in the control information without regard of category type of the remote UE.

Example Embodiment I.2_UTNR_Apparatus

In one of its example aspects the technology disclosed herein concern a UE-to-Network Relay (UTNR) node comprising a radio access network. The UTNR node comprises receiver circuitry, processor circuitry, and transmitter circuitry. The receiver circuitry is configured to receive, from a remote UE over a non-Uu radio interface, a request message configured to obtain system information, the request message including request message content related to system information suitable for the remote UE. The processor circuitry is arranged to configure a response message including the system information suitable for the remote UE in dependence on the message content. The transmitter circuitry is configured to transmit the response message to the remote UE over the non-Uu radio interface.

Example Embodiment I.2_UTNR_Apparatus-1

In an example embodiment and mode the request message content is category information of the remote UE, and wherein the processor circuitry is configured to determine the system information suitable for the remote UE based on the category information of the remote UE.

Example Embodiment I.2_UTNR_Apparatus-2

In an example embodiment and mode the request message content comprises identification of type(s) of system information suitable for the remote UE.

Example Embodiment I.2_UTNR_Apparatus-3

In an example embodiment and mode the request message content comprises a list of one or more system information blocks suitable for the remote UE.

Example Embodiment I.2_UTNR_Apparatus-4

In an example embodiment and mode the receiver circuitry is further configured to obtain system information over a Uu interface from a base station node of the radio access network during a system information acquisition window comprising plural repetitions of transmission of the system information over the Uu interface; and the processor is arranged to configure the response message upon completion of the system information acquisition window.

Example Embodiment I.3_UTNR_Apparatus

In an example embodiment and mode the receiver circuitry is further configured to obtain system information over a Uu interface from a base station node of the radio access network during a system information acquisition window comprising plural repetitions of transmission of the system information over the Uu interface; and the processor is arranged to configure response message prior to completion of the system information acquisition window.

Example Embodiment I.3_UTNR_Apparatus-1

In an example embodiment and mode the non-Uu interface is a PC5 interface.

Example Embodiment I.3_UTNR_Apparatus-2

In an example embodiment and mode the non-Uu interface is a non-3GPP interface.

Example Embodiment I.3_UTNR_Apparatus

In an example embodiment and mode the transmitter circuitry is further configured to transmit an indication that the UE-to-Network Relay (UTNR) node is ready to transmit system information over the non-Uu interface, and the receiver circuitry is configured to thereafter receive, from the remote UE over the non-Uu radio interface, the request message including the request message content related to the system information suitable for the remote UE.

Example Embodiment I.4_UTNR_Apparatus

In one of its example aspects the technology disclosed herein concerns a UE-to-Network Relay (UTNR) node comprising a radio access network. The UTNR node comprises transmitter circuitry and processor circuitry. The transceiver circuitry is configured to transmit and receive first protocol layer messages comprising a UE sidelink discovery procedure over a non-UU interface with a remote UE. The processor circuitry configured to process in the UE sidelink discovery procedure a message of a first protocol layer whereby the processor circuitry determines type(s) of system information suitable for the remote UE. The transceiver circuitry is further configured to transmit the type(s) of system information suitable for the remote UE over the non-Uu interface using a second protocol layer, the second protocol layer being lower than the first protocol.

Example Embodiment I.4_UTNR_Apparatus-1

In an example embodiment and mode the message of the first protocol layer comprises a request message transmitted by the remote UE including request message content related to system information suitable for the remote UE.

Example Embodiment I.4_UTNR_Apparatus-2

In an example embodiment and mode the request message content is category information of the remote UE, and the processor circuitry is configured to determine the system information suitable for the remote UE based on the category information of the remote UE.

Example Embodiment I.4_UTNR_Apparatus-3

In an example embodiment and mode the request message content comprises identification of type(s) of system information suitable for the remote UE.

Example Embodiment J.1_UTNR_Apparatus

In one of its example aspects the technology disclosed herein concerns a UE-to-Network Relay (UTNR) node comprising a radio access network. The UTNR node comprises receiver circuitry, processor circuitry, and transmitter circuitry. The receiver circuitry is configured to obtain system information including a master system information block and other system information block information over a Uu interface from a base station node of the radio access network. The processor circuitry is arranged to prepare a sidelink master system block for transmission to a remote UE by including at least some of the other system block information obtained over the Uu interface in a vacant portion of the master system information block, the included other system block information being pertinent to sidelink communications. The transmitter circuitry is configured to transmit the sidelink master system information block to the remote UE over a non-Uu radio interface.

Example Embodiment J.1_UTNR_Apparatus-1

In an example embodiment and mode the vacant portion of the master system information block comprises reserved bits of the master system information block.

Example Embodiment J.2_UTNR_Apparatus

In one of its example aspects the technology disclosed herein concerns a UE-to-Network Relay (UTNR) node comprising a radio access network. The UTNR node comprises receiver circuitry configured to obtain system information including a master system information block and other system information block information over a Uu interface from a base station node of the radio access network; processor circuitry arranged to prepare content of a sidelink broadcast channel to include at least a portion of the system information obtained over the Uu interface and to prepare content of a sidelink shared channel to include another portion of the system information; transmitter circuitry configured to transmit the sidelink broadcast channel and the sidelink shared channel to the remote UE over a non-Uu radio interface.

Example Embodiment J.2_UTNR_Apparatus-1

In an example embodiment and mode the at least a portion of the system information obtained over the Uu interface is system information obtained from a master system information block received over the Uu interface; and wherein the another portion of the system information obtained over the Uu interface is system information other than master system information block information.

Example Embodiment J.2_UTNR_Apparatus-2

In an example embodiment and mode the processor circuitry is arranged to: prepare content a sidelink broadcast transport channel to include at least a portion of the system information obtained over the Uu interface and a sidelink shared transport channel to include another portion of the system information; map the sidelink broadcast transport channel to a sidelink broadcast physical channel and to map the sidelink shared transport channel to a sidelink shared physical channel. The transmitter circuitry is configured to transmit the sidelink broadcast physical channel and the sidelink shared physical channel to the remote UE over the non-Uu radio interface.

Example Embodiment J.3_UTNR_Apparatus

In one of its example aspects the technology disclosed herein concerns a UE-to-Network Relay (UTNR) node comprising a radio access network. The UTNR node comprises receiver circuitry, processor circuitry, and transmitter circuitry. The receiver circuitry is configured to obtain system information including a master system information block and other system information block information over a Uu interface from a base station node of the radio access network. The processor circuitry is arranged to include the system information obtained over the Uu interface in a sidelink shared channel. The transmitter circuitry is configured to transmit the sidelink shared channel to the remote UE over a non-Uu radio interface.

Example Embodiment I.1_UE_Apparatus

In one of its example aspects the technology disclosed herein concerns a user equipment (UE) comprising receiver circuitry and processor circuitry. The receiver circuitry is configured to obtain system information over a non-Uu interface from a UE-to-Network Relay (UTNR) node, the system information obtained over the non-Uu interface including all system information which is available to the UE-to-Network Relay (UTNR) node or decodable by the UE-to-Network Relay (UTNR) node from a base station over a Uu interface. The processor circuitry is arranged to use the system information obtained over the non-Uu interface in conjunction with sidelink communications.

Example Embodiment I.1_UE_Apparatus-1

In an example embodiment and mode the non-Uu interface is a PC5 interface.

Example Embodiment I.1_UE_Apparatus-2

In an example embodiment and mode the non-Uu interface is a non-3GPP interface.

Example Embodiment I.2_UE_Apparatus

In one of its example aspects the technology disclosed herein concerns a user equipment (UE) comprising processor circuitry, transmitter circuitry, and receiver circuitry. The processor circuitry is arranged to generate a request message configured to obtain system information, the request message including request message content related to system information suitable for the UE. The transmitter circuitry is configured to transmit the request message to a UE-to-Network Relay (UTNR) node over a non-Uu interface. The receiver circuitry is configured to receive from the UE-to-Network Relay (UTNR) node over the non-Uu interface a response message comprising the system information suitable for the UE.

Example Embodiment I.2_UE_Apparatus-1

In an example embodiment and mode the request message content is category information of the UE.

Example Embodiment I.2_UE_Apparatus-2

In an example embodiment and mode the request message content comprises identification of type(s) of system information suitable for the UE.

Example Embodiment I.2_UE_Apparatus-3

In an example embodiment and mode the request message content comprises a list of one or more system information blocks suitable for the UE.

Example Embodiment I.2_UE_Apparatus-4

In an example embodiment and mode the non-Uu interface is a PC5 interface.

Example Embodiment I.2_UE_Apparatus-5

In an example embodiment and mode the non-Uu interface is a non-3GPP interface.

Example Embodiment I.3_UE_Apparatus

In an example embodiment and mode the receiver circuitry is further configured to receive an indication that the UE-to-Network Relay (UTNR) node is ready to transmit system information over the non-Uu interface, and wherein the transmitter circuitry is configured to thereafter transmit, from the UE over the non-Uu radio interface, the request message including the request message content related to the system information suitable for the UE.

Example Embodiment I.4_UE_Apparatus

In one of its example aspects the technology disclosed herein concerns a user equipment (UE) comprising transmitter circuitry and processor circuitry. The transceiver circuitry is configured to transmit and receive first protocol layer messages comprising a UE sidelink discovery procedure over a non-UU interface with a UE-to-Network Relay (UTNR) node. The processor circuitry is configured to include in the UE sidelink discovery procedure a message of a first protocol layer configured to indicate type(s) of system information suitable for the UE. The transceiver circuitry is further configured to receive the type(s) of system information suitable for the UE over the non-Uu interface from the UE-to-Network Relay (UTNR) node using a second protocol layer, the second protocol layer being lower than the first protocol.

Example Embodiment I.4_UE_Apparatus-1

In an example embodiment and mode the message of the first protocol layer comprises a request message transmitted by the UE including request message content related to system information suitable for the UE.

Example Embodiment I.4_UE_Apparatus-2

In an example embodiment and mode the request message content is category information of the UE.

Example Embodiment I.4_UE_Apparatus-3

In an example embodiment and mode the request message content comprises identification of type(s) of system information suitable for the remote UE.

Example Embodiment J.1_UE_Apparatus

In one of its example aspects the technology disclosed herein concerns a user equipment (UE) comprising receiver circuitry and processor circuitry. The receiver circuitry is configured to receive a sidelink master system information block over a non-Uu radio interface from a UE-to-Network Relay (UTNR) node. The processor circuitry is configured to obtain from the sidelink master system information block both a master system information block and other system information block information received by the UE-to-Network Relay (UTNR) node over a Uu interface from a base station node of the radio access network, the other system information block information being included in a vacation portion of the master system information block received by the UE-to-Network Relay (UTNR) node over the Uu interface.

Example Embodiment J.1_UE_Apparatus-1

In an example embodiment and mode the vacant portion of the master system information block comprises reserved bits of the master system information block.

Example Embodiment J.2_UE_Apparatus

In one of its example aspects the technology disclosed herein concerns a user equipment (UE) comprising receiver circuitry and processor circuitry. The receiver circuitry is configured to receive both a sidelink broadcast channel and a sidelink shared channel over a non-Uu radio interface from a UE-to-Network Relay (UTNR) node. The processor circuitry is configured: to obtain from the sidelink broadcast channel content of at least a portion of system information block received by the UE-to-Network Relay (UTNR) node over a Uu interface; and to obtain from the sidelink shared channel content of at least another portion of system information received by the UE-to-Network Relay (UTNR) node over the Uu interface.

Example Embodiment J.2_UE_Apparatus-1

In an example embodiment and mode the at least a portion of the system information obtained over the Uu interface is system information obtained from a master system information block received over the Uu interface; and wherein the another portion of the system information obtained over the Uu interface is system information other than master system information block information.

Example Embodiment J.2_UE_Apparatus-2

In an example embodiment and mode the processor circuitry is arranged to obtain from a sidelink broadcast physical channel the at least a portion of the system information obtained over the Uu interface and to obtain from a sidelink shared physical channel the another portion of the system information.

Example Embodiment J.3_UE_Apparatus

In one of its example aspects the technology disclosed herein concerns a user equipment (UE) comprising receiver circuitry and processor circuitry. The receiver circuitry is configured to receive a sidelink shared channel over a non-Uu radio interface from a UE-to-Network Relay (UTNR) node. The processor circuitry configured to obtain from the sidelink shared channel content system information received by the UE-to-Network Relay (UTNR) node over the Uu interface.

Example Embodiment J.4_UE_Apparatus

In one of its example aspects the technology disclosed herein concerns a method in a UE-to-Network Relay (UTNR) node comprising a radio access network. The method comprises: obtaining system information over a Uu interface from a base station node of the radio access network; using processor circuitry to configure control information for transmission to a remote UE and to include in the control information all system information which is available or decodable from the base station; and, transmitting the control information to the remote UE over a non-Uu radio interface.

Example Embodiment I.1_UTNR_Method

In one of its example aspects the technology disclosed herein concerns a method in a UE-to-Network Relay (UTNR) node comprising a radio access network. The method comprises: receiving, from a remote UE over a non-Uu radio interface, a request message configured to obtain system information, the request message including request message content related to system information suitable for the remote UE; using processor circuitry to configure a response message including the system information suitable for the remote UE in dependence on the message content; and, transmitting the response message to the remote UE over the non-Uu radio interface.

Example Embodiment I.1_UTNR_Method-1

In an example embodiment and mode the request message content is category information of the remote UE, and wherein the method further comprises the processor circuitry determining the system information suitable for the remote UE based on the category information of the remote UE.

Example Embodiment I.1_UTNR_Method-2

In an example embodiment and mode the request message content comprises identification of type(s) of system information suitable for the remote UE.

Example Embodiment I.1_UTNR_Method-3

In an example embodiment and mode the request message content comprises a list of one or more system information blocks suitable for the remote UE.

Example Embodiment I.1_UTNR_Method-4

In an example embodiment and mode the method further comprises: transmitting an indication that the UE-to-Network Relay (UTNR) node is ready to transmit system information over the non-Uu interface, and thereafter receiving, from the remote UE over the non-Uu radio interface, the request message including the request message content related to the system information suitable for the remote UE.

Example Embodiment I.2_UTNR_Method

In one of its example aspects the technology disclosed herein concerns a method in UE-to-Network Relay (UTNR) node comprising a radio access network, the method comprising: transmitting and receiving first protocol layer messages comprising a UE sidelink discovery procedure over a non-UU interface with a remote UE; processor circuitry processing in the UE sidelink discovery procedure a message of a first protocol layer whereby the processor circuitry determines type(s) of system information suitable for the remote UE; and, transmitting the type(s) of system information suitable for the remote UE over the non-Uu interface using a second protocol layer, the second protocol layer being lower than the first protocol.

Example Embodiment I.2_UTNR_Method-1

In an example embodiment and mode the message of the first protocol layer comprises a request message transmitted by the remote UE including request message content related to system information suitable for the remote UE.

Example Embodiment I.2_UTNR_Method-2

In an example embodiment and mode the request message content is category information of the remote UE, and wherein the method further comprises the processor circuitry determining the system information suitable for the remote UE based on the category information of the remote UE.

Example Embodiment I.2_UTNR_Method-3

In an example embodiment and mode the request message content comprises identification of type(s) of system information suitable for the remote UE.

Example Embodiment I.3_UTNR_Method

In one of its example aspects the technology disclosed herein concerns a method UE-to-Network Relay (UTNR) node comprising a radio access network. The method comprises: obtaining system information including a master system information block and other system information block information over a Uu interface from a base station node of the radio access network; preparing a sidelink master system information block for transmission to a remote UE by including at least some of the other system block information obtained over the Uu interface in a vacant portion of the master system information block, the included other system block information being pertinent to sidelink communications; and, transmitting the sidelink master system information block to the remote UE over a non-Uu radio interface.

Example Embodiment I.3_UTNR_Method-1

In an example embodiment and mode the vacant portion of the master system information block comprises reserved bits of the master system information block.

Example Embodiment J.1_UTNR_Method

In one of its example aspects the technology disclosed herein concerns a method in a UE-to-Network Relay (UTNR) node comprising a radio access network. The method comprises: obtaining system information including a master system information block and other system information block information over a Uu interface from a base station node of the radio access network; using processor circuitry preparing content of a sidelink broadcast channel to include at least a portion of the system information obtained over the Uu interface and to prepare content of a sidelink shared channel to include another portion of the system information; and, transmitting the sidelink broadcast channel and the sidelink shared channel to the remote UE over a non-Uu radio interface.

Example Embodiment J.1_UTNR_Method-1

In an example embodiment and mode the method further comprises obtaining the at least a portion of the system information obtained over the Uu interface from a master system information block received over the Uu interface; and further comprises obtaining the another portion of the system information over the Uu interface is system information other than master system information block information.

Example Embodiment J.1_UTNR_Method-2

In an example embodiment and mode the method further comprises the processor circuitry: preparing content a sidelink broadcast transport channel to include at least a portion of the system information obtained over the Uu interface and a sidelink shared transport channel to include another portion of the system information; mapping the sidelink broadcast transport channel to a sidelink broadcast physical channel and mapping the sidelink shared transport channel to a sidelink shared physical channel. The transmitter circuitry transmits the sidelink broadcast physical channel and the sidelink shared physical channel to the remote UE over the non-Uu radio interface.

Example Embodiment J.3_UTNR_Method

In one of its example aspects the technology disclosed herein concerns a method in a UE-to-Network Relay (UTNR) node comprising a radio access network. The method comprises: obtaining system information including a master system information block and other system information block information over a Uu interface from a base station node of the radio access network; using processor circuitry to include the system information obtained over the Uu interface in a sidelink shared channel; and, transmitting the sidelink shared channel to the remote UE over a non-Uu radio interface.

Example Embodiment I.1_UE_Method

In one of its example aspects the technology disclosed herein concerns a method in a user equipment (UE) comprising: obtaining system information over a non-Uu interface from a UE-to-Network Relay (UTNR) node, the system information obtained over the non-Uu interface including all system information which is available to the UE-to-Network Relay (UTNR) node or decodable by the UE-to-Network Relay (UTNR) node from a base station over a Uu interface; and, processor circuitry arranged to use the system information obtained over the non-Uu interface in conjunction with sidelink communications.

Example Embodiment I.2_UE_Method

In one of its example aspects the technology disclosed herein concerns a method in a user equipment (UE) comprising: using processor circuitry to generate a request message configured to obtain system information, the request message including request message content related to system information suitable for the UE; transmitting the request message to a UE-to-Network Relay (UTNR) node over a non-Uu interface; and, receiving from the UE-to-Network Relay (UTNR) node over the non-Uu interface a response message comprising the system information suitable for the UE.

Example Embodiment I.2_UE_Method-1

In an example embodiment and mode the request message content is category information of the UE.

Example Embodiment I.2_UE_Method-2

In an example embodiment and mode the request message content comprises identification of type(s) of system information suitable for the UE.

Example Embodiment I.2_UE_Method-1

In an example embodiment and mode the request message content comprises a list of one or more system information blocks suitable for the UE.

Example Embodiment I.3_UE_Method

In an example embodiment and mode method further comprises receiving an indication that the UE-to-Network Relay (UTNR) node is ready to transmit system information over the non-Uu interface, and thereafter transmitting, from the UE over the non-Uu radio interface, the request message including the request message content related to the system information suitable for the UE.

Example Embodiment I.4_UE_Method

In one of its example aspects the technology disclosed herein concerns a method in user equipment (UE) comprising: transmitting and receiving first protocol layer messages comprising a UE sidelink discovery procedure over a non-UU interface with a UE-to-Network Relay (UTNR) node; including in the UE sidelink discovery procedure a message of a first protocol layer configured to indicate type(s) of system information suitable for the UE; receiving the type(s) of system information suitable for the UE over the non-Uu interface from the UE-to-Network Relay (UTNR) node using a second protocol layer, the second protocol layer being lower than the first protocol.

Example Embodiment I.4_UE_Method-1

In an example embodiment and mode the message of the first protocol layer comprises a request message transmitted by the UE including request message content related to system information suitable for the UE.

Example Embodiment I.4_UE_Method-2

In an example embodiment and mode the request message content is category information of the UE.

Example Embodiment I.4_UE_Method-3

In an example embodiment and mode the request message content comprises identification of type(s) of system information suitable for the remote UE.

Example Embodiment J.1_UE_Method

In one of its example aspects the technology disclosed herein concerns a method in a user equipment (UE) comprising: receiving a sidelink master system information block over a non-Uu radio interface from a UE-to-Network Relay (UTNR) node; obtaining from the sidelink master system information block both a master system information block and other system information block information received by the UE-to-Network Relay (UTNR) node over a Uu interface from a base station node of the radio access network, the other system information block information being included in a vacation portion of the master system information block received by the UE-to-Network Relay (UTNR) node over the Uu interface.

Example Embodiment J.1_UE_Method-1

In an example embodiment and mode the vacant portion of the master system information block comprises reserved bits of the master system information block.

Example Embodiment J.2_UE_Method

In one of its example aspects the technology disclosed herein concerns a method in user equipment (UE) comprising: receiving both a sidelink broadcast channel and a sidelink shared channel over a non-Uu radio interface from a UE-to-Network Relay (UTNR) node; using processor circuitry to obtain from the sidelink broadcast channel content of at least a portion of system information block received by the UE-to-Network Relay (UTNR) node over a Uu interface; to obtain from the sidelink shared channel content of at least another portion of system information received by the UE-to-Network Relay (UTNR) node over the Uu interface.

Example Embodiment J.2_UE_Method-1

In an example embodiment and mode the at least a portion of the system information obtained over the Uu interface is system information obtained from a master system information block received over the Uu interface; and wherein the another portion of the system information obtained over the Uu interface is system information other than master system information block information.

Example Embodiment J.3_UE_Method

In an example embodiment and mode the method further comprises the processor circuitry obtaining from a sidelink broadcast physical channel the at least a portion of the system information obtained over the Uu interface and obtaining from a sidelink shared physical channel the another portion of the system information.

In one of its example aspects the technology disclosed herein concerns a method in a user equipment (UE) comprising: receiving a sidelink shared channel over a non-Uu radio interface from a UE-to-Network Relay (UTNR) node; and, using processor circuitry to obtain from the sidelink shared channel content system information received by the UE-to-Network Relay (UTNR) node over the Uu interface.

Example Embodiment K_UE_Apparatus

In one of its example aspects the technology disclosed herein concerns a user equipment (UE) comprising transmitter circuitry and processor circuitry. The transmitter circuitry is configured: to communicate over a Uu interface with a base station node when the UE is in network coverage or in enhanced coverage; and to communicate over a non-Uu interface with a UE-to-Network Relay (UTNR) when the UE is out of network coverage or in enhanced coverage. The processor circuitry is configured to determine whether the UE is to obtain system information over the Uu interface or over the non-Uu interface when the UE is in network coverage or in enhanced coverage. The transceiver is configured to obtain the system information in accordance with the determination.

Example Embodiment K.1.1_UE_Apparatus

In an example embodiment and mode the processor is configured to always obtain the system information over the Uu interface when the system information is available from over both the Uu interface and the non-Uu interface.

Example Embodiment K.1.2_UE_Apparatus

In an example embodiment and mode the processor is configured to obtain the system information over the non-Uu interface when the UE is a paired relationship with the UE-to-Network Relay (UTNR) node.

Example Embodiment K.1.2_UE_Apparatus-1

In an example embodiment and mode the paired relationship comprises a persistently maintained connection between the UE and the relay.

Example Embodiment K.1.2_UE_Apparatus-2

In an example embodiment and mode the paired relationship comprises the UE persistently monitoring the non-Uu interface with the UE-to-Network Relay (UTNR) node.

Example Embodiment K.1.3_UE_Apparatus

In an example embodiment and mode when the processor circuitry in unable to monitor both the Uu interface and the non-Uu interface, the processor is configured to determine the interface over which the UE receives system information as being the interface over which the UE is capable of receiving the system information.

Example Embodiment K.1.4_UE_Apparatus

In an example embodiment and mode the processor circuitry is configured to detect a physical layer problem or a radio link failure over the Uu interface and upon the detection is further configured obtain the system information over the non-Uu interface.

Example Embodiment K.1.5_UE_Apparatus

In an example embodiment and mode when the processor circuitry is configured to obtain an indication that the UE-to-Network Relay (UTNR) node detects a physical layer problem or a radio link failure over the Uu interface and thereupon to obtain the system information over the Uu interface or from another UTNR.

Example Embodiment K.2_UE_Apparatus

In one of its example aspects the technology disclosed herein concerns a user equipment (UE) comprising transceiver circuitry and processor circuitry. The transceiver circuitry is configured: to communicate over a Uu interface with a base station node when the UE is not in network coverage but is in enhanced coverage; and to communicate over a non-Uu interface with a UE-to-Network Relay (UTNR) when the UE is out of network coverage but is in enhanced coverage. The processor circuitry configured to determine whether the UE is to obtain system information over the Uu interface or over the non-Uu interface when the UE is not in network coverage but is in enhanced coverage. The transceiver is configured to obtain the system information in accordance with the determination.

Example Embodiment K.2.1_UE_Apparatus

In an example embodiment and mode the processor is configured to obtain the system information over the non-Uu interface when the UE is in enhanced coverage.

Example Embodiment K.2.2_UE_Apparatus

In an example embodiment and mode the processor is configured to obtain the system information over the non-Uu interface when the UE is in enhanced coverage Mode B.

Example Embodiment K.2.2_UE_Apparatus-1

In an example embodiment and mode the processor is configured to obtain the system information over the Uu interface when the UE is in enhanced coverage Mode A.

Example Embodiment K.2.2_UE_Apparatus-2

In an example embodiment and mode when the UE is in enhanced coverage Mode A the processor is configured to use criteria to make a determination whether to obtain the system information over the Uu interface or over the non-Uu interface.

Example Embodiment K.2.3_UE_Apparatus

In an example embodiment and mode the processor is configured to make the determination dependent upon a reference signal received power (RSRP) over the Uu interface.

Example Embodiment K.2.4_UE_Apparatus

In an example embodiment and mode the processor is configured to make the determination dependent upon a number of repetitions of the system information over the Uu interface.

Example Embodiment K.2.5_UE_Apparatus

In an example embodiment and mode the processor is configured to make the determination dependent upon a comparison of a reference signal received power (RSRP) over the Uu interface and a sidelink reference signal received power (S-RSRP) over the non-Uu interface.

Example Embodiment K.2.6_UE_Apparatus

In one of its example aspects the technology disclosed herein concerns a user equipment (UE) comprising a transceiver and processor circuitry. The transceiver is configured: to communicate over a Uu interface with a base station node when the UE is in enhanced coverage; and to communicate over a non-Uu interface with a UE-to-Network Relay (UTNR) when the UE is in enhanced coverage. The processor circuitry is configured to: obtain (1) system information over the Uu interface and (2) system information over the non-Uu interface when the UE is in enhanced coverage and use diversity combining of both (1) and (2) to determine system information.

Example Embodiment K.1_UE_Method

In one of its example aspects the technology disclosed herein concerns a method in user equipment (UE) comprising: communicating over a Uu interface with a base station node when the UE is in network coverage or in enhanced coverage; communicating over a non-Uu interface with a UE-to-Network Relay (UTNR) when the UE is out of network coverage or in enhanced coverage; using processor circuitry to determine whether the UE is to obtain system information over the Uu interface or over the non-Uu interface when the UE is in network coverage or in enhanced coverage; and, obtaining the system information in accordance with the determination.

Example Embodiment K.1.1_UE_Method

In an example embodiment and mode the method further comprises using the processor circuitry to always obtain the system information over the Uu interface when the system information is available from over both the Uu interface and the non-Uu interface.

Example Embodiment K.1.2_UE_Method

In an example embodiment and mode the method further comprises using the processor circuitry to obtain the system information over the non-Uu interface when the UE is a paired relationship with the UE-to-Network Relay (UTNR) node.

Example Embodiment K.1.2_UE_Method-1

In an example embodiment and mode the paired relationship comprises a persistently maintained connection between the UE and the relay.

Example Embodiment K.1.3_UE_Method

In an example embodiment and mode the paired relationship comprises the UE persistently monitoring the non-Uu interface with the UE-to-Network Relay (UTNR) node

Example Embodiment K.1.3_UE_Method-1

In an example embodiment and mode method further comprises when the processor circuitry is unable to monitor both the Uu interface and the non-Uu interface, using the processor circuitry to determine the interface over which the UE receives system information as being the interface over which the UE is capable of receiving the system information.

Example Embodiment K.1.4_UE_Method

In an example embodiment and mode the method further comprises the processor circuitry obtaining an indication of a physical layer problem or a radio link failure over the Uu interface and obtaining the system information over the non-Uu interface.

Example Embodiment K.1.5_UE_Method

In an example embodiment and mode the method further comprises when the processor circuitry obtaining an indication that the UE-to-Network Relay (UTNR) node detects a physical layer problem or a radio link failure over the Uu interface and thereupon obtaining the system information over the Uu interface or from another UTNR.

Example Embodiment K.2_UE_Method

In one of its example aspects the technology disclosed herein concerns a method in user equipment (UE) comprising: communicating over a Uu interface with a base station node when the UE is out of coverage but in enhanced coverage; and communicating over a non-Uu interface with a UE-to-Network Relay (UTNR) when the UE is out of network coverage or in enhanced coverage. The method further comprises using processor circuitry to determine whether the UE is to obtain system information over the Uu interface or over the non-Uu interface when the UE is out of network coverage BUT in enhanced coverage; and obtaining the system information in accordance with the determination.

Example Embodiment K.2.1_UE_Method

In an example embodiment and mode the method further comprises using the processor circuitry to obtain the system information over the non-Uu interface when the UE is in enhanced coverage.

Example Embodiment K.2.2_UE_Method

In an example embodiment and mode the method further comprise using the processor circuitry to obtain the system information over the non-Uu interface when the UE is in enhanced coverage Mode B.

Example Embodiment K.2.2_UE_Method-1

In an example embodiment and mode the method further comprises using the processor circuitry to obtain the system information over the Uu interface when the UE is in enhanced coverage Mode A.

Example Embodiment K.2.2_UE_Method-2

In an example embodiment and mode when the UE is in enhanced coverage Mode A, the method further comprises the processor circuitry using criteria to make a determination whether to obtain the system information over the Uu interface or over the non-Uu interface.

Example Embodiment K.2.3_UE_Method

In an example embodiment and mode the method further comprises using the processor circuitry to make the determination dependent upon a reference signal received power (RSRP) over the Uu interface.

Example Embodiment K.2.4_UE_Method

In an example embodiment and mode the method further comprises using the processor circuitry to make the determination dependent upon a number of repetitions of the system information over the Uu interface.

Example Embodiment K.2.5_UE_Method

In an example embodiment and mode the method further comprises using the processor circuitry to make the determination dependent upon a comparison of a reference signal received power (RSRP) over the Uu interface and a sidelink reference signal received power (S-RSRP) over the non-Uu interface.

Example Embodiment K.2.6_UE_Method

In one of its example aspects the technology disclosed herein concerns a method in user equipment (UE) comprising: communicating over a Uu interface with a base station node when the UE is in enhanced coverage; communicating over a non-Uu interface with a UE-to-Network Relay (UTNR) when the UE is in enhanced coverage; and using processor circuitry to: obtain (1) system information over the Uu interface and (2) system information over the non-Uu interface when the UE is in enhanced coverage and use diversity combining of both (1) and (2) to determine system information.

It will be appreciated that the technology disclosed herein is directed to solving radio communications-centric issues and is necessarily rooted in computer technology and overcomes problems specifically arising in radio communications. Moreover, in at least one of its aspects the technology disclosed herein improves the functioning of the basic function of a wireless terminal and/or node itself so that, for example, the wireless terminal and/or node can operate more effectively by prudent use of radio resources.

TABLE 1

| SYSTEM INFORMATION |
| --- |
| System information is divided into the MasterInformationBlock (MIB) and a number of SystemInformationBlocks (SIBs): <br>     MasterInformationBlock defines the most essential physical layer information of the cell required to receive further system information; <br>     SystemInformationBlockType1 contains information relevant when evaluating if a UE is allowed to access a cell and defines the scheduling of other system information blocks; <br>     SystemInformationBlockType2 contains common and shared channel information; <br>     SystemInformationBlockType3 contains cell re-selection information, mainly related to the serving cell; <br>     SystemInformationBlockType4 contains information about the serving frequency and intra-frequency neighbouring cells relevant for cell re-selection (including cell re-selection parameters common for a frequency as well as cell specific re-selection parameters); <br>     SystemInformationBlockType5 contains information about other E-UTRA frequencies and inter-frequency neighbouring cells relevant for cell re-selection (including cell re-selection parameters common for a frequency as well as cell specific re-selection parameters); <br>     SystemInformationBlockType6 contains information about UTRA frequencies and UTRA neighbouring cells relevant for cell re-selection (including cell re-selection parameters common for a frequency as well as cell specific re-selection parameters); <br>     SystemInformationBlockType7 contains information about GERAN frequencies relevant for cell re-selection (including cell re-selection parameters for each frequency); <br>     SystemInformationBlockType8 contains information about CDMA2000 frequencies and CDMA2000 neighbouring cells relevant for cell re-selection (including cell re-selection parameters common for a frequency as well as cell specific re-selection parameters); <br>     SystemInformationBlockType9 contains a home eNB name (HNB name); <br>     SystemInformationBlockType10 contains an ETWS primary notification; <br>     SystemInformationBlockType11 contains an ETWS secondary notification; <br>     SystemInformationBlockType12 contains a CMAS warning notification; <br>     SystemInformationBlockType13 contains MBMS-related information; <br>     SystemInformationBlockType14 contains information about Extended Access Barring for access control; <br>     SystemInformationBlockType15 contains information related to mobility procedures for MBMS reception; <br>     SystemInformationBlockType16 contains information related to GPS time and Coordinated Universal Time (UTC); <br>     SystemInformationBlockType17 contains information relevant for traffic steering between E-UTRAN and WLAN; |

TABLE 1-continued

SYSTEM INFORMATION

SystemInformationBlockType18 contains information related to sidelink communication;
SystemInformationBlockType19 contains information related to sidelink discovery;
SystemInformationBlockType20 contains information related to SC-PTM

TABLE 2

SYSTEM INFORMATION FOR NB-IoT

System information for NB-IoT is divided into the MasterInformationBlock-NB (MIB-NB) and a number of SystemInformationBlocks-NB (SIBs-NB):
    MasterInformationBlock-NB defines the most essential information of the cell required to receive further system information;
    SystemInformationBlockType1-NB cell access/selection, other SIB scheduling;
    SystemInformationBlockType2-NB radio resource configuration information;
    SystemInformationBlockType3-NB cell re-selection information for intra-frequency, inter-frequency;
    SystemInformationBlockType4-NB neighboring cell related information relevant for intra-frequency cell re-selection;
    SystemInformationBlockType5-NB neighboring cell related information relevant for inter-frequency cell re-selection;
    SystemInformationBlockType14-NB access barring;
    SystemInformationBlockType16-NB GPS time and UTC info.

TABLE 3

System information required by the UE

The UE shall:
  1>ensure having a valid version, as defined below, of (at least) the following system information, also referred to as the 'required' system information:
    2>if in RRC_IDLE:
      3>if the UE is a NB-IoT UE:
        4>theMasterInformationBlock-NB and SystemInformationBlockType1-NB as well as SystemInformationBlockType2-NB through SystemInformationBlockType5-NB;
      3>else:
        4>the MasterInformationBlock and SystemInformationBlockType1 (or SystemInformationBlockType1-BR depending on whether the UE is a BL UE or the UE in CE) as well as SystemInformationBlockType2 through SystemInformationBlockType8 (depending on support of the concerned RATs), SystemInformationBlockType17 (depending on support of RAN-assisted WLAN interworking);
    2>if in RRC_CONNECTED; and
    2>the UE is not a BL UE; and
    2>the UE is not in CE; and
    2>the UE is not a NB-IoT UE:
      3>the MasterInformationBlock, SystemInformationBlockType1 and SystemInformationBlockType2 as well as SystemInformationBlockType8 (depending on support of CDMA2000), SystemInformationBlockType17 (depending on support of RAN-assisted WLAN interworking);
    2>if in RRC_CONNECTED and T311 is running; and
    2>the UE is a BL UE or the UE is in CE;
      3>the MasterInformationBlock, SystemInformationBlockType1-BR and SystemInformationBlockType2;
  NOTE: E-UTRAN may release BL UEs or UEs in CE or NB-IoT UEs to RRC_IDLE if these UEs need to acquire changed system information.
  1>delete any stored system information after 3 hours or 24 hours from the moment it was confirmed to be valid as defined in 5.2.1.3, unless specified otherwise;
1>    consider any stored system information except SystemInformationBlockType10, SystemInformationBlockType11, systemInformationBlockType12 and systemInformationBlockType14 (systemInformationBlockType14-NB in NB-IoT) to be invalid if systemInfoValueTag included in the SystemInformationBlockType1 (MasterInformationBlock-NB in NB-IoT) is different from the one of the stored system information and in case of NB-IoT UEs, BL UEs and UEs in CE, systemInfoValueTagSI is not broadcasted. Otherwise consider system information validity as defined in 5.2.1.3;

TABLE 4

MasterInformationBlock-SL

```
-- ASN1START
MasterInformationBlock-SL ::=    SEQUENCE {
    sl-Bandwidth-r12             ENUMERATED {
                                     n6, n15, n25, n50, n75, n100},
    tdd-ConfigSL-r12             TDD-ConfigSL-r12,
    directFrameNumber-r12        BIT STRING (SIZE 10)),
    directSubframeNumber-r12     INTEGER (0..9),
    inCoverage-r12               BOOLEAN,
    reserved-r12                 BIT STRING (SIZE 9))
}
-- ASN1STOP
```

TABLE 4-continued

MasterInformationBlock-SL

MasterInformationBlock-SL field descriptions

DirectFrameNumber

Indicates the frame number in which SLSS and SL-BCH are transmitted. The subframe in the frame corresponding to directFrameNumber is indicated by directSubframeNumber InCoverage Value TRUE indicates that the UE transmitting the MasterInformationBlock-SL is in E-UTRAN coverage.

sl-Bandwidth

Parameter: transmission bandwidth configuration. n6 corresponds to 6 resource blocks, n15 to 15 resource blocks and so on.

The UE shall set the contents of the MasterinformationBlock-SL message as follows:

1>if in coverage on the frequency used for the sidelink operation (communication or discovery) that triggered this procedure as defined in TS 36.304 [4, 11.4]:
　2>set inCoverage to TRUE;
　2>set sl-Bandwidth to the value of ul-Bandwidth as included in the received SystemInformationBlockType2 of the cell chosen for the concerned sidelink operation;
　2>if tdd-Config is included in the received SystemInformationBlockType1:
　　3>set subframeAssignmentSL to the value representing the same meaning as of subframeAssignment that is included in tdd-Config in the received SystemInformationBlockType1;
　2>else:
　　3>set subframeAssignmentSL to none;
　2>if triggered by sidelink communication; and if syncInfoReserved is included in an entry of commSyncConfig from the received SystemInformationBlockType18;
　　3>set reserved to the value of syncInfoReserved in the received SystemInformationBlockType18;
　2>if triggered by sidelink discovery; and if syncInfoReserved is included in an entry of discSyncConfig from the received SystemInformationBlockType19;
　　3>set reserved to the value of syncInfoReserved in the received SystemInformationBlockType19;
　2>else:
　　3>set all bits in reserved to 0;
1>else if the UE has a selected SyncRef UE (as defined in 5.10.8):
　2>set inCoverage to FALSE;
　2>set sl-Bandwidth, subframeAssignmentSL and reserved to the value of the corresponding field included in the received MasterInformationBlock-SL;
1>else (i.e. no SyncRef UE selected):
　2>set inCoverage to FALSE;
　2>set sl-Bandwidth, subframeAssignmentSL and reserved to the value of the corresponding field included in the preconfigured sidelink parameters (i.e. preconfigGeneral in SL-Preconfiguration defined in 9.3);
1>set directFrameNumber and directSubframeNumber according to the subframe used to transmit the SLSS, as specified in 5.10.7.3;
1>submit the MasterInformationBlock-SL message to lower layers for transmission upon which the procedure ends;
Upon receiving MasterInformationBlock-SL, the UE shall:
1>    apply the values of sl-Bandwidth, subframeAssignmentSL, directFrameNumber and directSubframeNumber included in the received MasterInformationBlock-SL message;

TABLE 5

PDSCH-Config information element

```
-- ASN1START
PDSCH-ConfigCommon ::=       SEQUENCE {
    referenceSignalPower         INTEGER (-60..50),
    p-b                          INTEGER (0..3)
}
PDSCH-ConfigCommon-v1310 ::= SEQUENCE {
    pdsch-maxNumRepetitionCEmodeA-r13    ENUMERATED {
                                             r16, r32 }          OPTIONAL,   --
```

TABLE 5-continued

| PDSCH-Config information element |
|---|
| Need OR<br>    pdsch-maxNumRepetitionCEmodeB-r13    ENUMERATED {<br>                              r192, r256, r384, r512, r768, r1024,<br>                              r1536, r2048}                      OPTIONAL  --<br>Need OR<br>} | pdsch-maxNumRepetitionCEmodeA

Maximum value to indicate the set of PDSCH repetition numbers for CE mode A, see TS 36.211 [21] and TS 36.213 [23].
pdsch-maxNumRepetitionCEmodeB Maximum value to indicate the set of PDSCH repetition numbers for CE mode B, see TS 36.211 [21] and TS 36.213 [23].

TABLE 6

| SidelinkUEInformation |
|---|
| The SidelinkUEInformation message is used for the indication of sidelink information to the eNB.<br>    Signalling radio bearer: SRB1<br>    RLC-SAP: AM<br>    Logical channel: DCCH<br>    Direction: UE to E-UTRAN<br>                      SidelinkUEInformation message<br>-- ASN1START<br>SidelinkUEInformation-r12 ::=       SEQUENCE {<br>    criticalExtensions                 CHOICE {<br>        c1                            CHOICE {<br>            sidelinkUEInformation-r12    SidelinkUEInformation-r12-IEs,<br>            spare3 NULL, spare2 NULL, spare1 NULL<br>    },<br>        criticalExtensionsFuture          SEQUENCE { }<br>    }<br>}<br>SidelinkUEInformation-r12-IEs ::= SEQUENCE {<br>    commRxInterestedFreq-r12       ARFCN-ValueEUTRA-r9         OPTIONAL,<br>    commTxResourceReq-r12         SL-CommTxResourceReq-r12  OPTIONAL,<br>    discRxInterest-r12                   ENUMERATED {true}          OPTIONAL,<br>    discTxResourceReq-r12            INTEGER (1..63)            OPTIONAL,<br>    lateNonCriticalExtension         OCTET STRING                OPTIONAL,<br>    nonCriticalExtension              SidelinkUEInformation-v1310-IEs OPTIONAL<br>}<br>SidelinkUEInformation-v1310-IEs ::= SEQUENCE {<br>    commTxResourceReqUC-r13        SL-CommTxResourceReq-r12 OPTIONAL,<br>    commTxResourceInfoReqRelay-r13        SEQUENCE {<br>        commTxResourceReqRelay-r13        SL-CommTxResourceReq-r12<br>    OPTIONAL,<br>        commTxResourceReqRelayUC-r13 SL-CommTxResourceReq-r12      OPTIONAL,<br>        ue-Type-r13                    ENUMERATED {relayUE, remoteUE)<br>}                                                OPTIONAL,<br>    discTxResourceReq-v1310      SEQUENCE {<br>        carrierFreqDiscTx-r13        INTEGER (1..maxFreq)      OPTIONAL,<br>        discTxResourceReqAddFreq-r13   SL-DiscTxResourceReqPerFreqList-r13<br>    OPTIONAL<br>}                                                  OPTIONAL,<br>    discTxResourceReqPS-r13       SL-DiscTxResourceReq-r13    OPTIONAL,<br>    discRxGapReq-r13                 SL-GapRequest-r13          OPTIONAL,<br>    discTxGapReq-r13                 SL-GapRequest-r13          OPTIONAL,<br>    discSysInfoReportFreqList-r13 SL-DiscSysInfoReportFreqList-r13 OPTIONAL,<br>    nonCriticalExtension       SEQUENCE { }                 OPTIONAL<br>}<br>SL-CommTxResourceReq-r12 ::=     SEQUENCE {<br>    carrierFreq-r12             ARFCN-ValueEUTRA-r9        OPTIONAL,<br>    destinationInfoList-r12     SL-DestinationInfoList-r12<br>}<br>SL-DiscTxResourceReqPerFreqList-r13 ::=SEQUENCE (SIZE (1..maxFreq)) OF SL-<br>DiscTxResourceReq-r13<br>SL-DiscTxResourceReq-r13 ::=       SEQUENCE {<br>    carrierFreqDiscTx-r13       INTEGER (1..maxFreq)       OPTIONAL,<br>    discTxResourceReq-r13        INTEGER (1..63)<br>} |

TABLE 6-continued

| SidelinkUEInformation |
|---|
| SL-DestinationInfoList-r12 ::= SEQUENCE (SIZE (1..maxSL-Dest-r12)) OF SL-DestinationIdentity-r12<br>SL-DestinationIdentity-r12 ::= BIT STRING (SIZE (24))<br>SL-DiscSysInfoReportFreqList-r13 ::= SEQUENCE (SIZE (1..maxSL-DiscSysInfoReportFreq-r13)) OF SL-DiscSysInfoReport-r13<br>-- ASN1STO |

| SidelinkUEInformation field descriptions |
|---|
| CarrierFreqDiscTx |
| Indicates the frequency by the index of the entry in field discInterFreqList within SystemInformationBlockType19. Value 1 corresponds to the first entry in discInterFreqList within SystemInformationBlockType19, value 2 corresponds to the second entry in this list and so on.<br>commRxInterestedFreq |
| Indicates the frequency on which the UE is interested to receive sidelink communication.<br>commTxResourceReq |
| Indicates the frequency on which the UE is interested to transmit non-relay related sidelink communication as well as the one-to-many sidelink communication transmission destination(s) for which the UE requests E-UTRAN to assign dedicated resources. NOTE 1.<br>commTxResourceReqRelay |
| Indicates the relay related one-to-many sidelink communication transmission destination(s) for which the sidelink relay UE requests E-UTRAN to assign dedicated resources.<br>commTxResourceReqRelayUC |
| Indicates the relay related one-to-one sidelink communication transmission destination(s) for which the sidelink relay UE or sidelink remote UE requests E-UTRAN to assign dedicated resources i.e. either contains the unicast destination identity of the sidelink relay UE or of the sidelink remote UE.<br>commTxResourceReqUC |
| Indicates the frequency on which the UE is interested to transmit non-relay related one-to-one sidelink communication as well as the sidelink communication transmission destination(s) for which the UE requests E-UTRAN to assign dedicated resources. NOTE 1.<br>destinationInfoList |
| Indicates the destination(s) for relay or non-relay related one-to-one or one-to-many sidelink communication. For one-to-one sidelink communication the destination is identified by the ProSe UE ID for unicast communication, while for one-to-many the destination it is identified by the ProSe Layer-2 Group ID as specified in TS 23.303 [68].<br>discRxInterest |
| Indicates that the UE is interested to monitor sidelink discovery announcements.<br>CarrierFreqDiscTx |
| Indicates the frequency by the index of the entry in field discInterFreqList within SystemInformationBlockType19. Value 1 corresponds to the first entry in discInterFreqList within SystemInformationBlockType19, value 2 corresponds to the second entry in this list and so on.<br>discSysInfoReportFreqList |
| Indicates, for one or more frequecies, a list of sidelink discovery related parameters acquired from system Information of cells on configured inter-frequency carriers.<br>discTxResourceReq |
| Indicates the number of separate discovery message(s) the UE wants to transmit every discovery period. This field concerns the resources the UE requires every discovery period for transmitting sidelink discovery announcement(s).<br>discTxResourceReqAddFreq |
| Indicates, for any frequencies in addition to the one covered by discTxResourceReq, the number of separate discovery message(s) the UE wants to transmit every discovery period. This field concerns the resources the UE requires every discovery period for transmitting sidelink discovery announcement(s). |

TABLE 6-continued

SidelinkUEInformation discTxResourceReqPS

Indicates the number of separate PS related discovery message(s) the UE wants to transmit every discovery period. This field concerns the resources the UE requires every discovery period for transmitting PS related sidelink discovery announcement(s).

NOTE 1:
When configuring commTxResourceReq, commTxResourceReqUC, commTxResourceReqRelay and commTxResourceReqRelayUC, E-UTRAN configures at most maxSL-Dest-r12 destinations in total (i.e. as included in the four fields together)

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims.

What is claimed is:

1. A UE-to-Network Relay (UTNR) node comprising a radio access network, the UTNR node comprising:
  receiver circuitry configured to receive, from a remote UE over a non-Uu radio interface:
    a request message including request message content corresponding to category information of the remote UE;
    a request message including request message content corresponding to an identification of type(s) of system information for the remote UE;
  processor circuitry configured to generate a response message; and
  transmitter circuitry configured to transmit the response message to the remote UE over the non-Uu radio interface, wherein
  in a case that the request message content corresponding to the category information of the remote UE is received, the processor circuitry is configured to generate the response message including system information determined based on a predetermined relation with the category information, and
  in a case that the request message content corresponding to the identification of the type(s) of the system information for the remote UE is received, the processor circuitry is configured to generate the response message including system information corresponding to the identification of the type(s) of the system information for the remote UE.

2. The node of claim 1, wherein the request message content corresponding to the identification(s) of the type(s) of the system information for the remote UE comprises a list of one or more system information blocks.

3. The node of claim 1, wherein the receiver circuitry is further configured to obtain system information over a Uu interface from a base station node of the radio access network during a system information acquisition window comprising plural repetitions of transmission of the system information over the Uu interface.

4. A user equipment (UE) comprising:
  processor circuitry configured to generate a request message including request message content, the request message content corresponding to either category information of the UE or an identification of type(s) of system information for the UE;
  transmitter circuitry configured:
    to transmit, to a UE-to-Network Relay (UTNR) node over a non-Uu interface, the request message including the request message content corresponding to the category information of the UE;
    to transmit, to the UE-to-Network Relay (UTNR) node over the non-Uu interface, the request including the request message content corresponding to the identification of type(s) of system information for the UE; and
  receiver circuitry configured to receive, from the UE-to-Network Relay (UTNR) node over the non-Uu interface, a response message, wherein
  in a case that the request message content corresponding to the category information of the UE is transmitted, the response message includes system information determined based on a predetermined relation with the category information, and
  in a case that the request message content corresponding to the identification of the type(s) of the system information for the UE is transmitted, the response message includes system information corresponding to the identification of the type(s) of the system information for the remote UE.

5. The user equipment (UE) of claim 4, wherein the request message content corresponding to the identification of the type(s) of the system information for the UE comprises a list of one or more system information blocks.

6. The user equipment (UE) of claim 4, wherein the non-Uu interface is a PC5 interface.

7. The user equipment (UE) of claim 4, wherein the non-Uu interface is a non-3GPP interface.

8. A method of a UE-to-Network Relay (UTNR) node comprising a radio access network, the method comprising:

receiving, from a remote UE over a non-Uu radio interface;
  a request message including request message content corresponding to category information of the remote UE;
  a request message including request message content corresponding to an identification of type(s) of system information for the remote UE;
generating a response message; and
transmitting the response message to the remote UE over the non-Uu radio interface, wherein
in a case that the request message content corresponding to the category information of the remote UE is received, the response message including system information determined based on a predetermined relation with the category information is generated, and
in a case that the request message content corresponding to the identification of the type(s) of the system information for the remote UE is received, the response message including system information corresponding to the identification of the type(s) of the system information for the remote UE is generated.

9. The method of claim 8, wherein the request message content corresponding to the identification(s) of the type(s) of the system information for the remote UE comprises a list of one or more system information blocks.

10. The method of claim 8, further comprising:
obtaining system information over a Uu interface from a base station node of the radio access network during a system information acquisition window comprising plural repetitions of transmission of the system information over the Uu interface.

11. A method of a user equipment (UE) comprising:
generating a request message including request message content, the request message content corresponding to either category information of the UE or an identification of type(s) of system information for the UE;
transmitting, to a UE-to-Network Relay (UTNR) node over a non-Uu interface, the request message including the request message content corresponding to the category information of the UE;
transmitting, to the UE-to-Network Relay (UTNR) node over the non-Uu interface, the request including the request message content corresponding to the identification of type(s) of system information for the UE; and
receiving, from the UE-to-Network Relay (UTNR) node over the non-Uu interface, a response message, wherein
in a case that the request message content corresponding to the category information of the UE is transmitted, the response message includes system information determined based on a predetermined relation with the category information, and
in a case that the request message content corresponding to the identification of the type(s) of the system information for the UE is transmitted, the response message includes system information corresponding to the identification of the type(s) of the system information for the remote UE.

12. The method of claim 11, wherein the non-Uu interface is a PC5 interface.

13. The method of claim 11, wherein the non-Uu interface is a non-3GPP interface.

* * * * *